(12) United States Patent
Yui et al.

(10) Patent No.: US 7,212,114 B2
(45) Date of Patent: May 1, 2007

(54) COMMUNICATION APPARATUS

(75) Inventors: Yasuji Yui, Kanagawa (JP); Hiroyuki Matsumura, Kanagawa (JP); Akira Yaegashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 10/523,171

(22) PCT Filed: Jul. 31, 2003

(86) PCT No.: PCT/JP03/09755

§ 371 (c)(1),
(2), (4) Date: Jan. 28, 2005

(87) PCT Pub. No.: WO2004/011746

PCT Pub. Date: Feb. 5, 2004

(65) Prior Publication Data

US 2006/0007005 A1    Jan. 12, 2006

(30) Foreign Application Priority Data

| Jul. 31, 2002 | (JP) | ............................ 2002-223700 |
| Sep. 25, 2002 | (JP) | ............................ 2002-278436 |
| Oct. 11, 2002 | (JP) | ............................ 2002-298309 |
| Oct. 17, 2002 | (JP) | ............................ 2002-302996 |

(51) Int. Cl.
E05B 45/06        (2006.01)

(52) U.S. Cl. ............ 340/542; 340/539.11; 340/426.35; 340/426.36

(58) Field of Classification Search ................ 340/540, 340/542, 543, 426.35, 426.36, 539.11, 572.1, 340/572.4, 5.1, 5.2; 235/382, 382.5; 709/217; 713/186

See application file for complete search history.

(56) References Cited

U.S. PATENT DOCUMENTS

| 5,397,884 | A  | * | 3/1995 | Saliga ...................... 235/382.5 |
| 6,408,330 | B1 | * | 6/2002 | DeLaHuerga ............... 709/217 |
| 6,624,739 | B1 | * | 9/2003 | Stobbe ........................ 340/5.2 |
| 6,779,024 | B2 | * | 8/2004 | DeLaHuerga ............... 709/217 |
| 6,990,588 | B1 | * | 1/2006 | Yasukura .................... 713/186 |

FOREIGN PATENT DOCUMENTS

| JP | 09-004293  | 1/1997 |
| JP | 11-45392   | 2/1999 |
| JP | 2000-259971 | 9/2000 |
| JP | 2000-268273 | 9/2000 |
| JP | 2002-16714  | 1/2002 |
| JP | 2002-70377  | 3/2002 |
| JP | 2002-71378  | 3/2002 |

* cited by examiner

Primary Examiner—Van T. Trieu
(74) Attorney, Agent, or Firm—Finnegan, Henderson, Farabow, Garrett & Dunner, L.L.P.

(57) ABSTRACT

A communication apparatus is provided that can urge a person, such as a child, to come back home at a scheduled time. The communication apparatus can also inform another person, such as a parent of the child, about the time that the child arrives home.

6 Claims, 38 Drawing Sheets

F I G. 1
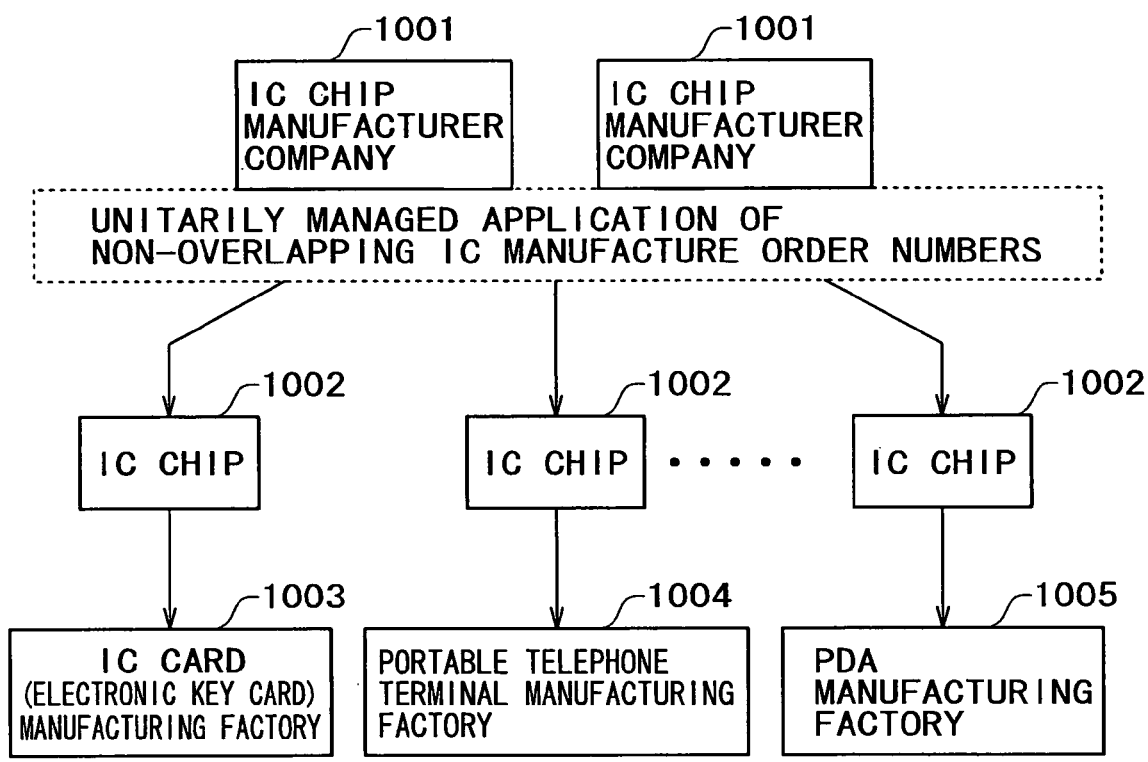
F I G. 2

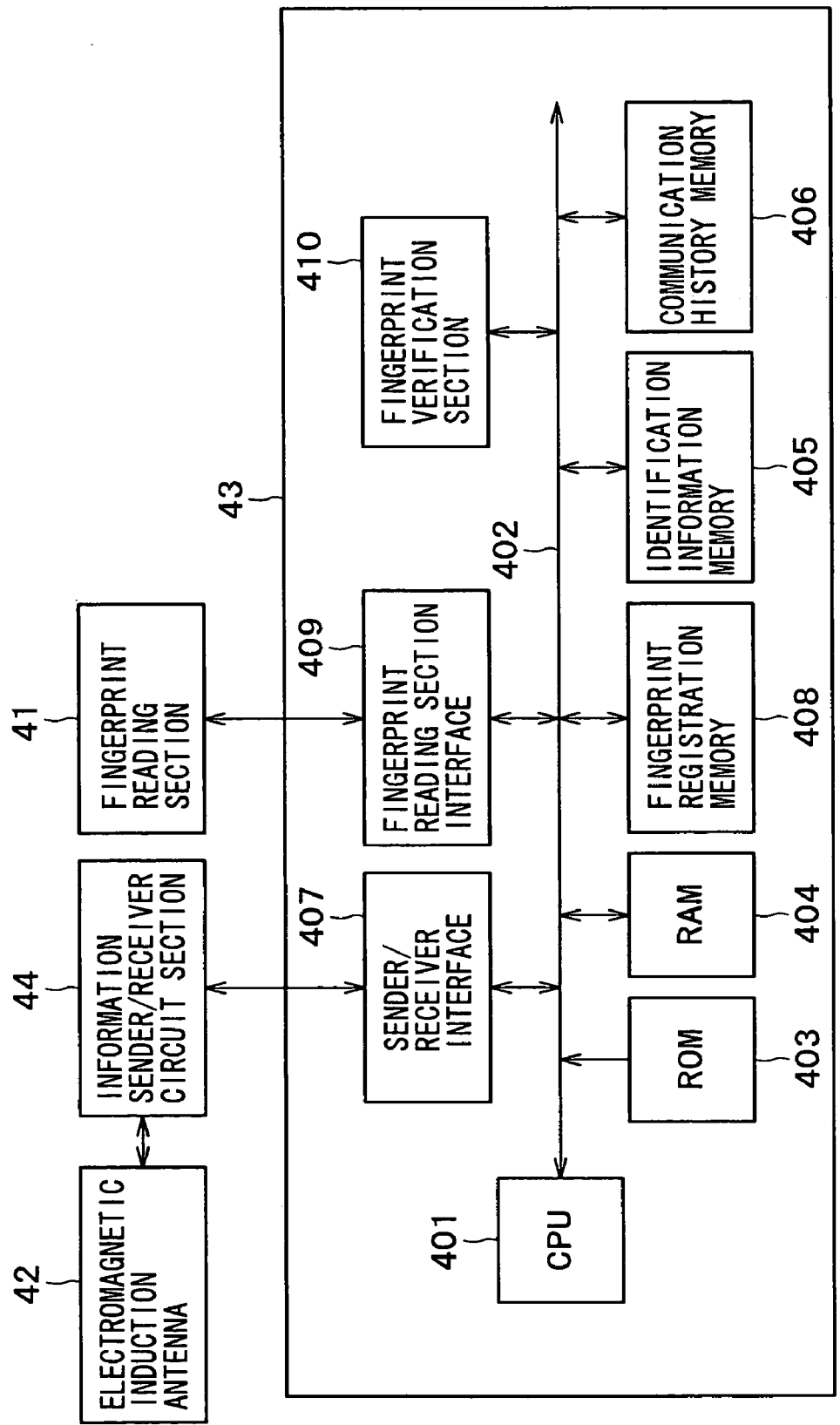

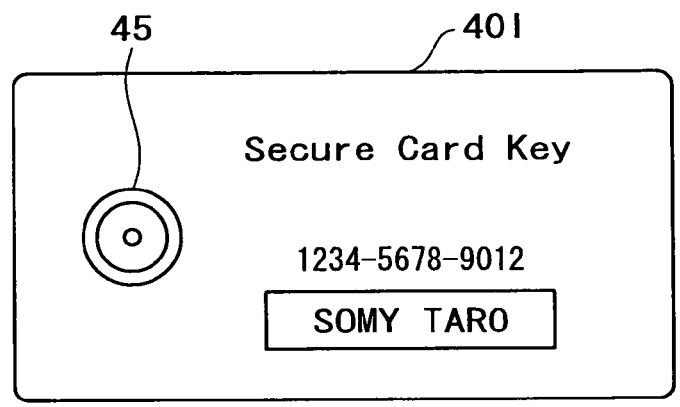
F I G. 7 A
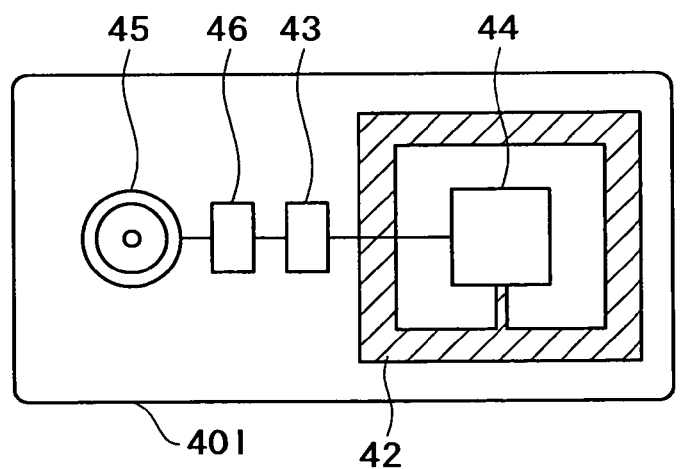
F I G. 7 B

FIG. 14

| | |
|---|---|
| IDENTIFICATION INFORMATION (IC CHIP MANUFACTURE ORDER NUMBER) · GENUINE KEY INFORMATION · BACKUP KEY INFORMATION | } PERSONAL IDENTIFICATION INFORMATION |
| PASSWORD | |
| NAME | |
| ADDRESS | |
| DATE OF BIRTH | |
| AGE | |
| FAMILY RELATIONSHIP | |
| REGISTRATION DATE | |
| BANK ACCOUNT NUMBER | PERSONAL INFORMATION |
| TELEPHONE NUMBER | |
| E-MAIL ADDRESS | |
| IP ADDRESS | |
| HOBBY/PREFERENCE INFORMATION · FAVORITE TELEVISION PROGRAM : DRAMA · FAVORITE MUSIC: JAZZ · FAVORITE MOVIE: SF | |
| COMING IN/GOING OUT HISTORY INFORMATION | |
| ELECTRONIC KEY REGISTRATION-LOSS HISTORY INFORMATION | |

FIG. 15

| SECURITY LEVEL | FATHER | MOTHER | CHILD |
|---|---|---|---|
| D | ○ | ○ | ○ |
| D | ○ | ○ | × |
| D | ○ | × | ○ |
| D | ○ | × | × |
| C | × | ○ | ○ |
| C | × | ○ | × |
| B | × | × | ○ |
| A | × | × | × |

○: AT HOME
×: ABSENT

FIG. 16

| SECURITY LEVEL | WINDOW-DOOR MONITORING | FIRE-GAS MONITORING | CAMERA MONITORING |
|---|---|---|---|
| A | ○ | ○ | ○ |
| B | ○ | ○ | × |
| C | × | ○ | × |
| D | × | × | × |

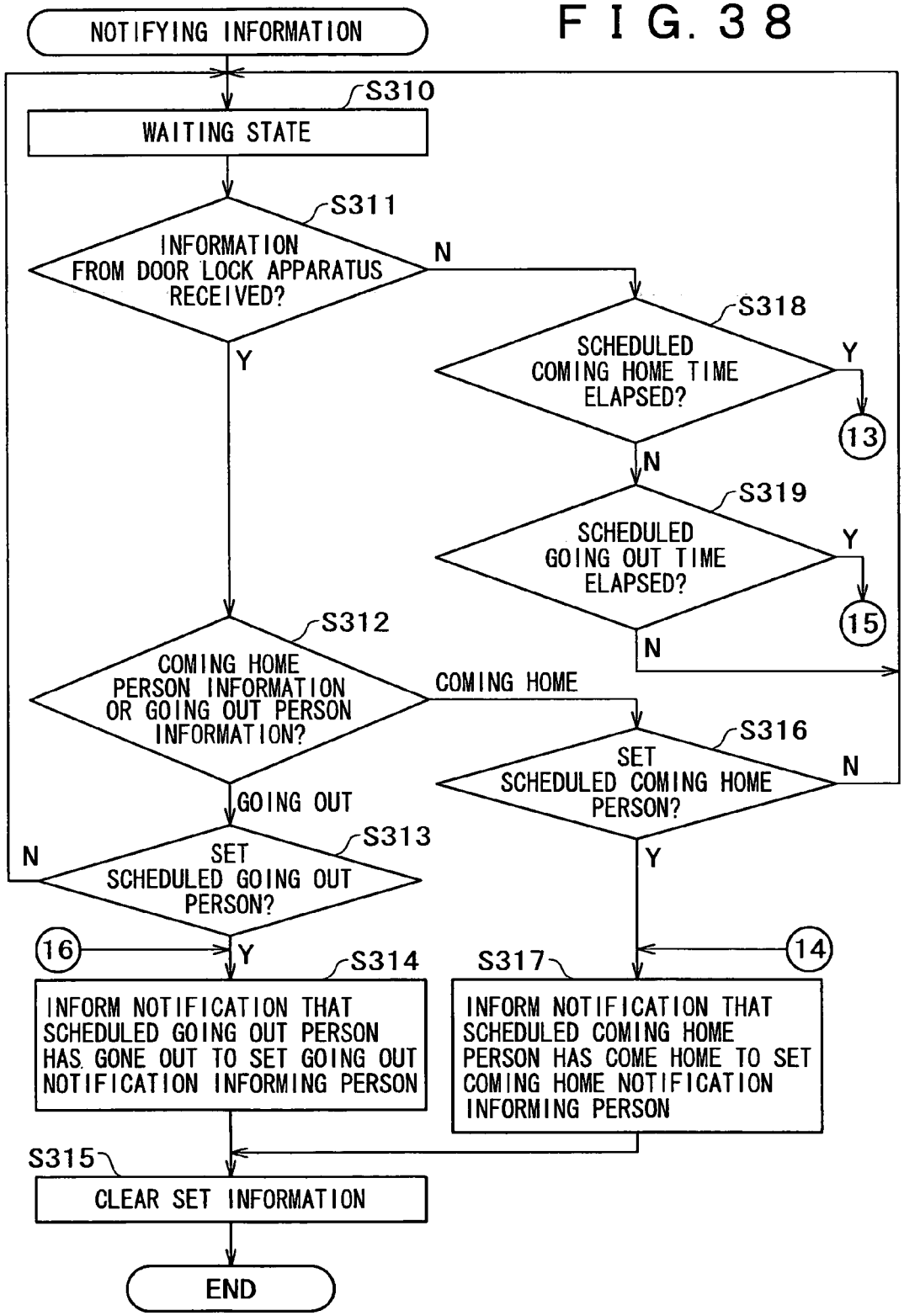

F I G. 3 9
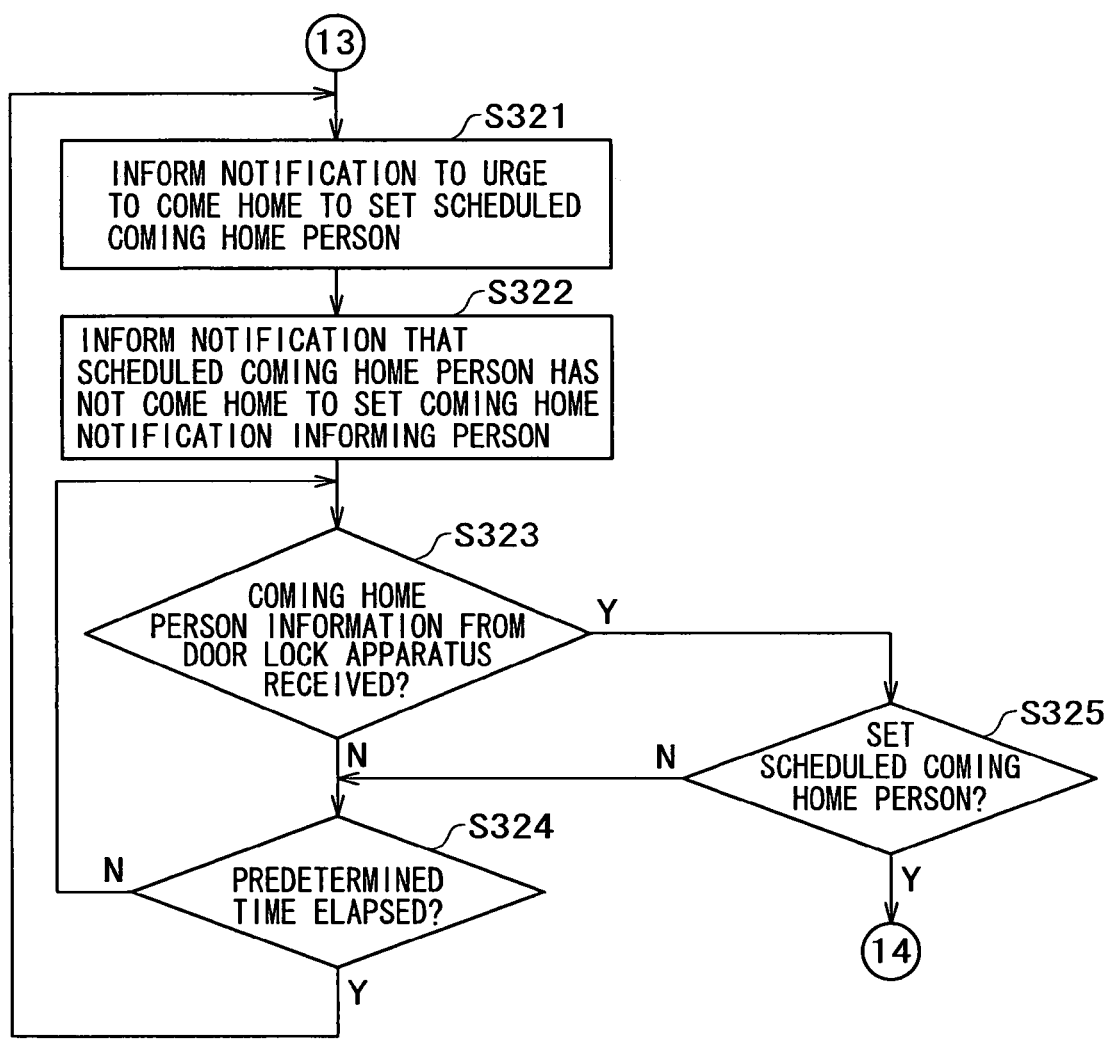

COMMUNICATION APPARATUS

TECHNICAL FIELD

This invention relates to a communication apparatus suitable for use with a door lock control system, which controls locking and unlocking of a door using electronic key information.

BACKGROUND ART

Recently, a door lock control system wherein a conventional physical key is inserted into a key cylinder to lock or unlock the door suffers from an affair such as a case of burglary. A dwelling unit or the like which adopts, for a door of an entrance or the like, the door lock control system is caused to release the lock without using a key by a person familiar with a key cylinder mechanism.

Therefore, attention is paid to a door lock control system by an electronic key device that does not use such a key cylinder mechanism as described above. For example, as an example of the door lock system by the electronic key device, Patent Document 1 (refer to the Japanese Patent Laid-open No. Hei 9-4293 is known. The parent machine compares and verifies an ID code as electronic key information registered in advance and an ID code received as electronic key information from the child machine with each other, and the door lock is controlled based on the result of the comparison.

For example, even when a child who goes out promises to come home before predetermined time, the child often forgets the time. In this instance, if one of the parents is at home, then if the child does not get home at the time of the promise, then the parent can originate a telephone call to a portable telephone terminal of the child or the like to urge the child to come back home.

However, when the parents have gone out to work or the like and are not at home, they cannot confirm whether or not the child came home at the predetermined time. Therefore, the parents cannot urge the child to come home.

It is a possible idea to cause the child to inform the parents that the child comes home by such a measure as to cause the child to originate a telephone call to the parents. However, even if the parents receive the notification that the child comes home through telephone conversation or the like, the parents cannot confirm whether or not the child is really at home.

Taking the foregoing into consideration, it is an object of the present invention to provide a communication apparatus which can urge a person who is not at home such as, for example, a child to come back home when scheduled coming home time comes and can inform a notification of the time at which the child comes home, for example, to the parent.

BRIEF SUMMARY OF THE INVENTION

In order to solve the subject described above, a communication apparatus according to the invention as set forth in claim 1 includes first communication means for communicating with an electronic key device in which at least electronic key information is stored, second communication means for transmitting information through a communication network, a storage section for storing electronic key information, door lock control means for comparing the electronic key information received from the electronic key device through the first communication means and the electronic key information stored in the storage section with each other and controlling a lock apparatus for a door based on the result of the comparison, user recognition means for recognizing a user of the electronic key device based on the information received from the electronic key device through the first communication means, and sender control means for controlling based on the result of the recognition by the user recognition means so that information regarding passing in/out of the user of the electronic key device is transmitted to a notification destination determined in advance through the second communication means.

According to the invention as set forth in claim 2, the communication apparatus according to claim 1 further includes setting storing means for accepting and storing setting of the user of the electronic key device with regard to whom information regarding the passing in/going out is to be transmitted to the notification destination, the sender control means transmitting information regarding passing in/out of the set user of the electronic key device to the notification destination through the second communication means.

In the communication apparatus according to the present invention, the user recognition means recognizes who is the person who performs communication with the electronic key device to open or close the door. The sender control means transmits information regarding passing in/out of the user of the electronic key device to the notification destination set in advance.

Accordingly, where the notification destination is, for example, a parent who is out of home, a notification of information regarding, for example, coming home or going out of the child can be issued to the parent.

According to the invention as set forth in claim 3, the communication apparatus according to claim 2 is characterized in that the setting storage section accepts and stores a setting input of time information corresponding to the user of the electronic key device together with the user, and the sender control means controls, if the set user of the electronic key device is not recognized by the user recognition means even after the time corresponding to the time information of the setting input elapses, information regarding that passing in/out of the user of the electronic key device does not occur is transmitted to the notification destination through the second communication means.

In the invention as set forth in claim 3, for example, if scheduled coming home time is set and the notification destination is set as a scheduled coming home person, then if the scheduled coming home person does not come home even when the set time elapses, a notification of this can be issued to the scheduled coming home person. On the other hand, if the notification destination is set to a person other than the scheduled coming home person such as, for example, to a parent, a notification that the scheduled coming home person does not come home as yet can be issued to the parent.

BRIEF DESCRIPTION OF DRAWINGS

FIG. 1 is a view illustrating an outline of identification information used in an embodiment of a door lock control system of the present invention;

FIG. 2 is a view illustrating an example of identification information used in the embodiment of the present invention;

FIG. 5 is a block diagram showing an example of a configuration of the embodiment of the electronic key device according to the present invention;

FIGS. 7A and 7B are views showing a different embodiment of the electronic key device according to the present invention;

FIG. 14 is a view illustrating an example of personal profile information;

FIG. 15 is a view illustrating contents of a security mode;

FIG. 16 is a view illustrating contents of the security mode;

FIG. 31 is part of a flow chart illustrating operation of the monitoring control apparatus when a security mode is on;

FIG. 32 is part of a flow chart illustrating the operation of the monitoring control apparatus when the security mode is on;

FIG. 38 is a view showing part of a flow chart illustrating a notifying information process regarding the scheduled coming home person or the scheduled going out person in the embodiment of the present invention;

FIG. 39 is a view showing part of the flow chart illustrating the notifying information process regarding the scheduled coming home person or the scheduled going out person in the embodiment of the present invention.

DETAILED DESCRIPTION OF THE INVENTION

Figure 3:
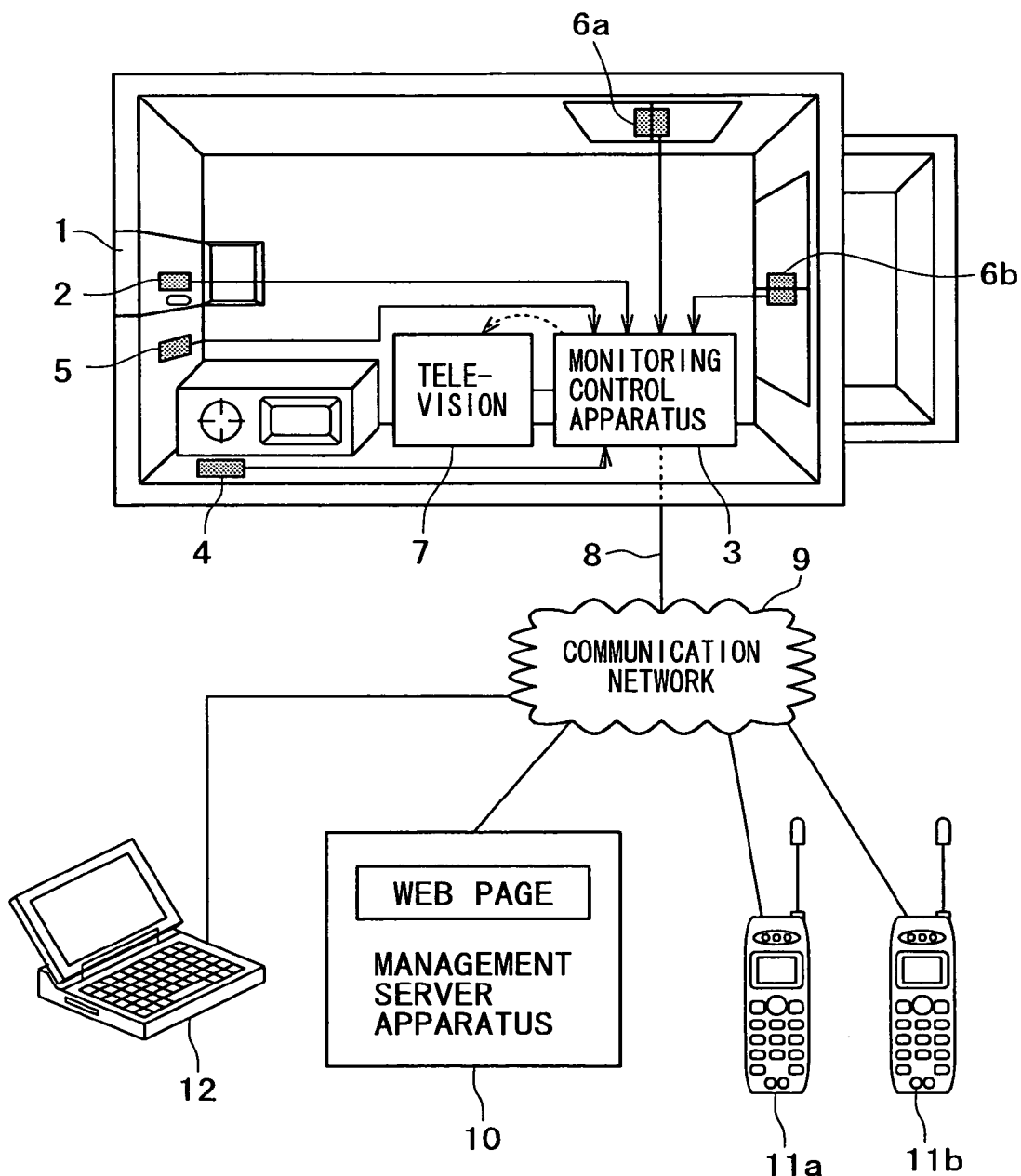
FIG. 3 is a view showing an outline of a communication system to which the embodiment of the door lock control system according to the present invention is applied.

In the following, a communication system including an embodiment of a communication apparatus according to the present invention is described with reference to the drawings.

In the communication system described below, a door lock control system is provided for an entrance door of a house. The door lock control system communicates electronic key information with an electronic key device to control locking and unlocking. Further, in the present example, a security monitoring system is provided in the house for detecting intrusion of a burglar through a window or the entrance door, occurrence of a fire, and leak of gas. The security monitoring system takes a countermeasure against the individual abnormal states. Further, the security monitoring system and the door lock control system are connected for communication to each other to operate in an interlocking relationship with each other.

In the present example, the security monitoring system is connected to a management server apparatus through a communication network so as to generally form a communication system.

In the present example, a door lock apparatus, which forms the door lock control system, and a monitoring control apparatus hereinafter described, which forms the security monitoring system, cooperatively form the communication apparatus of the present embodiment.

Further, in the present example, the electronic key device includes an organism information acquisition section, a controlling IC (Integrated Circuit), and communication means, and electronic key devices of various types can be used as the electronic key device. In the present example, as a particular example of the electronic key device, not only an IC card but also a portable telephone terminal, a PDA (Personal Digital Assistant) terminal, and so forth can be used.

The controlling IC incorporated in the electronic key device includes an electronic key information memory, and electronic key information is stored in the electronic key information memory. As the electronic key information, in the present example, identification information managed unitarily so that the same identification information may not exist is stored. In the present example, as the identification information, an IC chip manufacture order number is used.

For example, as shown in FIG. 1, one or a plurality of IC chip manufacturing companies 1001 apply IC chip manufacture order numbers. The numbers are managed unitarily and do not overlap with one another at all, to controlling IC chips 1002 manufactured thereby. Where a plurality of IC chip manufacturing companies 1001 are involved, for example, manufacture order numbers to be applied to the controlling IC chips 1002 are allocated in advance to the individual IC chip manufacturing companies 1001, whereby the manufacture order numbers are managed unitarily. Accordingly, in memories of the manufactured controlling IC chips 1002, IC chip manufacture order numbers different from one another are stored as the identification information.

The controlling IC chips 1002 are supplied to an IC card manufacturing factory (or manufacturer company) 1003, a portable telephone terminal manufacturing factory (or manufacturer company) 1004, a PDA terminal manufacturing factory (or manufacturer company) 1005, and so forth. Thus, IC cards, portable telephone terminals, PDA terminals, and so forth in which the controlling ICs and communication sections are incorporated are manufactured.

FIG. 2 is a view illustrating an example of an IC chip manufacture order number used in the present embodiment.

The IC chip manufacture order number of the present example is formed from a number of totaling 10 digits (including marks) including a maker number of three digits, a category code of three digits, and a serial number of four digits.

It is to be noted that the identification information is not limited to the IC chip manufacture order numbers, but any information can be used only if the information is managed unitarily so that the same information may not exist. The identification information may be stored separately in a memory of the IC together with the IC chip manufacture order number.

As the communication means of the electronic key device, a contactless communication section using electromagnetic induction or a radio wave is used. In the present embodiment, it is only necessary for the communication section to communicate within a range of, for example, several millimeters to several tens millimeters, and a communication section of low power can be used sufficiently for the communication section.

In the door lock control system in the present embodiment, a door lock apparatus for making it possible for the electronic key device to lock and unlock the entrance door is attached to the door. In the present example, communication of electronic key information is performed between the electronic key device and the door lock apparatus, and the door lock apparatus controls locking and unlocking of the door based on the communication.

In the example described below, contactless communication in which electromagnetic induction is used is used for the communication between the electronic key device and the door lock apparatus and is performed through a read/write section of the electronic key device which forms part of the door lock apparatus as hereinafter described.

In the present embodiment, as the electronic key information for controlling locking and unlocking of the door, identification information formed from the IC chip manufacture order number is used. In the present embodiment, as the electronic key information in the home, the identification information of the electronic key devices having built-in memories in which identification information managed unitarily as described hereinabove is registered as electronic key information into the management server apparatus so that members of a family may individually own and use electronic key devices for personal use.

In the present embodiment, the management server apparatus transfers the registered electronic key information of each of the members of the family to a storage section for electronic key information of the door lock apparatus to register the electronic key information into the door lock apparatus. The door lock apparatus compares and authenticates the registered electronic key information and electronic key information received from an electronic key device as a communication apparatus with each other and controls locking and unlocking of the door in response to the result of the comparison and authentication.

As hereinafter described, in the present embodiment, each of the members of the family can register genuine key information and backup key information as electronic key information for the member itself into the management server apparatus. Since the electronic key information is different for each electronic key device, registration of the genuine key information and the backup key information is equivalent to registration of a genuine key device and a backup key device.

In the example described below, the genuine key device provided to each person is an IC card provided by a providing company of the door lock control system. Identification information of the IC card as the genuine key device is registered as electronic key information of the owner of the IC card into the management server apparatus in advance before the door lock system is attached to the house.

In this instance, in the present embodiment, a number of IC cards equal to the number of the members of the family are provided from the providing company, and the identification information of all of the plurality of IC cards is registered as electronic key information for the door lock control system installed into the management server apparatus.

Furthermore, in the present embodiment, personal information of each of the members of the family of the house in which the door lock control system is incorporated is collected into the management server apparatus, and the identification information of the IC cards owned by the members of the family is registered corresponding to the personal information. Accordingly, the door lock control system can search the electronic key information to discriminate each of the electronic key information of the member. In short, in the communication system of the present example, the electronic key information can be used as personal identification information of the members of the family.

An installation company of the door lock control system or a user issues an initial registration request to the management server apparatus after the system is installed into the house. Then, the genuine key information of each of the members of the family registered in the management server apparatus is registered into the storage section of the door lock apparatus and used for authentication of the electronic key information.

Further, in the present embodiment, taking a case wherein a genuine key device is lost into consideration, backup key information can be registered. As hereinafter described, in the present embodiment, backup key information can be registered by each of the members of the family by registering identification information (in the present example, the IC manufacture order number) of the electronic key device to be used as the backup key device.

As described hereinabove, in the present embodiment, the fact that identification information which is used as electronic key information can be used also as personal identification information can be utilized to manage coming in/going out of each of the members of the family through the entrance door.

Where electronic key information is used also as personal identification information in this manner, management of coming in/going out of each of the members of the family who live in the house through the entrance door can be performed. Notification to a scheduled coming home person about the time that the person should come home elapses or notification to a parent about a situation that the child comes home can be performed. Further, information of coming in/going out described above can be reflected on the security system, and a security system of a higher function can be constructed.

[Outline of the Security System Including the Door Lock System of the Embodiment]

FIG. 3 is a view showing an outline of the communication system of the present embodiment including the door lock control system and the security system.

A door lock apparatus 2, which communicates with an electronic key device, is attached to an entrance door 1 of a house. In the room, a monitoring control apparatus 3, which composes the security system, is provided and connected to the door lock apparatus 2. While the door lock apparatus 2 and the monitoring control apparatus 3 in the present example are connected to each other by a connecting line, they may otherwise be connected by radio.

The monitoring control apparatus 3 can serve also as an apparatus which receives electronic key information from the door lock apparatus 2 to perform authentication of the electronic key information described above, that is, as an authentication apparatus. However, in the present example, authentication of electronic key information is performed by the door lock apparatus 2 itself.

Further, in the present example, a fire sensor 4 for detecting occurrence of a fire, a gas sensor 5 for detecting leak of gas, window sensors 6a and 6b for detecting closing of windows, and a television set 7 are provided in the room and are individually connected to the monitoring control apparatus 3. Although also the monitoring control apparatus 3 and the elements mentioned are connected to each other individually by connecting wires, they may otherwise be connected by radio.

Further, though not shown in FIG. 3, a monitor camera may be provided. The monitor camera positions to pick up an image in the proximity of the place where the fire occurs when the fire sensor 4 detects occurrence of a fire. Alternatively, the monitor camera positions to pick up an image of the burglar when any of the window sensors 6a and 6b detect invasion of a burglar. In this instance, the monitor cameras are connected to the monitoring control apparatus 3 so that picked up images of the monitor cameras can be supplied to the monitoring control apparatus 3.

The monitoring control apparatus 3 is further connected to a management server apparatus 10 administrated by a management company of the security system through a telephone line 8 and further through a communication network 9. Also, the management server apparatus 10 can serve as an apparatus receiving electronic key information from the door lock apparatus 2 through the monitoring control apparatus 3. The management server 10 performs authentication of the electronic key information.

The communication network 9 includes also a portable telephone network. When an abnormal state occurs, the monitoring control apparatus 3 can notify a portable telephone terminal 11a and 11b registered in advance about the occurrence of the abnormal state. Further, the communication network 9 includes the Internet, and a personal computer 12 can access the management server apparatus 10 through the Internet. Also the portable telephone terminal 11a and 11b can access the management server apparatus 10.

It is to be noted that, in the present embodiment, the control apparatus in the claims is formed from the door lock control apparatus and the monitoring control apparatus hereinafter described of the door lock apparatus 2.

Now, a particular example of a configuration and operation of the door lock apparatus 2 and a particular example of a configuration and operation of the monitoring control apparatus 3 are described in detail. It is to be noted that, in the example described below, authentication of electronic key information is performed by the door lock apparatus itself as described hereinabove.

EXAMPLES OF A CONFIGURATION OF THE ELECTRONIC KEY DEVICE

As described hereinabove, in the present embodiment, not only an IC card but also a portable telephone terminal, a PDA terminal, and so forth can be used as the electronic key device. However, they are common that the electronic key device includes an organism information acquisition section, a controlling IC chip, and communication means. An example of a configuration where the electronic key device is an IC card is described below.

First Example of the Electronic Key Device

Figure 4A:
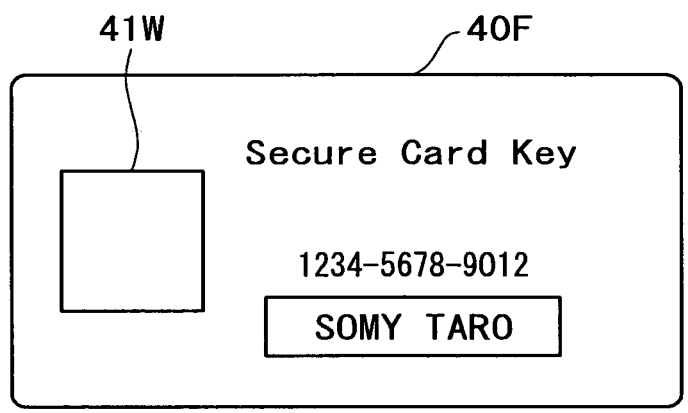
FIGS. 4A and 4B are views showing an embodiment of an electronic key device according to the present invention.

The electronic key device of the first example is an example of an IC card wherein a fingerprint is used as organism information. FIG. 4A shows the surface of an IC card 40F of the present example. On the surface of the IC card 40F, the name and the ID number of an owner are indicated and a fingerprint reading window 41W of a fingerprint reading section 41 is formed.

Figure 4B:
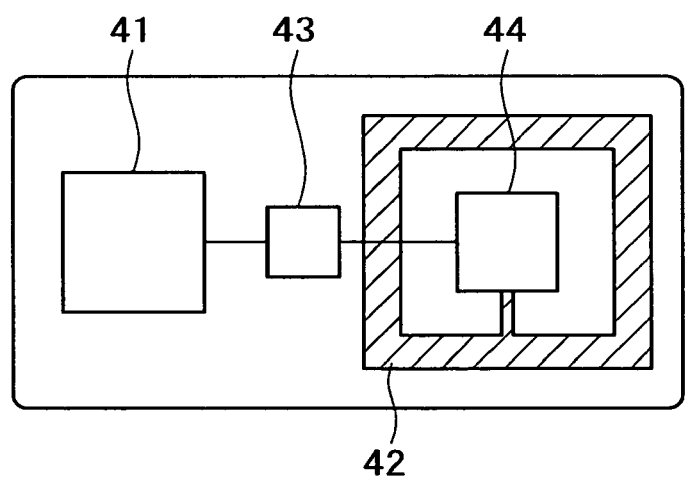

FIG. 4B shows an example of an internal configuration of the IC card 40F. The IC card 40F has built therein the finger reading section 41, an electromagnetic induction antenna 42 for communicating with an electronic key read/write section of the door lock apparatus 2 hereinafter described, a controlling IC 43, and an information sender/receiver circuit section 44.

The fingerprint reading section 41 reads a fingerprint of a finger placed on the fingerprint reading window 41W and sends information of the read fingerprint to the controlling IC 43. The controlling IC 43 compares the fingerprint information of the owner of the IC card 40F registered therein in advance with the read fingerprint information to discriminate whether or not they match with each other.

Then, if it is discriminated that they match with each other, then the fingerprint reading section 41 reads out electronic key information stored in a memory of the controlling IC 43 in advance and signals the electronic key information to the outside through the information sender/receiver circuit section 44 and the electromagnetic induction antenna 42. When the stored fingerprint information and the read fingerprint information are compared with each other, if it is discriminated that they do not match with each other, then the fingerprint reading section 41 inhibits signaling of the electronic key information to the outside.

FIG. 5 shows an internal block configuration of the IC card 40F in the case of the first example. A ROM (Read Only Memory) 403, a RAM (Random Access Memory) 404 for a working area, and an identification information memory 405 are connected to a CPU (Central Processing Unit) 401 through a system bus 402. The ROM stores programs and data, and the identification information memory 405 stores identification information used as electronic key information. Also a communication history memory 406, a sender/receiver interface 407, a fingerprint registration memory 408, a fingerprint reading section interface 409, and a fingerprint verification section 410 are connected to the CPU 401 through the system bus 402.

The identification information memory 405 has identification information stored therein, which is formed from an IC manufacture order number described hereinabove. It is to be noted that, in addition to the name and the address of the owner of the IC card 40, also other necessary personal information of the owner may be stored. The personal information is formed so as to allow distinction among father, mother, child, and so forth.

Into the communication history memory 406, times and a history of communication with an electronic key read/write section hereinafter described of the door lock apparatus 2 performed by the owner (including information which one of electronic key read/write sections inner or outer sides is performed the communication), a history of going out and coming home of the owner can be written. It is to be noted that such history information is stored also into an area, which corresponds to each of the members of the family, of the memory of the door lock apparatus 2 or a memory of the monitoring control apparatus 3.

The information sender/receiver circuit section 44 connected to the electromagnetic induction antenna 41 is connected to the sender/receiver interface 407.

In the fingerprint registration memory 408, information of a fingerprint of the owner of the IC card 40F is registered in advance and stored. The fingerprint reading section interface 409 is provided to fetch information of a fingerprint read by the fingerprint reading section 41. The fingerprint verification section 410 compares information of a fingerprint acquired through the fingerprint reading section interface 409 and the information of the fingerprint of the owner read out from the fingerprint registration memory 408 with each other. The fingerprint verification section 410 discriminates whether or not they match with each other and signals the result of the discrimination to the system bus 402. The fingerprint verification section 410 may have not a hardware configuration but a software configuration by the CPU 401.

Electronic key information is formed from the identification information read out from the identification information memory 405. The CPU 401 signals the electronic key information based on the result of the discrimination by the fingerprint verification section 410 through the sender/receiver interface 407, information sender/receiver circuit 408, and electromagnetic induction antenna 41 when the fingerprints match as described hereinabove, that is, when the fingerprint verification results in OK. However, when the result of the discrimination by the fingerprint verification section 410 doesn't match with the fingerprints, that is, when the fingerprint verification results in NG, the CPU 401 inhibits signaling of the electronic key information.

Further, the CPU 401 performs also a process of fetching information received by the electromagnetic induction antenna 42 through the information sender/receiver circuit section 44 and the sender/receiver interface 407 and writing the fetched information into the communication history memory 406.

Figure 6:
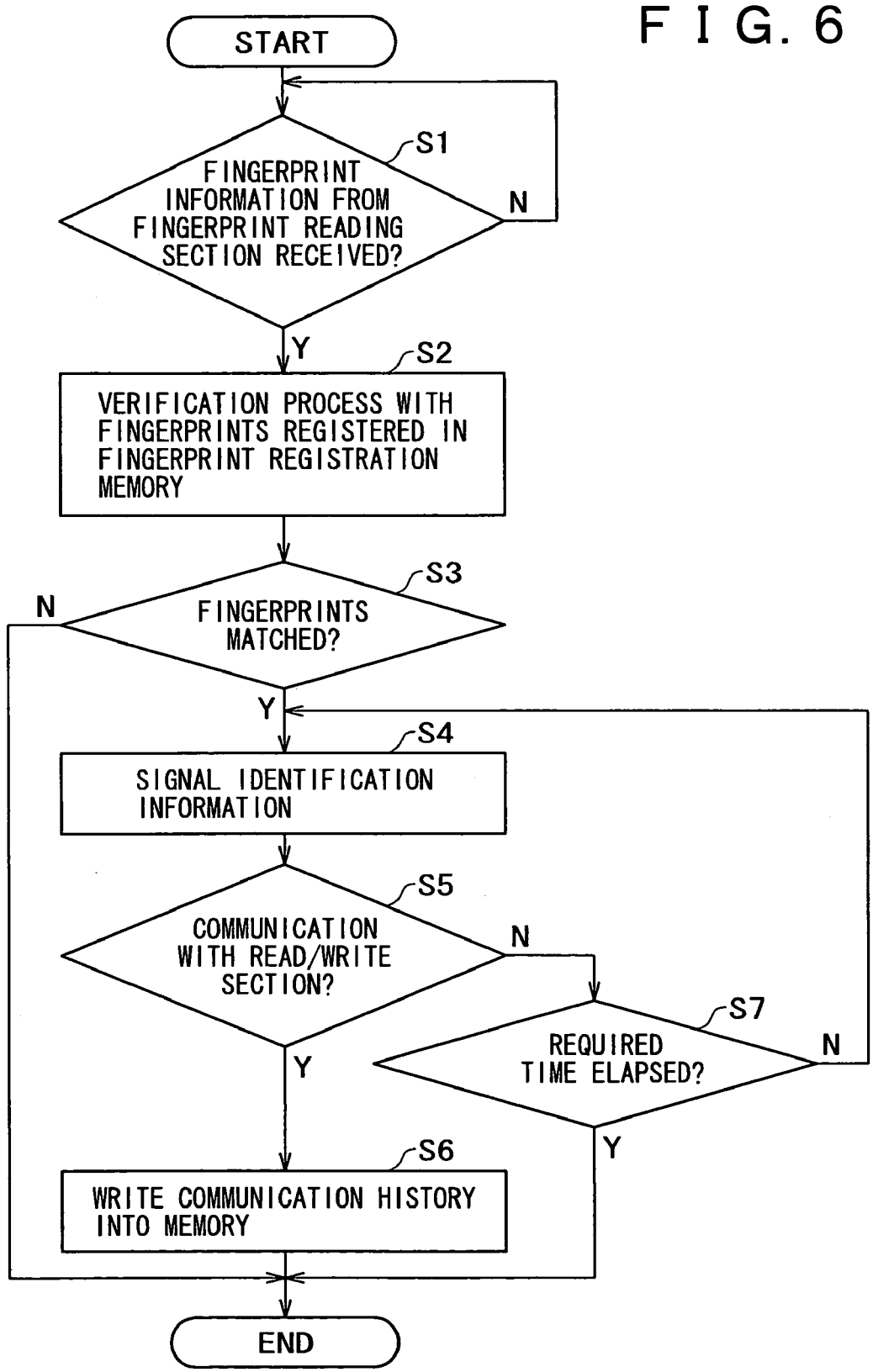
FIG. 6 is a flow chart illustrating operation of the embodiment of the electronic key device according to the present invention.

FIG. 6 is a flow chart illustrating a processing operation of the CPU 401 in this instance.

The CPU 401 waits for reception of fingerprint information from the fingerprint reading section 41 through the fingerprint reading section interface 409 (step S1). If it is discriminated that fingerprint information is received, then the CPU 401 reads out the fingerprint information of the owner registered in the fingerprint registration memory 408 and the fingerprint verification section 410 performs verification of the fingerprint (step S2).

Then, the CPU 401 discriminates whether or not the result of the discrimination of the fingerprint verification from the fingerprint verification section 410 matches with the fingerprints (step S3). If the fingerprints do not match with each other and the verification results in NG, then the processing is ended immediately and signaling of the electronic key information is not performed.

On the other hand, if the fingerprints match with each other, the verification results in OK. Then, the CPU 401 reads out the identification information from the identification information memory 405 and signals the identification information as electronic key information through the information sender/receiver circuit section 44 and the electromagnetic induction antenna 42 (step S4).

Then, the CPU 401 discriminates whether or not communication with a read/write section of the other party of the communication is performed (step S5). If predetermined information is received from the other party through the electromagnetic induction antenna 42, information sender/receiver circuit section 44, and sender/receiver interface 407, then the CPU 401 determines that communication with the other party is performed and writes a communication history into the communication history memory 406 (step S6). Thereafter, the CPU 401 ends the present processing routine.

If it is discriminated at step S5 that information from the read/write section of the other party is not received and communication is not performed, then the CPU 401 discriminates whether or not predetermined time determined in advance elapses after the electronic key information is signaled (step S7). If it is discriminated that the predetermined time does not elapse, then the processing returns to step S4, at which the CPU 401 sends the electronic key information again and waits for information from the other party. Then, if it is discriminated at step S7 that the predetermined time elapses, then the CPU 401 ends the processing routine immediately.

As described above, according to the IC card 40F as the electronic key device of the present example, since the fingerprint of the owner registered in advance and a fingerprint of a user are verified with each other and signaling of the electronic key information is performed only when the verification results in OK, the electronic key device can be used only by the user registered in advance. Thus, even if the electronic key device is lost, use of the electronic key device by any other user can be prevented.

Second Example of the Electronic Key Device

The electronic key device of the second example is an example of an IC card wherein an iris is used as organism information. FIG. 7A shows the surface of the IC card 40I of the present example. On the surface of the IC card 40I, the name and the ID number of the owner of the IC card 40I are indicated, and in the present example, a CCD camera (Charge Coupled Device) 45 is provided as means for reading an iris of the user.

FIG. 7B shows an example of an internal configuration of the IC card 40I. In the IC card 40I, an electromagnetic induction antenna 42, a controlling IC 43, and an information sender/receiver circuit section 44 are built similarly to the IC card 40F of the first example. Further, an image pickup signal processing circuit section 46 for processing a picked up image from the CCD camera 45 and supplying the processed picked up image to the controlling IC 43 is built in the IC card 40I.

The user uses the CCD camera 45 to pick up an image of an eye (iris) of the user itself. The CCD camera 45 fetches the picked up iris information of the user through the image pickup signal processing circuit section 46 and sends the fetched iris information to the controlling IC 43. The controlling IC 43 compares iris information of the owner of the IC card 40I registered in advance and stored and the fetched iris information with each other to discriminate whether or not they match with each other.

Then, if it is discriminated that they match with each other, then electronic key information stored in the memory in the controlling IC 43 in advance is signaled to the outside through the information sender/receiver circuit section 44 and the electromagnetic induction antenna 42. When the stored iris information and the fetched iris information are compared with each other, if it is discriminated that they do not match with each other, then the signaling of the electronic key information to the outside is inhibited.

Figure 8:
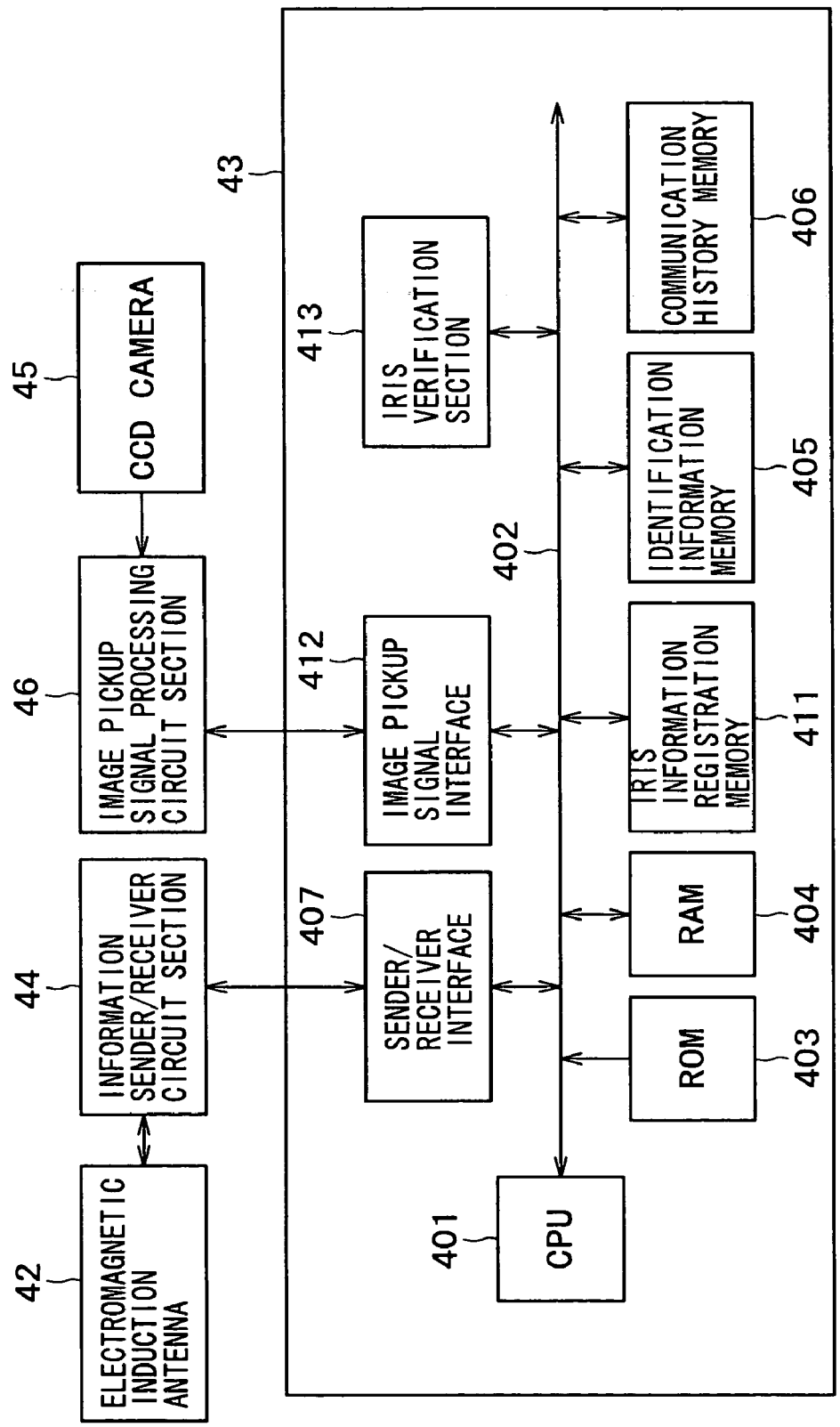
FIG. 8 is a block diagram showing an example of a configuration of the different embodiment of the electronic key device according to the present invention.

FIG. 8 shows an internal block configuration of the IC card 40I in the case of the second example. In the present second example, an iris information registration memory 411, an image pickup signal interface 412, and an iris verification section 413 are provided in place of the fingerprint registration memory 408, fingerprint reading section interface 409, and fingerprint verification section 410 of the first example of FIG. 1. The image pickup signal interface 412 is connected to the CCD camera 45. The configuration of the other part is similar to that of FIG. 5 of the first example.

In the iris information registration memory 411, information of an iris of the owner of the IC card 40I is registered in advance and stored. The image pickup signal interface 412 is provided to fetch iris information from the image pickup signal processing circuit section 46. The iris verification section 413 compares iris information acquired through the image pickup signal interface 412 and the iris information of the owner read out from the iris information registration memory 411 with each other. The iris verification section 413 discriminates whether or not they match with each other and signals the result of the discrimination to the system bus 402. The iris verification section 413 may have not a hardware configuration but a software configuration by the CPU 401.

Electronic key information is formed from the identification information read out from the identification information memory 405. The CPU 401 signals the electronic key information based on the result of the discrimination by the iris verification section 413 through the sender/receiver interface 407, information sender/receiver circuit 44, and electromagnetic induction antenna 41 when the irises match, that is, when the iris verification results in OK. However, when the result of the discrimination by the iris verification section 413 doesn't match with the irises, that is, when the iris verification results in NG, the CPU 401 inhibits signaling of the electronic key information.

Figure 9:
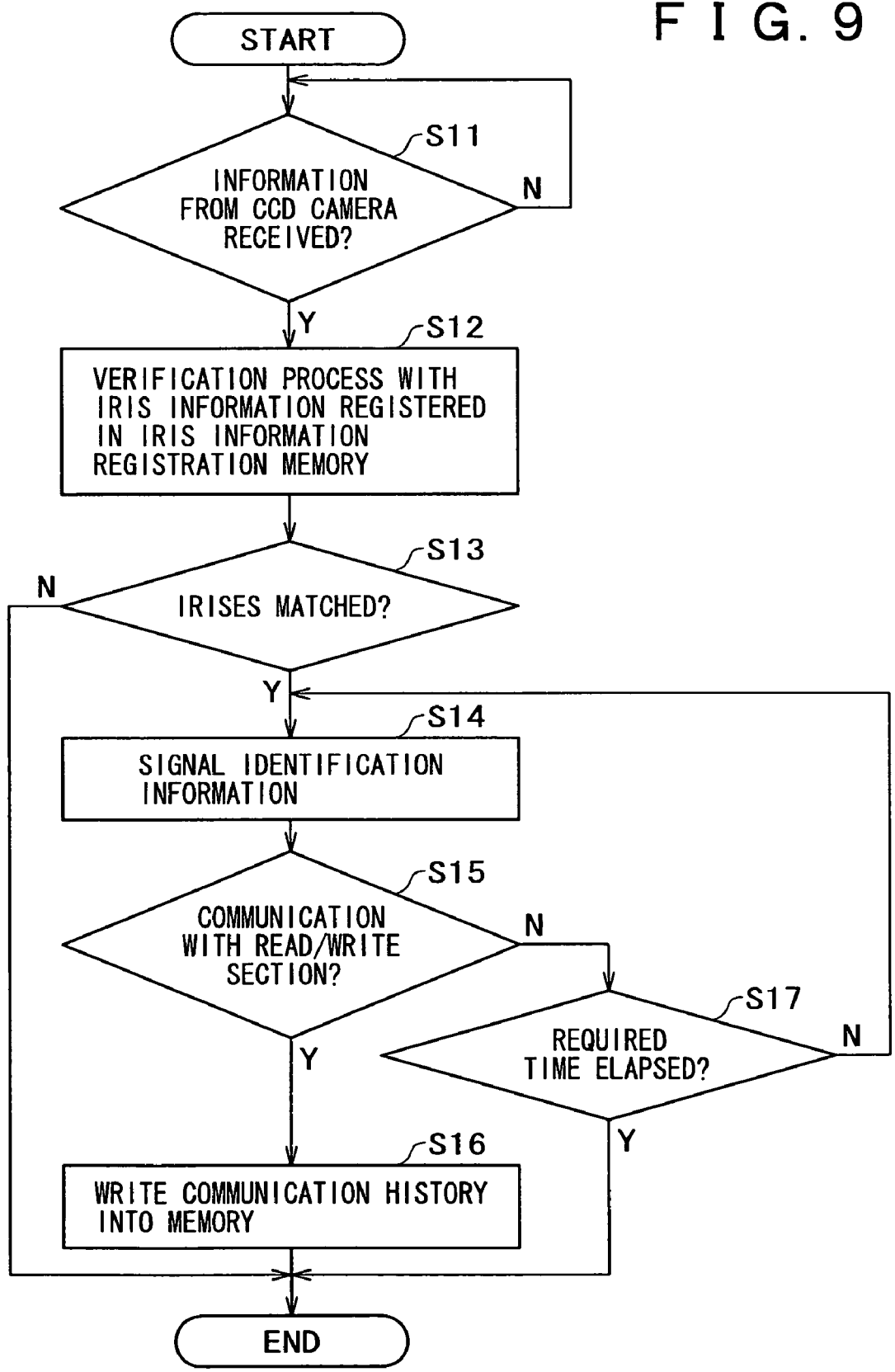
FIG. 9 is a flow chart illustrating operation of the different embodiment of the electronic key device according to the present invention.

FIG. 9 is a flow chart illustrating a processing operation of the CPU 401 in this instance.

The CPU 401 waits for reception of iris information from the image pickup signal processing circuit section 46 through the image pickup signal interface 412 (step S11). If it is discriminated that iris information is received, then the CPU 401 reads out the iris information of the owner registered in the iris information registration memory 411 and the iris verification section 413 performs verification of the irises (step S12).

Then, the CPU 401 discriminates whether or not the result of the discrimination of the iris verification from the iris verification section 413 matches with the irises (step S13). If the irises do not match with each other and the verification results in NG, then the processing is ended immediately and signaling of the electronic key information is not performed.

On the other hand, if the irises match with each other and the verification results in OK, then the CPU 401 reads out the identification information from the identification information memory 405. The CPU 401 signals the identification information as electronic key information through the information sender/receiver circuit section 44 and the electromagnetic induction antenna 42 (step S14).

Then, the CPU 401 discriminates whether or not communication with a read/write section of the other party of the communication is performed (step S15). If predetermined information is received from the other party through the electromagnetic induction antenna 42, information sender/receiver circuit section 44, and sender/receiver interface 407, then the CPU 401 determines that communication with the other party is performed. The CPU 401 writes a communication history into the communication history memory 406 (step S16). Thereafter, the CPU 401 ends the present processing routine.

If it is discriminated at step S15 that information from the read/write section of the other party is not received and communication is not performed, then the CPU 401 discriminates whether or not predetermined time determined in advance elapses after the electronic key information is signaled (step S17). If it is discriminated that the predetermined time does not elapse, then the processing returns to step S14, at which the CPU 401 sends the electronic key information again and waits for information from the other party. Then, if it is discriminated at step S7 that the predetermined time elapses, then the CPU 401 ends the processing routine immediately.

As described above, according to the IC card 40I as the electronic key device of the present second example, the iris of the owner registered in advance and an iris of a user are verified with each other. The electronic key information is sent only when the verification results in OK. Therefore, only the user registered in advance can use the electronic key device. Thus, even if the electronic key device is lost, use of the electronic key device by any other user can be prevented.

Other Examples of Organism Information

In the examples described above, a fingerprint and an iris are used as the organism information. However, the organism information is not limited to them. For example, it is possible to use a venous pattern of the back of a hand as the organism pattern. In this instance, where a venous pattern of the back of a hand of the owner is registered and stored in place of the iris pattern and an image of a venous pattern of the back of a hand is picked up by the CCD camera 45 and fetched, the configuration of the IC card 40I of the second example can be used as it is.

It is to be noted that the organism information is not limited to the examples described above, but naturally any organism information can be utilized if it allows identification of an individual person and can be acquired by predetermined means.

[Configuration of the Door Lock Apparatus]

Figure 10A:
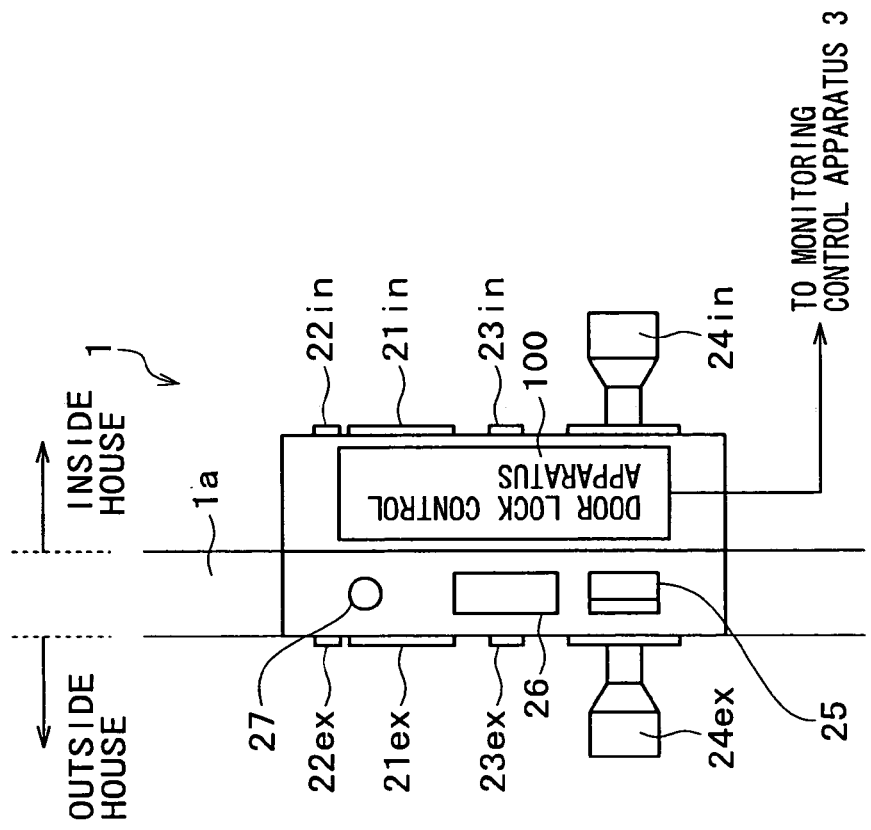
FIGS. 10A and 10B are views showing part of an example of a door lock apparatus forming the door lock control system of the embodiment.
Figure 10B:
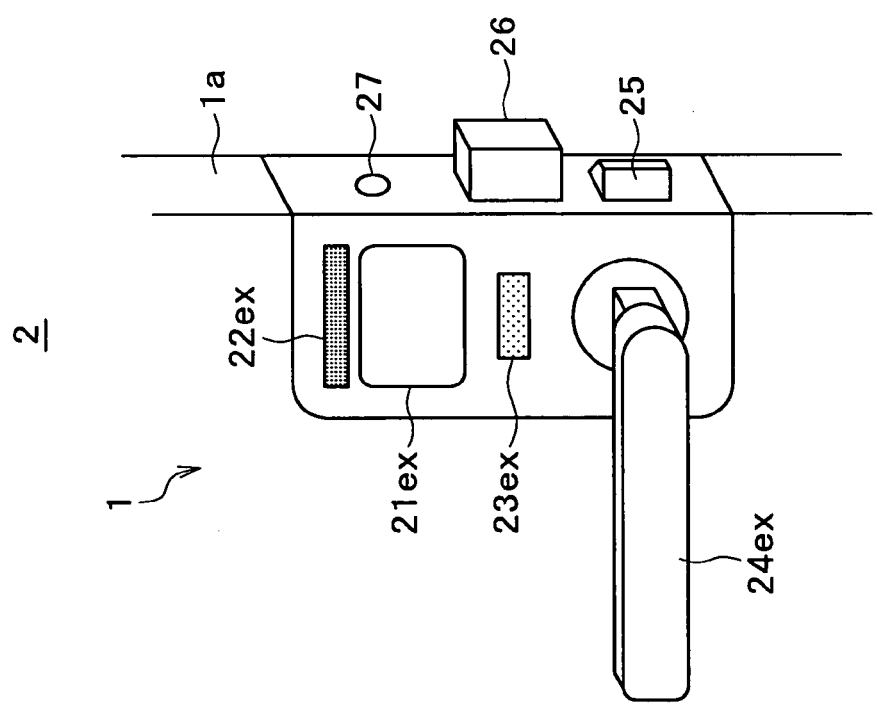

FIGS. 10A and 10B are views showing an example of a configuration of the door lock apparatus 2. FIG. 10A is a view where a location in the proximity of an attached portion of the door lock apparatus 2 of the entrance door 1 is viewed from the outside of the house. Meanwhile, FIG. 10B is a view where a location in the proximity of the attached portion of the door lock apparatus 2 of the entrance door 1 is viewed from an end face side of the entrance door 1.

In the door lock apparatus 2 of the present example, an outer side electronic key reader/writer section 21*ex* and an outer side LED (Light Emitting Diode) 22*ex* are provided on the outer side of the entrance door 1 (outdoor side). The outer side electronic key reader/writer section 21*ex* communicates with the IC card 40F or 40I as an example of an electronic key device. The outer side LED (Light Emitting Diode) 22*ex* as an example of an indication element gives a visual notification of the result of an authentication of electronic key information or locking or unlocking of the entrance door 1. Also, an outer side speaker 23*ex* and an outer side doorknob 24*ex* are provided on the outer side of the entrance door 1 (outdoor side). The outer side speaker 23*ex* gives a notification by sound of the result of an authentication of electronic key information or locking or unlocking of the entrance door 1.

Also on the inner side of the entrance door 1 (indoor side), an inner side electronic key reader/writer section 21*in* and an inner side LED 22*in* are provided. The inner side electronic key reader/writer section 21*in* communicates with the IC card 40F or 40I as an example of an electronic key device. The inner side LED 22*in* as an example of an indication element gives a visual notification of the result of an authentication of electronic key information or locking or unlocking of the entrance door 1. Also, an inner side speaker 23*in* and an inner side doorknob 24*in* are provided on the inner side of the entrance door 1 (indoor side). The inner side speaker 23*in* gives a notification by sound of the result of an authentication of electronic key information or locking or unlocking of the entrance door 1.

The entrance door 1 further has an entrance door stopping piece 25, a locking piece 26, and a door open/close sensor 27 provided thereon. Furthermore, a door lock control apparatus 100 for controlling operation of the door lock apparatus 2 is provided on the inner side of the entrance door 1. The electronic key reader/writer sections 21*ex* and 21*in*, LEDs 22*ex* and 22*in*, speakers 23*ex* and 23*in*, door open/close sensor 27, and a door lock mechanism driving section not shown are connected to the door lock control apparatus 100.

The entrance door stopping piece 25 is a member slidably moving in a direction perpendicular to an end face 1*a* of the entrance door in response to an operation of the door knob 24*ex* or the door knob 24*in*. This is provided in order that, when an automatic lock mode hereinafter described is not established, even if the entrance door 1 is not locked, the entrance door stopping piece 25 is fitted in a recess provided on an end face side of a wall opposed to the end face 1*a* of the entrance door 1 to stop the entrance door 1.

The locking piece 26 is a member forming part of the door lock mechanism. A door lock mechanism driving section not shown in FIGS. 10A and 10B drives the door lock mechanism. Then, the locking piece 26 is slidably moved in a direction perpendicular to the end face 1*a* of the entrance door. Thus, when the entrance door 1 is to be locked, the locking piece 26 is fixed to a state wherein it projects from the end face 1*a* of the entrance door 1 as seen in FIG. 10A, but when the entrance door 1 is to be unlocked, the locking piece 26 is fixed to another state wherein it does not project from the end face 1*a* of the entrance door 1.

It is to be noted that, though not shown, a recess in which the locking piece 26 is fitted when the locking piece 26 is in the projecting state is formed on the end face of the wall opposed to the end face 1*a* of the entrance door 1, and the state wherein the locking piece 26 is fitted in the recess is the locked state of the entrance door. Then, when the locking piece 26 is retracted to the entrance door 1 side and is not fitted in the recess, the locked state is cancelled and an unlocked state is established.

The door open/close sensor 27 is formed from, for example, an optical sensor. When the entrance door 1 is opened, the door open/close sensor 27 detects external light thereby to detect the opening of the entrance door 1. However, when the entrance door 1 is closed, the door open/close sensor 27 detects that the external light is interrupted as the end face 1*a* of the entrance door 1 is abutted with the end face of the wall thereby to detect the closing of the entrance door 1. In this manner, the door open/close sensor 27 detects opening and closing of the entrance door 1.

[Description of the Door Lock Control Apparatus 100]

Figure 11:
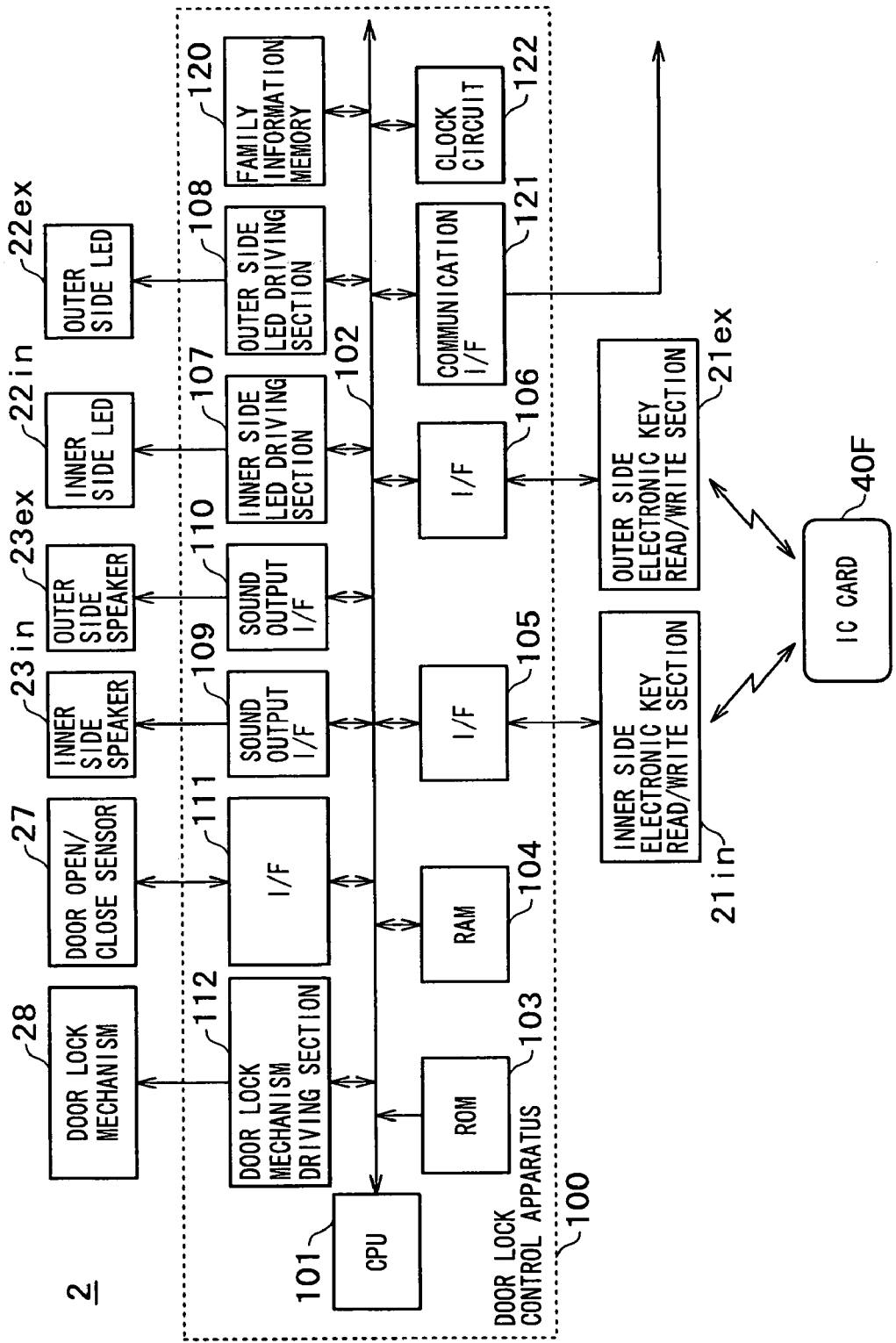
FIG. 11 is a block diagram showing an example of a configuration of the door lock control apparatus of the door lock apparatus of FIGS. 10A and 10B.

An example of an electric configuration of the door lock apparatus 2 around the door lock control apparatus 100 is shown in FIG. 11. It is to be noted that, in the following description, the IC card 40F of the first example, which performs a fingerprint verification process, is used as the electronic key device.

In particular, the door lock control apparatus 100 has a configuration of a microcomputer. A ROM (Read Only Memory) 103, a RAM (Random Access Memory) 104 for a working area, and a family information memory 120 are connected to a CPU (Central Processing Unit) 101 through a system bus 102. The ROM (Read Only Memory) 103 records programs and data. The family information memory 120 records identification information (in the present example, an IC manufacture order number) to be used as electronic key information for each of the members of the family. Also, a communication interface 121 and a clock circuit 122 are connected to the CPU 101 through the system bus 102. The communication interface 121 communicates with the monitoring control apparatus 3.

In the family information memory 120, genuine key information and backup key information registered in the management server apparatus 10 are registered and stored as electronic key information for each of the members of the family as hereinafter described. Further, information for identification of each of the members of the family, for example, the name, age, sex, family relationship, and other personal information, may be stored together in the family information memory 120. Such registration of electronic key information into the family information memory 120 is hereinafter described.

To the system bus 102, the inner side electronic key reader/writer section 21*in* and the outer side electronic key reader/writer section 21*ex* are connected through interfaces 105 and 106, respectively; the inner side LED 22*in* through an inner side LED driving section 107; the outer side LED 22*ex* through an outer side LED driving section 108; the inner side speaker 23*in* through a sound output interface 109; and the outer side speaker 23*ex* through a sound interface 110.

To the system bus 102, the door open/close sensor 27 is connected through an interface 111 and a door lock mechanism 28 for driving the locking piece 26 to slidably move is connected through a door lock mechanism driving section 112.

The electronic key reader/writer section 21*ex* or 21*in* forms a communication section for communicating with the IC card 40F (or 40I). The electronic key reader/writer section 21*ex* or 21*in* in the present example includes an electromagnetic induction antenna and an information sender/receiver section.

The door lock control apparatus 100 of the present example has two control modes of an automatic lock mode and a sequential lock mode as door lock control modes.

The automatic lock mode is a mode wherein the door lock control apparatus 100 automatically places the entrance door into a locked state after a predetermined interval of time. The automatic lock mode unlocks the entrance door 1 based on communication with the IC card 40F through the electronic key reader/writer sections 21*ex* and 21*in*. In the automatic lock mode, normally both of the electronic key reader/writer sections 21*ex* and 21*in* are used.

Meanwhile, the sequential lock mode is a mode wherein the locked or unlocked state of the entrance door is placed into the reverse state based on communication with the IC card 40F through at least the outer side electronic key reader/writer sections 21*ex* of the entrance door 1. Also in the sequential lock mode, both of the electronic key reader/writer sections 21*ex* and 21*in* can be used. However, where different manual locking means is used to lock the entrance door on the inner side, the locking or unlocking operation of the entrance door may be performed based only on communication with the IC card 40F through the outer side electronic key reader/writer section 21*ex*. This sequential lock mode is a mode conforming to a conventional method of locking and unlocking by means of a general key.

Selective setting of whether the door lock control mode of the door lock apparatus 2 should be set to the automatic lock mode or the sequential lock mode in the present example is performed through the monitoring control apparatus 3 by an operator as hereinafter described when the door lock apparatus 2 is attached.

Information of which one of the door lock control modes the door lock apparatus 2 is set to is stored in a nonvolatile memory not shown in the door lock control apparatus 100, and the door lock control apparatus 100 refers to the stored information of the nonvolatile memory to recognize whether the door lock control mode of the apparatus itself is the automatic lock mode or the sequential lock mode. A setting operation of the door lock control mode through the monitoring control apparatus 3 is hereinafter described.

It is to be noted that the selective setting of whether the door lock control mode of the door lock apparatus 2 is set to the automatic lock mode or the sequential lock mode may be performed not through the monitoring control apparatus 3 but directly by the door lock apparatus 2. For example, upon shipment of the door lock apparatus 2, the setting to one of the door lock control modes may be performed for the door lock apparatus 2. Further, inputting operation means which can be operated by an operator for installation of the door lock apparatus 2 such as, for example, a dip switch may be provided on the door lock apparatus 2. Setting of the door lock control mode may be performed through the inputting operation means.

[Description of the Appearance of the Monitoring Control Apparatus 3]

Figure 12:
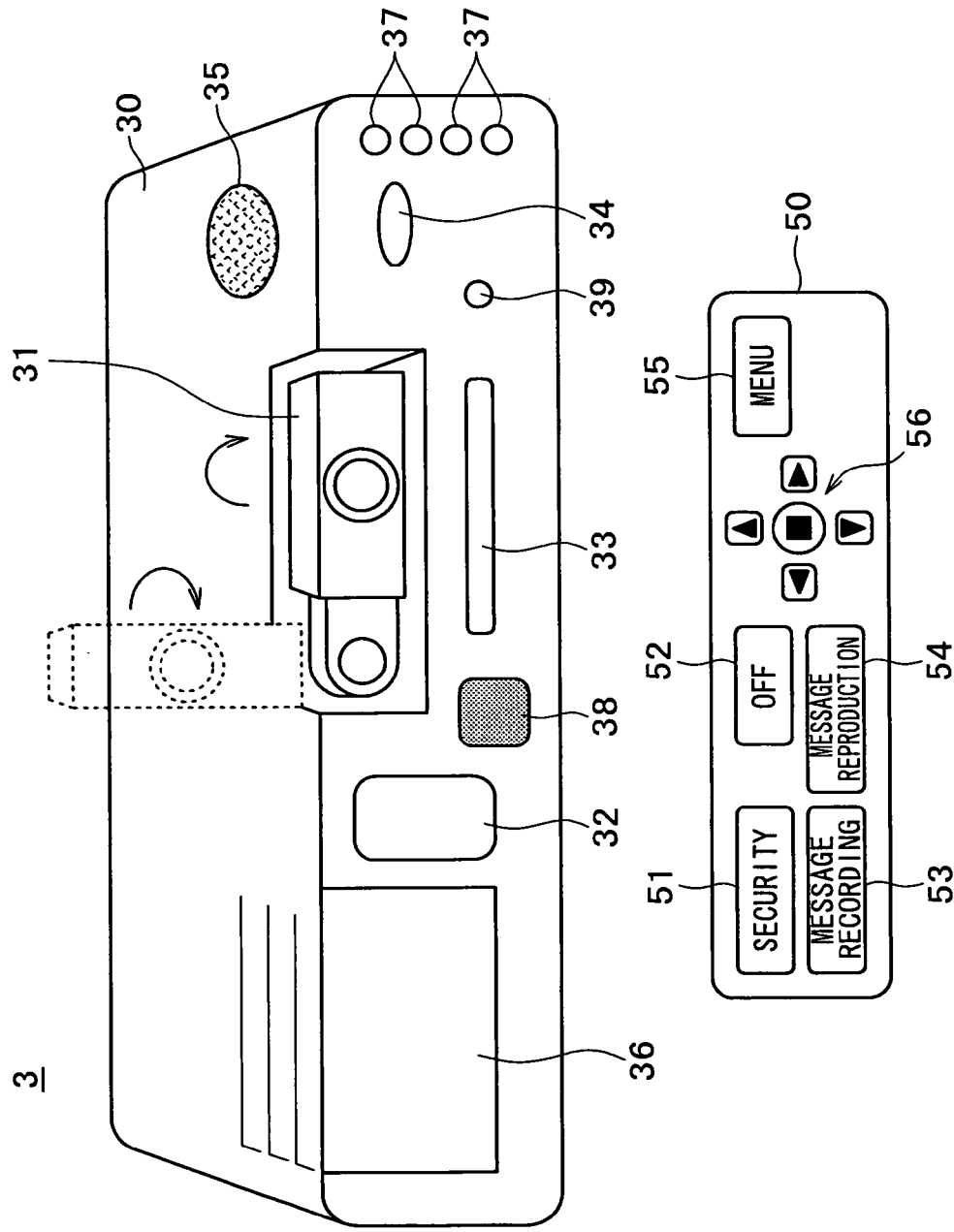
FIG. 12 is a view showing an example of a monitoring control apparatus used in a security system.

FIG. 12 is a view of an appearance showing a configuration of the monitoring control apparatus 3 for the security system provided in the room. The monitoring control apparatus 3 is configured so as to allow remote control thereof by a remote commander 50, which uses, for example, infrared rays or radio waves.

A video camera 31 is incorporated in a housing 30 of the monitoring control apparatus 3. The video camera 31 in the present example is attached to the housing 30 by a mechanism which allows the video camera 31 to assume both of a horizontally lying state indicated by solid lines and a vertically upright state indicated by broken lines. The video camera 31 starts image pickup in response to an instruction from the monitoring control apparatus 3 when the security mode is turned on.

Further, the image pickup direction by the video camera 31 can be changed, because the video camera is structured for adjustment in a swinging direction, by the adjustment of the structure. Accordingly, the user can perform adjustment of the image pickup direction by the video camera 31 before the security mode is turned on.

The housing 30 is provided with an image pickup lamp 32 for brightly illuminating an image pickup subject location of the video camera 31. Further, a human body sensor 33 for detecting, for example, far infrared rays to detect the human body is provided on the housing 30. When the human body sensor 33 detects the human body while the security mode is on, the monitoring control apparatus 3 detects it as invasion of a burglar. The monitoring control apparatus 3 turns on the image pickup lamp 32 and sends a picked up image to a predetermined notification destination as hereinafter described.

Further, a microphone 34 and a speaker 35 are provided on the housing 30. The microphone 34 is for collecting voice of a burglar or realistic sound in the room when a burglar intrudes. The speaker 35 is used to utter sound for threatening an intruding burglar and so forth.

Furthermore, an electronic key read/write section 36 is provided on the housing 30. The electronic key read/write section 36 in the present example is used upon recording and reproduction of a message. In particular, in the present embodiment, the monitoring control apparatus 3 is configured so as to serve also as a message apparatus. In particular, the electronic key read/write section 36 reads the IC card 40F serving as an electronic key device. Then, if a message recording button of the remote commander 50 is depressed as hereinafter described, a message can be left to the other party (someone in the family). Further, if a message reproduction button of the remote commander 50 is depressed, then a message destined for the depressing person can be reproduced.

A plurality of LEDs 37 are provided on the housing 30 for applications for notification of whether or not a message is recorded and so forth. Further, a receiver section 38 for a remote control signal from the remote commander 50 is provided on the housing 30.

Further, though not shown in FIG. 12, video output terminals to be connected to video input terminals of the television set 7 are provided on a rear panel of the monitoring control apparatus 3. Further, a remote control sender section 39 for controlling turning on/off of the power supply to the television set 7 and so forth is provided on the monitoring control apparatus 3.

Furthermore, the monitoring control apparatus 3 includes a sensor hub for connection of the fire sensor 4, gas sensor 5, window sensors 6a and 6b, and monitor camera. Further, as described hereinabove with reference to FIG. 3, the monitoring control apparatus 3 is configured so that it can access the management server apparatus 10 administrated by the management company of the security system through a telephone line.

Example of a Configuration of the Monitoring Control Apparatus 3

Figure 13:
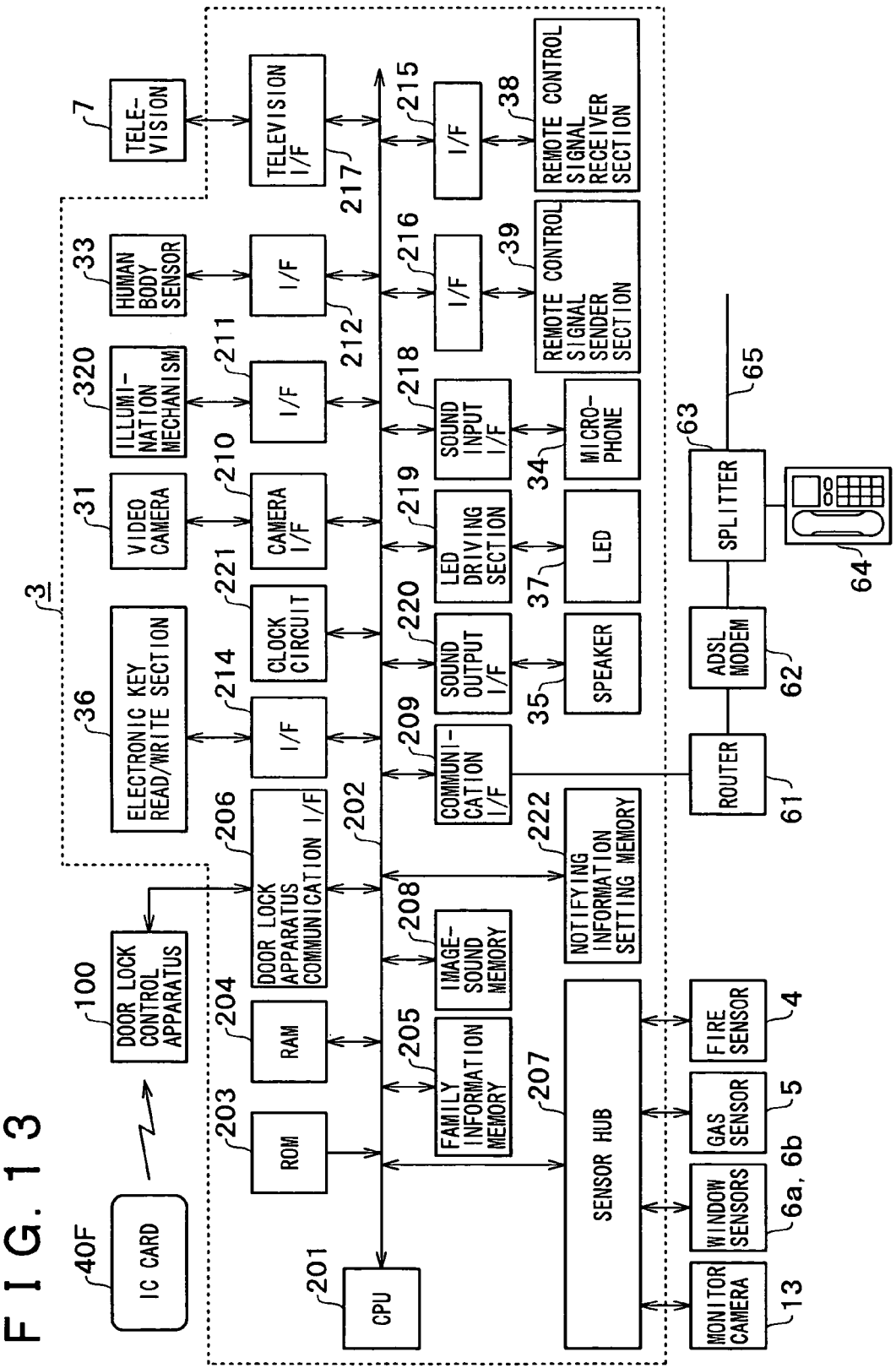
FIG. 13 is a block diagram showing an example of a configuration of the monitoring control apparatus of FIG. 12.

An internal configuration of the monitoring control apparatus 3 and an example of a configuration of a connection state between the monitoring control apparatus 3 and peripheral equipments are shown in FIG. 13.

The monitoring control apparatus 3 has a configuration of a microcomputer, and a ROM 203 in which programs and data are recorded, and a RAM 204 for a working area are connected to a CPU 201 through a system bus 202. Further, a family information memory 205, a door lock apparatus communication interface 206, the sensor hub 207, an image-sound memory 208, and a communication interface 209 are connected to the CPU 201 through the system bus 202. The family information memory 205 stores identification information to be used as electronic key information of all of the members of the family similarly to the family information memory 120 of the door lock control apparatus 100. Each of the family owns the IC card 40F or 40I as an electronic key device. The door lock apparatus communication interface 206 communicates with the door lock control apparatus 100. The image-sound memory 208 stores a picked up image of the video camera 31 and sound collected by the microphone 34. The communication interface 209 communicates with the management server apparatus 10 or the like through a telephone line.

To the system bus 202, the video camera 31 is connected through a camera interface 210; an illumination mechanism 320 of the image pickup lamp 32 through an interface 211; the human body sensor 33 through an interface 212; the electronic key read/write section 36 through an interface 214; the receiver section 38 for a remote control signal through an interface 215; the remote control sender section 39 through an interface 216; the microphone 34 through an interface 218; the LEDs 37 through an interface 219; and the speaker 35 is connected through a sound output interface 220.

Further, to the system bus 202, the television set 7 is connected through a television interface 217 formed from video signal output terminals. Furthermore, a clock circuit 221 and a notifying information setting memory 222 are connected to the system bus 202.

The family information memory 205 is formed from, for example, an EEPROM (Electrically Erasable Programmable ROM).

In the family information memory 205, identification information and personal information of each of the members of the family are stored. This is similar to the family information memory 120 in the door lock control apparatus 100. In the present specification, information including identification information and personal information is referred to as personal profile information.

As hereinafter described, in the present example, an initial registration request is issued to the management server apparatus 10 by an installation manager when the door lock apparatus 2 and the monitoring control apparatus 3 are installed. In response to the request, personal profile information of all of the members of the family is sent from the management server apparatus 10 and automatically registered into the monitoring control apparatus 3. Then, the monitoring control apparatus 3 transfers at least the personal identification information from within the personal profile information as electronic key information to the door lock control apparatus 100. The door lock control apparatus 100 registers the electronic key information into the family information memory 120.

FIG. 14 illustrates an example of personal profile information for one person. As seen in FIG. 14, personal identification information and personal information are stored in the personal profile information to coordinate each other. In the present embodiment, for the personal identification information, identification information stored in the memory of each electronic key device is used. Coordination of the personal identification information with the personal information discriminates the identification information of each member. The identification information serves as electronic key information as described hereinabove, and genuine key information and backup key information can be registered as electronic key information as seen in FIG. 14. Registration of a plurality of pieces of backup key information may be permitted.

In the example of FIG. 14, personal information is information other than personal identification information, and password information, name, address, date of birth, age, family relationship, registration date, bank account number, telephone number, electronic mail address, IP address, hobby/preference information, coming in/going out history information through the entrance 8 of the house, electronic key registration-loss history information, and so forth are stored in the family information memory 205.

As the coming in/going out history information of the present example, going out time and coming home time are stored, and an at/out-of-home flag representative of whether the person is out of home or at home is included in the coming in/going out history information. The monitoring control apparatus 3 uses the coming in/going out history information to manage coming in/going out of the family through the entrance door 7. Meanwhile, the electronic key registration-loss history information registers the backup key information or deleted electronic key information. When a backup registration request or deletion request for electronic key information from the management server apparatus 10 is received, a backup registration or deletion process is performed. The electronic key registration-loss history information discriminates between the backup registration and the deletion and stores thereof with the date and hour of the process.

Furthermore, in the present example, also the family information memory 205 stores information for the security mode. In particular, in the present example, the monitoring control apparatus 3 is configured such that the security level can be changed in response to an at-home situation of the members of the family. FIG. 15 is a table illustrating a relationship between the security level and the at-home situation of the members of the family. Meanwhile, FIG. 16 is a table illustrating a coordination relationship between the security level and contents of the security.

As seen in FIG. 16, as the security level in the present example, the level A, level B, level C, and level D are available in the descending order in security level. At the level A, all of monitoring of the windows and the entrance door, monitoring of a fire and leak of gas, and monitoring by the video camera 31 are performed. At the level B, the monitoring of the windows and the entrance door and the monitoring of a fire and leak of gas are performed without performing the monitoring by the video camera 31. At the level C, only the monitoring of a fire and leak of gas is performed. At the level D, no monitoring is performed.

Further, the security levels are allocated to different at-home situations of the members of the family as seen in FIG. 15. In particular, in the example illustrated, in the situation wherein the father is at home, the level D wherein no monitoring is performed is used. In the situation wherein the father is out of home but the mother is at home, the level C wherein only the monitoring of a fire and leak of gas is performed is used. In the situation wherein only the child is at home, the level B wherein the monitoring of the windows and the entrance door and the monitoring of a fire and leak of gas are performed is used. In the situation wherein all of the members are out of home, the level A wherein all of the monitoring is performed is used.

When the security mode is to be turned on or when the security mode is to be changed, the monitoring control apparatus 3 refers to the tables of FIGS. 15 and 16 to determine a security level in accordance with the at-home situation.

The relationship between the security levels of FIG. 15 and the at-home situations of the members of the family can be set in advance. However, also it is possible for the user, for example, to use the remote commander 50 to perform inputting and setting to the monitoring control apparatus 3 to change the setting.

It is to be noted that naturally the table information of FIGS. 15 and 16 may be stored not into the family information memory 205 but into a different memory.

The door lock apparatus communication interface 206 is connected to the door lock control apparatus 100. To the sensor hub 207, the fire sensor 4, gas sensor 5, window sensors 6a and 6b, and the single or plural monitor cameras 13 are connected.

The image-sound memory 208 includes a monitoring information area and a message information area. The monitoring information area buffers image information picked up by the video camera 31 and sound information collected by the microphone 34 when the security mode is on. The message information area stores image information and sound information recorded as a message. Also an image storage area for the monitor cameras 13 is provided in the monitoring information area.

The monitoring information area in this example stores image information and sound information for a predetermined period of time, for example, for 30 seconds, in a so-called ring buffer form. It is to be noted that naturally it is possible to form the monitoring information area and the message information area as separate memories from each other.

The communication interface 209 in the present example is connected to a router 61. The router 61 is connected to a telephone line 65 through an ADSL modem 62 and a splitter 63. A telephone terminal 64 is connected to the splitter 63.

The clock circuit 221 signals present time information to the system bus 202. The present time information includes so-called calendar information such as the year, month, day, and day of the week.

The notifying information setting memory 222 stores setting information such as a scheduled coming home person, a scheduled going out person, scheduled coming home time, scheduled going out time, notification informing person, and so forth set by the user using the remote commander 50 as hereinafter described. The CPU 201 notifies the set notification informing person of a coming home situation and coming home time or a going out situation and going out time of the scheduled coming home person or the scheduled going out person. Setting operation and notifying information operation are hereinafter described.

[Description of the Remote Commander 50]

The remote commander 50 for the monitoring control apparatus 3 includes, as shown in FIG. 12, a security button 51, an off button 52, a message recording button 53, a message reproduction button 54, a menu button 55, and a cursor button 56. The cursor button 56 includes four keys for performing selection of the upward, downward, leftward, and rightward directions and a central enter key.

As menu items in the present example, registration of a personal ID as electronic key information into the management server apparatus 10, setting of a door lock control mode of the door lock apparatus 2, and so forth are prepared. Application programs for executing processes corresponding to the individual menu items are stored in the ROM 203 of the monitoring control apparatus 3.

[Configuration of the Management Server Apparatus 10]

Figure 17:
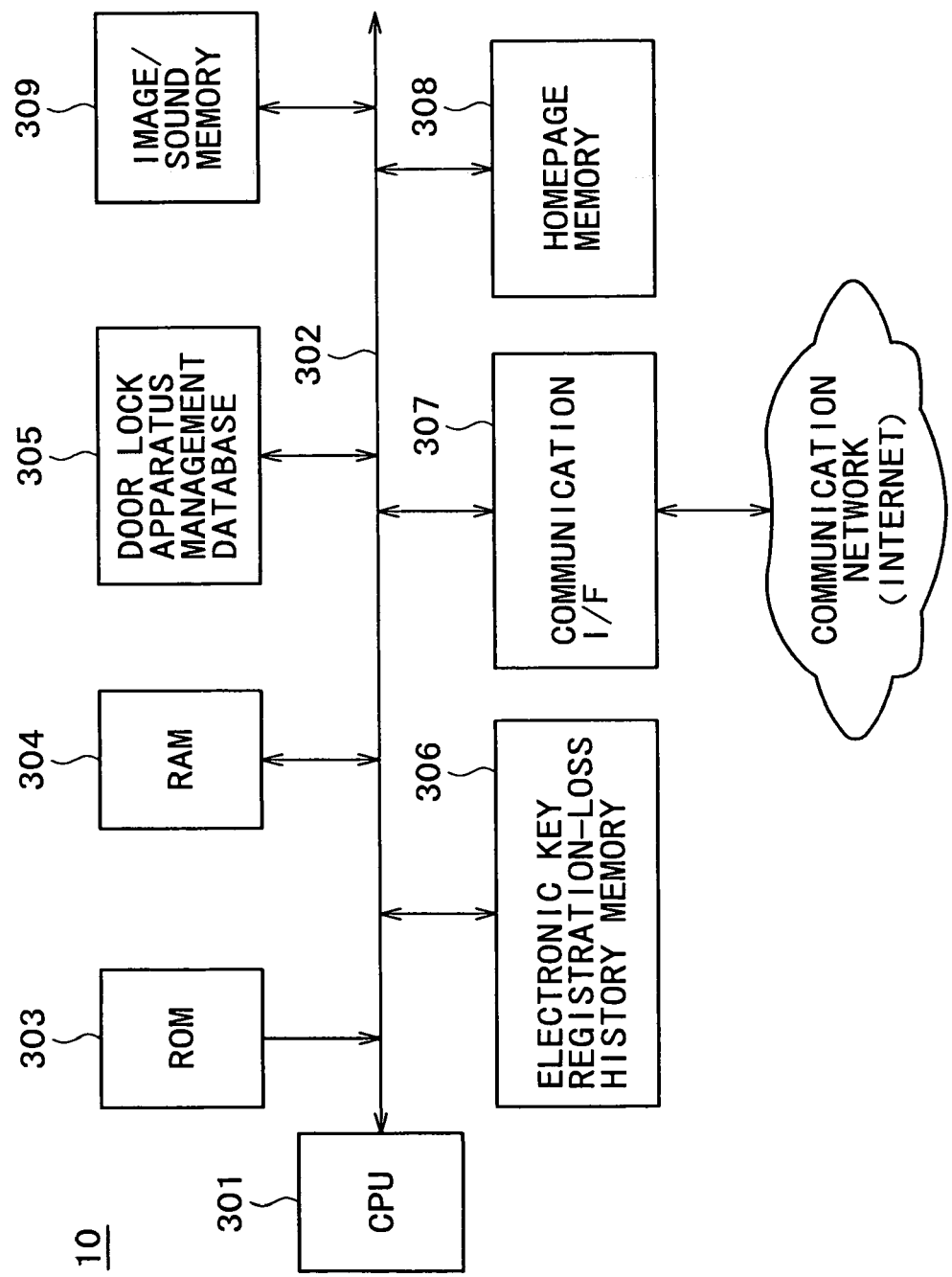
FIG. 17 is a block diagram showing an example of a configuration of a management server apparatus.

An example of a configuration of the management server apparatus 10 is shown in FIG. 17. The management server apparatus 10 has a configuration of a computer. A ROM 303 in which programs and data are recorded, a RAM 304 for a working area, a door lock apparatus management database 305, an electronic key registration-loss history memory 306, and a communication interface 307 for performing communication through a communication network such as the Internet are connected to a CPU 301 through a system bus 302. Further, a homepage memory 308 and an image-sound memory 309 are connected to the system bus 302.

The door lock apparatus management database 305 has stored therein items necessary for management of the door lock apparatus.2 such as serial numbers of the door lock apparatus 2 and the monitoring control apparatus 3, addresses at which the door lock apparatus 2 and the monitoring control apparatus 3 are installed, a telephone number, an IP address, the name of the user of the door lock apparatus, registered electronic key information, and personal profile information. The telephone number and the IP address are address information of the door lock apparatus 2 and the monitoring control apparatus 3 on the communication network 9.

The electronic key registration-loss history memory 306 has stored therein a history of registration and loss of electronic key information for each door lock apparatus 2. The homepage memory 308 has display information of each page of a homepage stored therein, and display information of a required page is read out from the homepage memory 308 and signaled to the communication network through the communication interface 307 in accordance with an instruction of the CPU 301.

The image-sound memory 309 stores image-sound information sent thereto from the security monitoring system as hereinafter described. The management server apparatus 10 checks image-sound information from the security monitoring system and issues the notification to the security company or provides image-sound information through the homepage in response to the request of the user.

Now, various operations of the communication system having such a configuration as described above are described.

Figure 18:
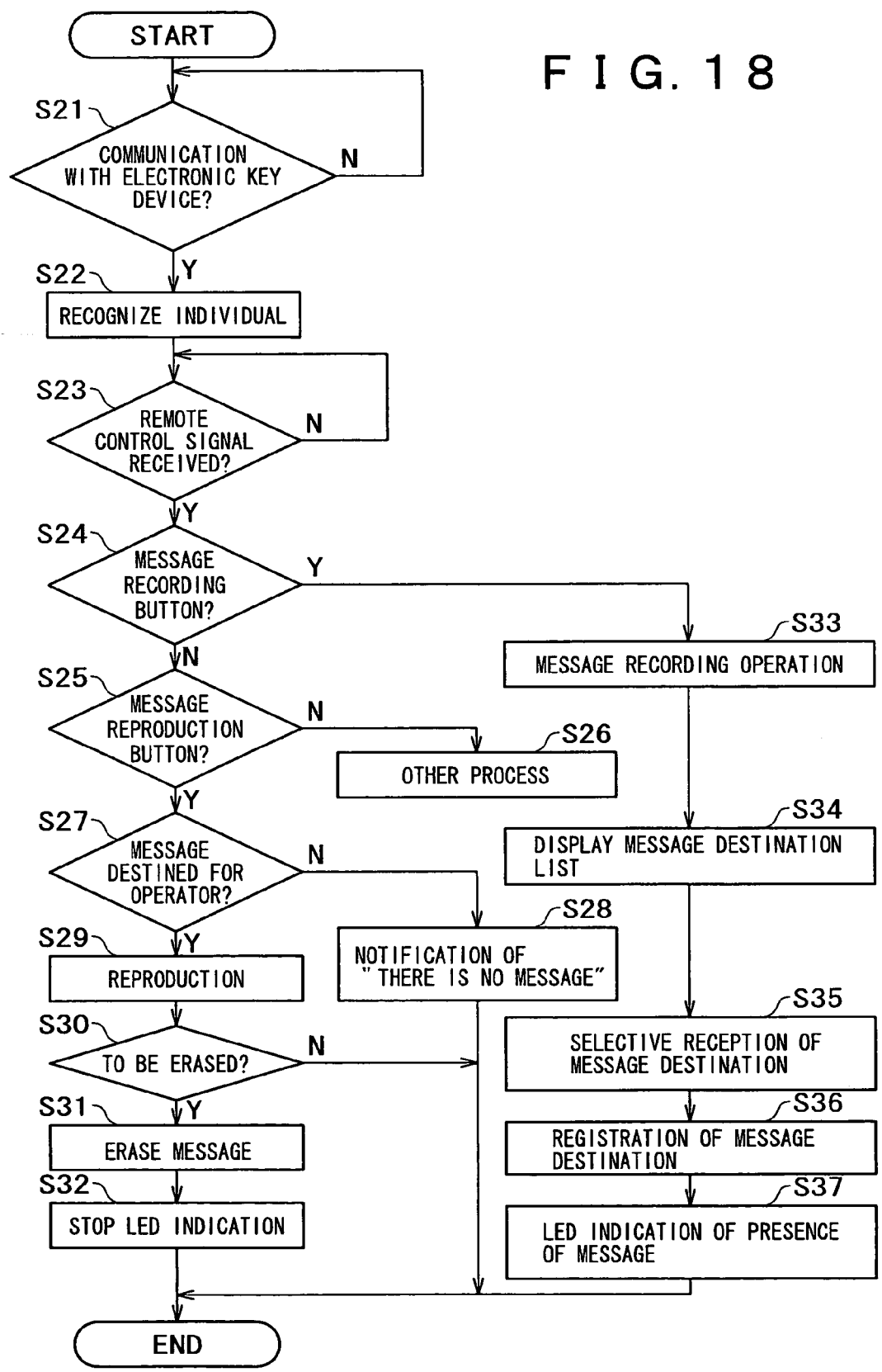
FIG. 18 is a flow chart illustrating a message recording and reproduction function of the monitoring control apparatus of FIG. 12.

[Message Recording and Message Reproduction of the Monitoring Control Apparatus 3; FIG. 18]

As described hereinabove, the monitoring control apparatus 3 of the present example can use an electronic key device, in the present example, an IC card 40F and the remote commander 50 to designate a particular member of the family and leave a message to the member. When a message is recorded in the monitoring control apparatus 3, one of the LEDs 37 is lit or flickers to give a notification of such recording.

A member of the family who comes back home causes the electronic key read/write section 36 to read the IC card 40F as the electronic key device of the member itself and inputs an instruction to reproduce the message. If a message is recorded in the monitoring control apparatus 3, the recorded message is destined for the member. Then, the monitoring control apparatus 3 reproduces the recorded message through the television receiver 7 or the speaker 35.

FIG. 18 is a flow chart illustrating a process of the monitoring control apparatus 3 for the message recording and reproduction. The CPU 201 executes processes at steps S of FIG. 18 in accordance with a program stored in the ROM 203.

First, in order to perform message recording or message reproduction, the user would hold up the IC card 40F of the user itself to the electronic key read/write section 36 so as to perform communication. The CPU 201 discriminates whether or not the electronic key read/write section 36 communicates with the IC card 40F (step S21). If it is discriminated that the communication is performed, then the CPU 201 recognizes based on received identification information with whose IC card 40F the communication is performed (step S22).

Then, the CPU 201 waits that a remote control signal from the remote commander 50 arrives thereat (step S23). If it is confirmed that a remote control signal arrives, then the CPU 201 discriminates whether or not the remote control signal is originated from operation of the message recording button 53 (step S24). If it is discriminated that the remote control signal is originated from operation of the message recording button 53, then the CPU 201 performs a message recording operation (step S33).

In the message recording operation, the monitoring control apparatus 3 fetches image information of the message providing person picked up by the video camera 31 through the camera interface 210 and stores the image information into the message recording area of the image-sound memory 208. Further, the monitoring control apparatus 3 fetches message voice information (message) collected by the microphone 34 through the interface 218 and stores the message voice information into the message recording area of the image-sound memory 208. At this time, the image information and the sound information are stored in a coordinated relationship with the identification information read from the electronic key device 40 into the image-sound memory 208 together with the identification information.

Then, the CPU 201 refers to the personal profile information of the families stored in the image-sound memory 208 to display a list of message destination parties other than the operator who tries to record a message on the screen of the television receiver 7 (step S34). At this time, if the power supply to the television receiver 7 is not on, then a remote control signal for turning on the power supply is supplied through the remote control sender section 38 to the television receiver 7 to turn on the power supply to the television receiver 7. It is to be noted that the screen of the list of message destination parties may be displayed in an overlapping relationship with an image of a television program, for example, using a superimpose technique or may be displayed as a sole screen without being overlapped with an image of a television program.

The operator would use the cursor key 56 of the remote commander 50 to perform selective inputting of the message destination party from within the list of message destination parties and then depress the central enter key of the cursor key 56. The CPU 201 of the monitoring control apparatus 3 receives the selective input of the message destination party (step S35) and then stores and registers information of the message destination party in a coordinated relationship with the image information and the voice message into the message recording area of the image-sound memory 208 (step S36). Then, in order to give a notification that a message is recorded, one of the LEDs 37 is turned on (step S37). A plurality of LEDs 37 are provided as shown in FIG. 12, and a number of ones of the LEDs 37 equal to the number of recorded messages are lit.

On the other hand, if it is discriminated at step S24 that the remote control signal is not originated from the message recording button 53, the CPU 201 discriminates whether or not the remote control signal is originated from an operation of the message reproduction button 54 (step S25). If it is discriminated that the remote control signal is not originated from an operation of the message reproduction button 54, then the CPU 201 performs a process corresponding to the operated button (step S26).

On the other hand, if it is discriminated at step S25 that the remote control signal is originated from an operation of the message reproduction button 54, then the CPU 21 uses the identification information recognized at step S22 as a keyword to search stored contents of the message recording area of the image-sound memory 208 to discriminate whether or not there is a message destined for the operator who has held up the IC card 40F to the electronic key read/write section 36 (step S27).

Then, if it is discriminated at step S27 that there is no message destined for the operator, then the CPU 201 causes, for example, character information of "There is no message" prepared in the ROM 203 in advance to be displayed on the screen of the television receiver 7 and to be uttered as voice through the speaker 35 to notify the operator (step S28).

On the other hand, if it is discriminated at step S27 that there is a message destined for the operator, then the CPU 201 reads out the message image and the message voice destined for the operator from the image-sound memory 208, displays the message image on the television receiver 7, and utters sound from the speaker 35 to reproduce them (step S29).

After the reproduction of the message comes to an end, the CPU 201 displays an inquiry regarding whether or not the message should be erased on the screen of the television receiver 7. Consequently, the operator would use the cursor key 56 of the remote commander 50 to select one of "YES" and "NO" included in the display screen. The CPU 201 discriminates from the selective input of the user whether or not the message should be erased (step S30). If it is discriminated that the message should be erased, then the CPU 201 erases the corresponding image-voice information of the image-sound memory 208 (step S31) and turns off one of those LEDs 37, which are in a lit state (step S32). Then, the CPU 201 ends the message recording and reproduction processing routine.

On the other hand, if it is discriminated at step S30 that the message should not be erased, the CPU 201 ends the message recording and reproduction processing routine immediately.

Figure 19:
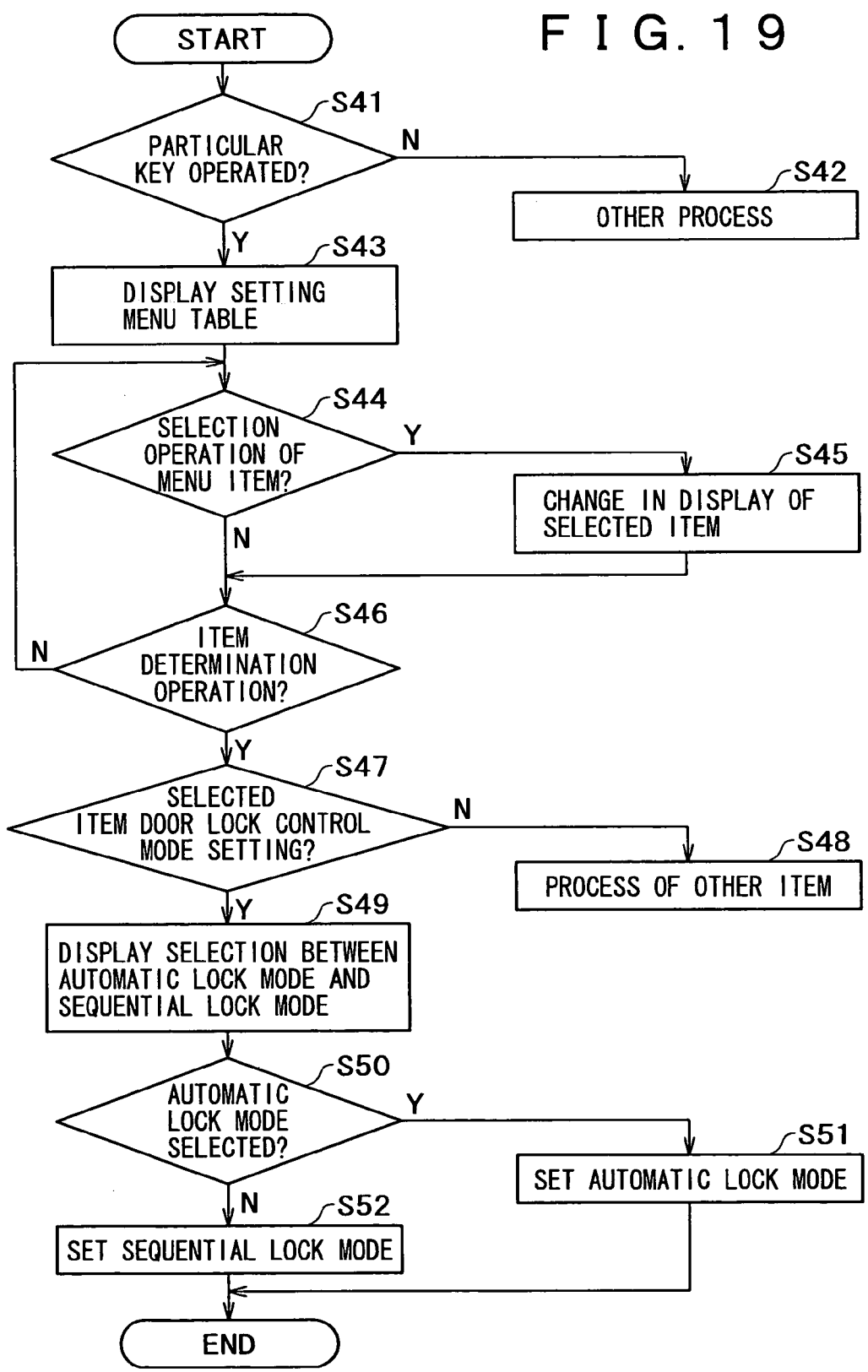
FIG. 19 is a flow chart illustrating a setting operation of a door lock control mode.
Figure 20:
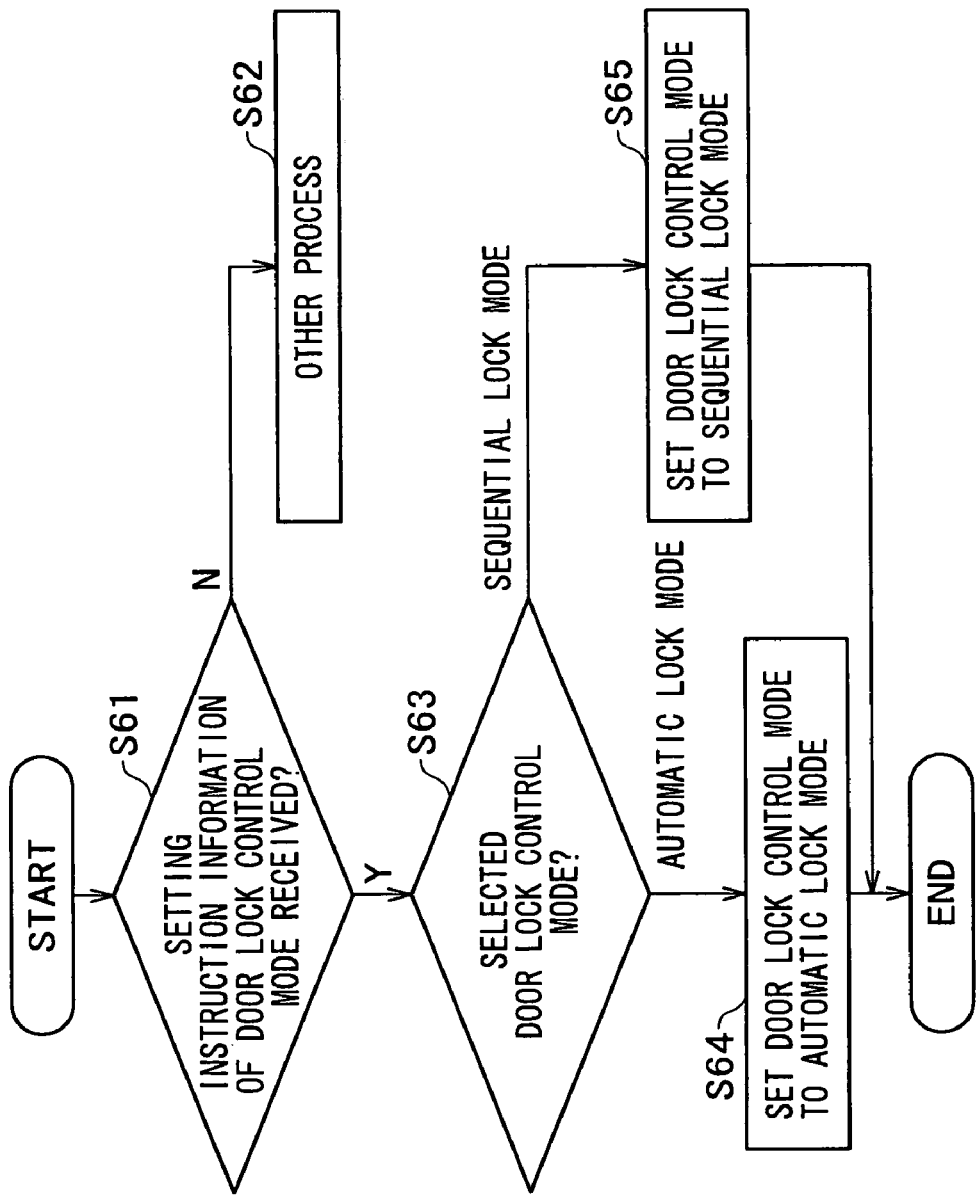
FIG. 20 is a flow chart illustrating the setting operation of the door lock control mode.

[Selective Setting of a Door Lock Control Mode; FIGS. 19 and 20]

As described hereinabove, in the present embodiment, since setting of a door lock control mode can be performed through the monitoring control apparatus 3, the setting operation is described with reference to a flow chart of FIG. 19.

First, the CPU 201 of the monitoring control apparatus 3 monitors the receiver signal of the remote control receiver section 38 to discriminate whether or not a particular button operation for a setting menu including setting of a door lock control mode is performed (step S41). In the present example, the particular button operation is not performed by an ordinary user and is, for example, a simultaneous operation of the security button 51 and the menu button 55. Such a particular button operation as just described is defined to perform a setting operation of the door lock apparatus 2 by an installation company. This is intended that a change of setting of a door lock control mode cannot be performed readily.

If it is discriminated at step S41 that the particular button operation is not performed, then the CPU 201 performs another process such as a process corresponding to an operation of a sole button (step S42). On the other hand, if it is discriminated at step S41 that the particular button operation is performed, the CPU 201 causes a table of setting menus to be displayed on the screen of the television receiver 7 similarly as in the case of recording and reproduction of a message described above (step S43).

In response to the display of the table of setting menus, the operator would use the cursor key of the remote commander 50 to perform selection of one of the setting menu items by which the operator wants to perform. The CPU 201 monitors the receiver signal of the remote control receiver section 38 to discriminate whether or not a selection operation of a menu item is performed (step S44). If it is discriminated that a selection operation of a menu item is performed, then the CPU 201 changes the selected item, which is displayed, for example, in a reverse display, in response to the selection operation (step S45). Then, the CPU 201 discriminates whether or not a determination operation of the setting item is performed (step S46). On the other hand, if it is discriminated at step S44 that a selection operation of a menu item is not performed, then the processing advances immediately to step S46, at which the CPU 201 discriminates whether or not a determination operation of the setting item is performed.

If it is discriminated at step S46 that a determination operation of the setting item is not performed, then the processing returns to step S44. On the other hand, if it is discriminated at step S46 that a determination operation of the setting item is performed, the CPU 201 discriminates whether or not the selected setting item is setting of a door lock control mode (step S47). If the selected setting item is not setting of a door lock control mode, then the CPU 201 executes a processing routine of the selected other setting item (step S48).

If it is discriminated at step S47 that the selected setting item is setting of a door lock control mode, then the CPU 201 causes a selection screen between the automatic lock mode and the sequential lock mode to be displayed on the screen of the television receiver 7 (step S49). The operator would use the cursor key 56 to perform selective inputting of one of the modes on the selection screen.

Thus, the CPU 201 monitors the remote control receiver section 38 to discriminate whether or not the automatic lock mode is selected (step S50). If it is discriminated that the automatic lock mode is selected, then the CPU 201 performs a setting operation of setting the door lock apparatus 2 to the automatic lock mode (step S51).

In particular, the CPU 201 stores information representative of the automatic lock mode into the storage area for a door lock control mode of the door lock apparatus 2 of the nonvolatile memory section built in the monitoring control apparatus 3. Further, the CPU 201 sends an instruction to establish the automatic lock mode to the door lock apparatus 2 through the door lock apparatus communication interface 206.

On the other hand, if it is discriminated at step S50 that the automatic lock mode is not selected, then the CPU 201 discriminates that the sequential lock mode is selected and performs a setting operation of setting the door lock apparatus 2 to the sequential lock mode (step S52).

In particular, the CPU 201 stores information representative of the sequential lock mode into the storage area for a door lock control mode of the door lock apparatus 2 of the nonvolatile memory section built in the monitoring control apparatus 3. Further, the CPU 201 sends an instruction to establish the sequential lock mode to the door lock apparatus 2 through the door lock apparatus communication interface 206.

With this, the operation of the monitoring control apparatus 3 upon setting of a lock control mode is ended.

Now, operation of the door lock control apparatus 100, which receives instruction information of a door lock control mode sent thereto through the door lock apparatus communication interface 206, is described with reference to a flow chart of FIG. 20.

First, the CPU 101 of the door lock control apparatus 100 discriminates whether or not setting instruction information of a door lock control mode is received from the monitoring control apparatus 3 (step S61). If such setting instruction information is not received, then the CPU 101 performs some other process (step S62).

If it is discriminated at step S61 that setting instruction information of a door lock control mode is received from the monitoring control apparatus 3, then the CPU 101 discriminates whether the door lock control mode of the selection instruction is the automatic lock mode or is the sequential lock mode (step S63).

If it is discriminated at step S63 that the door lock control mode of the selection instruction is the automatic lock mode, then the CPU 101 performs a process of setting the door lock control mode of the door lock apparatus 2 to the automatic lock mode (step S64).

In particular, at step S64, the CPU 101 of the door lock control apparatus 100 renders both of the inner side electronic key read/write section 21*in* and the outer side electronic key read/write section 21*ex* of the door lock apparatus 2 active. In addition, the CPU 101 uses an application for the automatic lock mode from among applications for door lock control of the program ROM 13 based on the setting instruction of the automatic lock mode. Then, the CPU 101 stores information representative of the automatic lock mode into the storage area for a door lock control mode of the nonvolatile memory section provided in the door lock control apparatus 100.

On the other hand, if it is discriminated at step S63 that the door lock control mode of the selection instruction is the sequential lock mode, then the CPU 101 performs a process for setting the door lock control mode of the door lock apparatus 2 to the sequential lock mode (step S65).

In particular, at step S65, the CPU 101 of the door lock control apparatus 100 renders, in the present example, both of the inner side electronic key read/write section 21*in* and the outer side electronic key read/write section 21*ex* of the door lock apparatus 2 active. In addition, the CPU 101 uses an application for the sequential lock mode from among the applications for door lock control of the program ROM 13 based on the setting instruction of the sequential lock mode. Then, the CPU 101 stores information representative of the sequential lock mode into the storage area for a door lock control mode of the nonvolatile memory section provided in the door lock control apparatus 100.

It is to be noted that, in the present example, both of the inner side electronic key read/write section 21*in* and the outer side electronic key read/write section 21*ex* are used also in the sequential lock mode. In the sequential lock mode, it is possible to render only the outer side electronic key read/write section ex active while the inner side electronic key read/write section 21*in* is not used. In this instance, although locking from the inner side of the house matters, for example, a configuration wherein locking of the entrance door from the inner side can be performed by a manual operation without using an electronic key device may be used.

Now, operations of the door lock apparatus 2 in both of the automatic lock mode and the sequential lock mode are described. An operation at each step S of the flow chart described below is a processing operation executed principally by the CPU 101 of the door lock control apparatus 100.

[Automatic Lock Mode; FIGS. 21 to 26]

Operation in the automatic lock mode is described with reference to flow charts of FIGS. 21 to 26. When the door lock control mode is the automatic lock mode, the entrance door 1 is held in a locked state in its steady state. Then, the electronic key device 40 is held up to the inner side electronic key read/write section 21*in* or the outer side electronic key read/write section 21*ex*, and communication between them is performed. If the identification information, that is, the electronic key information, is authenticated successfully, the door lock control apparatus 100 controls the entrance door. The entrance door is unlocked for a predetermined period of time and, after the predetermined period of time, the entrance door 1 is placed back into a locked state automatically.

The CPU 101 monitors the inner side electronic key read/write section 21*in* and the outer side electronic key read/write section 21*ex* through the interfaces 105 and 106 and waits until an electronic key device 40 is held up to the inner side electronic key read/write section 21*in* or the outer side electronic key read/write section 21*ex*, whereupon communication between the electronic key device 40 and the inner side electronic key read/write section 21*in* or the outer side electronic key read/write section 21*ex* is performed (step S71).

Then, if it is discriminated at step S71 that an IC card 40F is held up to and communicates with the read/write section 21*in* or 21*ex*, then the CPU 101 receives identification information from the IC card 40F and temporarily stores the identification information, for example, into the RAM 104 or the like (step S72). At this time, also time information of the clock circuit 122 provided in the door lock control apparatus 100 is stored as time at which communication is performed into the RAM 104 together with the identification information mentioned above. Further, the time information is supplied to the IC card 40F and written into the memory of the controlling IC 42.

Further, the ID or the like of the other party of the communication is written into the memory of the controlling IC 42. The ID indicates information that which one of the inner side electronic key read/write section 21*in* and the outer side electronic key read/write section 21*ex* the communication is performed.

Then, the CPU 101 discriminates whether the IC card 40F communicates with the inner side electronic key read/write section 21*in* or communicates with the outer side electronic key read/write section 21*ex* (step S73). The result of the discrimination and the time information of the communication described above are written as communication history information also into the recording area of the family information memory 120 for the member of the family corresponding to the identification information. Further, the identification information, the communication time, and the result of discrimination whether the IC card 40F communicates with the inner side electronic key read/write section 21*in* or communicates with the outer side electronic key read/write section 21*ex* are transferred also to the monitoring control apparatus 3 so as to be stored into the family information memory 205 of the monitoring control apparatus 3.

Figure 21:
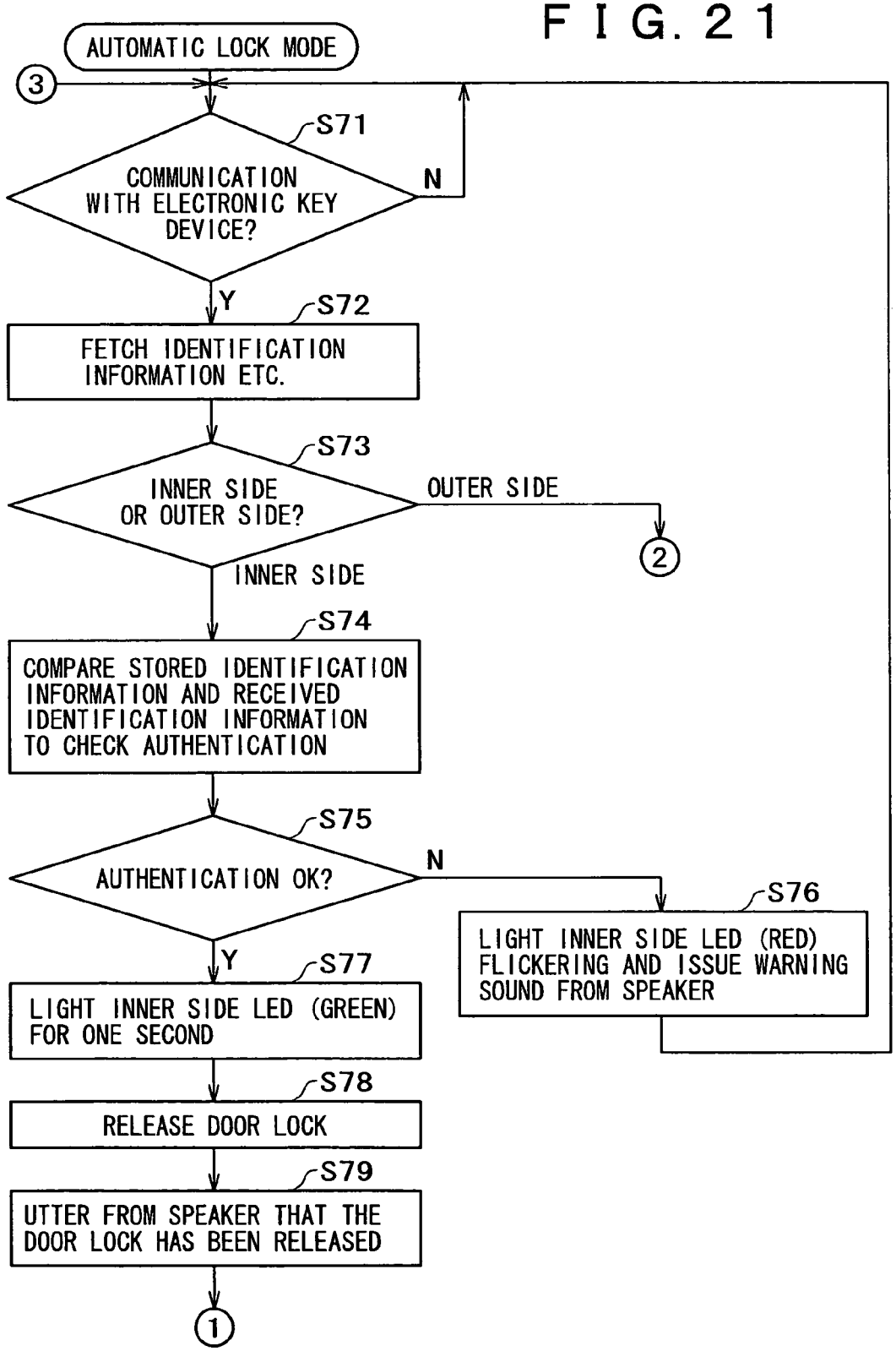
FIG. 21 is part of a flow chart illustrating a door lock control operation in an automatic lock mode, which is an example of the door lock control mode.
Figure 22:
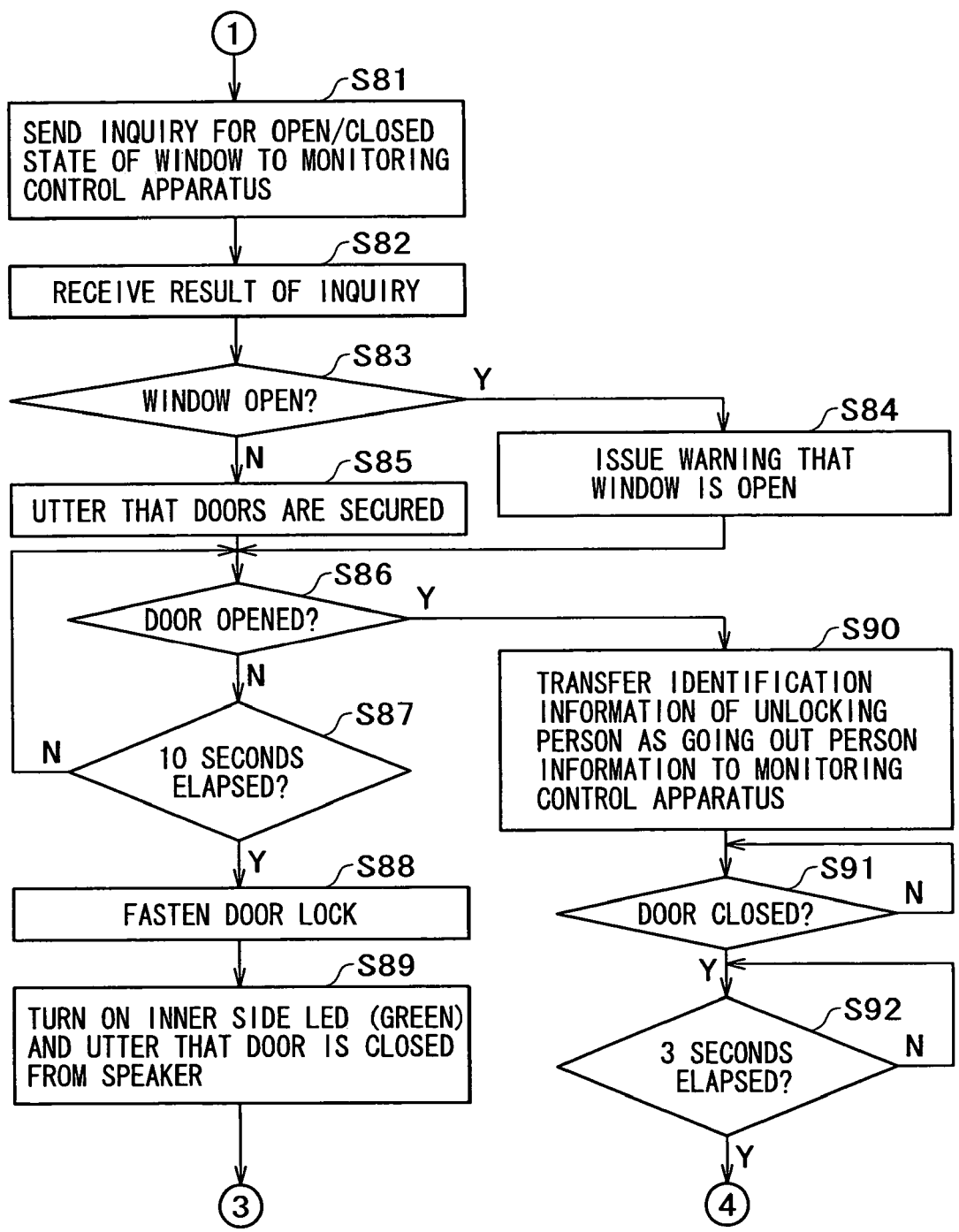
FIG. 22 is part of the flow chart illustrating the door lock control operation in the automatic lock mode, which is an example of the door lock control mode.
Figure 23:
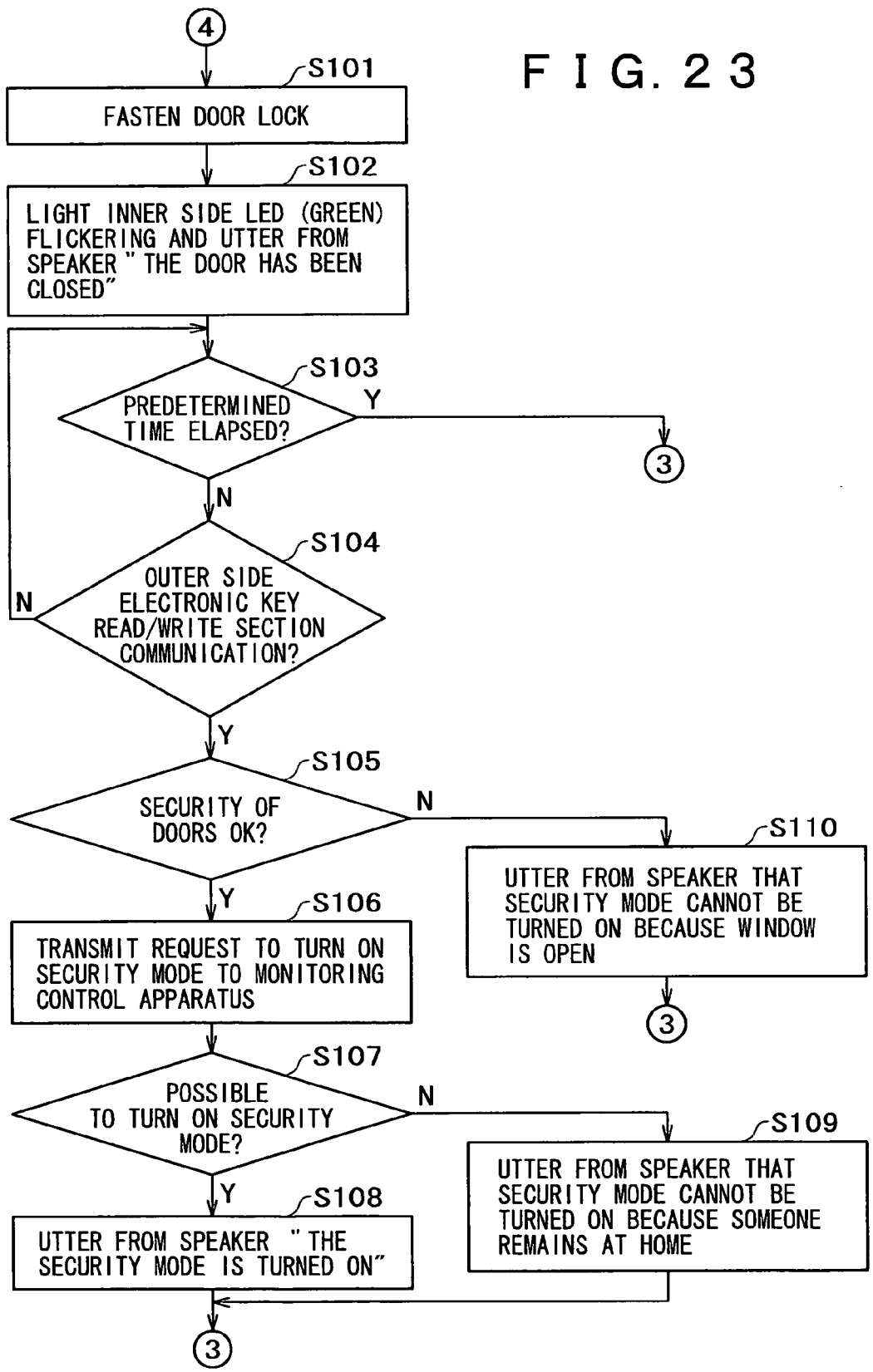
FIG. 23 is part of the flow chart illustrating the door lock control operation in the automatic lock mode, which is an example of the door lock control mode.

[In the Case of Communication by the Inner Side Electronic Key Read/Write Section 21*in*; FIGS. 21 to 23]

If it is discriminated at step S73 that the communication with the IC card 40F is performed by the inner side electronic key read/write section 21*in*, then the CPU 101 determines that a person who is at home intends to go out of home, and performs the following process. It is to be noted that, in this example, when a person at home unlocks the entrance door 1 and opens the entrance door 1, even if the security mode has been on till then, the security mode is turned off once.

The CPU 101 first compares the identification information stored in the family information memory 120 with the identification information received from the IC card 40F. The CPU 101 discriminates whether or not the identification information as electronic key information stored in the family information memory 120 includes identification information that matches with the identification information received from the IC card 40F. Thus, the CPU 101 discriminates whether or not the IC card 40F is one of the electronic key devices registered in the door lock apparatus 2 to perform authentication with regard to the IC card 40F (step S74).

Then, the CPU 101 discriminates the result of the authentication (step S75). If the identification information stored in the family information memory 120 does not include identification information that matches with the identification information received from the IC card 40F, the authentication results in failure (authentication NG). Then, the CPU 101 drives the inner side LED driving section 107 to cause the inner side LED 22in to light flickering in red and utter warning sound from the inner side speaker 23in to notify the user of the IC card 40F that the authentication is NG (step S76). Then, the processing returns to step S71 while the door lock mechanism 28 is kept in the locking state.

On the other hand, if it is discriminated at step S75 that the identification information stored in the family information memory 120 includes identification information that matches with the identification information received from the IC card 40F, and the authentication is OK. Then, the CPU 101 drives the inner side LED driving section 107 to cause the inner side LED 22in to light in green for one second to notify the user of the IC card 40F that the authentication is OK (step S77). At this time, the CPU 101 may additionally cause the inner side speaker 23in to utter a message of "The authentication has resulted in success".

Further, at this time, since the authentication is OK, the CPU 101 controls the door lock mechanism driving section 112 to drive the door lock mechanism 28 to place the entrance door 1 into an unlocked state (step S78) and controls the inner side speaker 23in to utter a message of "The door lock has been released" (step S79). At this time, the inner side LED 22in may be lit, for example, flickering in green to notify the user of the IC card 40F that the door lock has been released.

At this time, the CPU 101 recognizes that the user (person at home) of the IC card 40F intends to go out based on the recognition that the entrance door 1 has been unlocked from the inner side using the IC card 40F. Then, the CPU 101 sends an inquiry regarding open/closed states of the windows to the monitoring control apparatus 3 (step S81 of FIG. 22).

In response to the inquiry, the monitoring control apparatus 3 acquires sensor outputs of the window sensors 6a and 6b through the sensor hub 207 to confirm open/closed states of the windows. In other words, the monitoring control apparatus 3 confirms the lock-up condition. Then, the monitoring control apparatus 3 transmits the result of the confirmation of the open/closed states of the windows to the door lock control apparatus 100 through the door lock apparatus communication interface 206.

The door lock control apparatus 100 receives the confirmation result regarding the open/closed sates of the windows through the communication interface 121 (step S82). Then, the CPU 101 analyzes the received confirmation result to discriminate whether or not the windows are open (step S83).

Then, if it is discriminated that the windows are open, the CPU 101 gives a warning by uttered voice from the inner side speaker 23in that the windows are open (step S84). On the other hand, if it is discriminated that the windows are closed, the CPU 101 issues a notification that the lock-up condition is OK by uttered voice from the inner side speaker 23in (step S85).

Thereafter, the CPU 101 fetches a sensor output of the door open/close sensor 27 through the interface 111 to monitor whether or not the entrance door 1 is opened (step S86). Then, the CPU 101 discriminates whether or not a predetermined period of time, for example, 10 seconds, elapses while the entrance door 1 is not opened (step S87). If it is discriminated that 10 seconds elapse, then the CPU 101 automatically places the entrance door 1 into a locked state (step S88). Then, the CPU 101 controls the inner side LED 22in to light flickering in green to give a notification that the entrance door 1 has returned to the locked state (step S89).

On the other hand, if it is discriminated at step S86 that the entrance door 1 is opened within 10 seconds after the entrance door 1 is unlocked at step S78, then the CPU 101 recognizes that the person at home indicated by the identification information fetched at step S72 goes out of home. The CPU 101 transfers the personal information including the identification information and the time information as going out person information to the monitoring control apparatus 3 (step S90). It is to be noted that the information to be transferred to the monitoring control apparatus 3 at this time may not include the time information whereas the monitoring control apparatus 3 recognizes the time at which the information is received from the time of the clock circuit 221.

Thereafter, the CPU 101 refers to the sensor output of the door open/close sensor 27 to confirm that the entrance door 1 is closed (step S91). Then, if the CPU 101 confirms that a predetermined period of time, for example, 3 seconds, elapses after the entrance door 1 is closed (step S92), then the CPU 101 controls the door lock mechanism driving section 112 to drive the door lock mechanism 28 to return the entrance door 1 into the locked state (step S101 of FIG. 23). Then, the CPU 101 controls the outer side LED 22ex to light flickering in green to notify the user of the IC card 40F that the entrance door 1 has returned into the locked state (step S102). The green flickering of the outer side LED 22ex continues for a predetermined period of time, for example, for 10 seconds.

Thereafter, the CPU 101 discriminates whether or not the predetermined period of time mentioned hereinabove, for example, 10 seconds, elapses (step S103). If it is discriminated that the predetermined period of time does not elapse, then the CPU 101 discriminates whether or not the IC card 40F with which it is discriminated at step S71 that communication is performed communicates with the outer side electronic key read/write section 21ex again (step S104). If it is discriminated that communication is not performed, then the processing returns to step S103.

Then, if it is discriminated at step S103 that the predetermined period of time described hereinabove elapses while communication is not performed between the IC card 40F and the outer side electronic key read/write section 21ex, then the CPU 101 determines that the lock control operation of the entrance door started in response to the IC card 40F held up to the inner side electronic key read/write section 21in is finished and returns the processing to step S71 of FIG. 21.

On the other hand, if it is discriminated at step S104 that communication is performed between the IC card 40F with which it is discriminated at step S71 that communication is performed and the outer side electronic key read/write section 21ex before the predetermined period of time elapses and the green flickering of the outer side LED 22ex comes to an end after the entrance door is placed back into the locked state, then the CPU 101 re-confirms the lock-up condition confirmed at steps S101 to S63 (step S105).

If it is discriminated at step S105 that the lock-up condition is OK, then the CPU 101 transmits a request to turn on the security mode to the monitoring control apparatus 3 through the communication interface 121 (step S106).

In response to the request, the monitoring control apparatus 3 checks the at-home situation of the members of the family at that time. The monitoring control apparatus 3 discriminates one of the security levels illustrated in FIG.

15. Then, if the result of the discrimination indicates that the security level is the level D, the security mode cannot be turned on. Then, information representing this is sent back to the door lock control apparatus 100. However, if the security level is any other than the level D, then since the security mode can be turned on, information representing this is returned to the door lock control apparatus 100.

The CPU 101 of the door lock control apparatus 100 analyzes the response to the request for turning on of the security mode from the monitoring control apparatus 3 to discriminate whether or not the security mode can be turned on (step S107). Then, if it is discriminated that the response that the security mode can be turned on is received from the monitoring control apparatus 3, then the CPU 101 controls the outer side speaker 23ex to utter a message of "The security mode is turned on" (step S108).

On the other hand, if it is discriminated at step S107 that a response that the security mode cannot be turned on is received from the monitoring control apparatus 3, then the CPU 101 controls the outer side speaker 23ex to utter a message of "The security mode cannot be turned on because someone remains at home" (step S109). Thereafter, the processing returns to step S71.

On the other hand, if it is discriminated at step S105 that the windows are open and the lock-up condition is not completed, then the CPU 101 causes a message of "The security mode cannot be turned on because a window is open" to be uttered (step S110). Thereafter, the processing returns to step S71.

Figure 24:
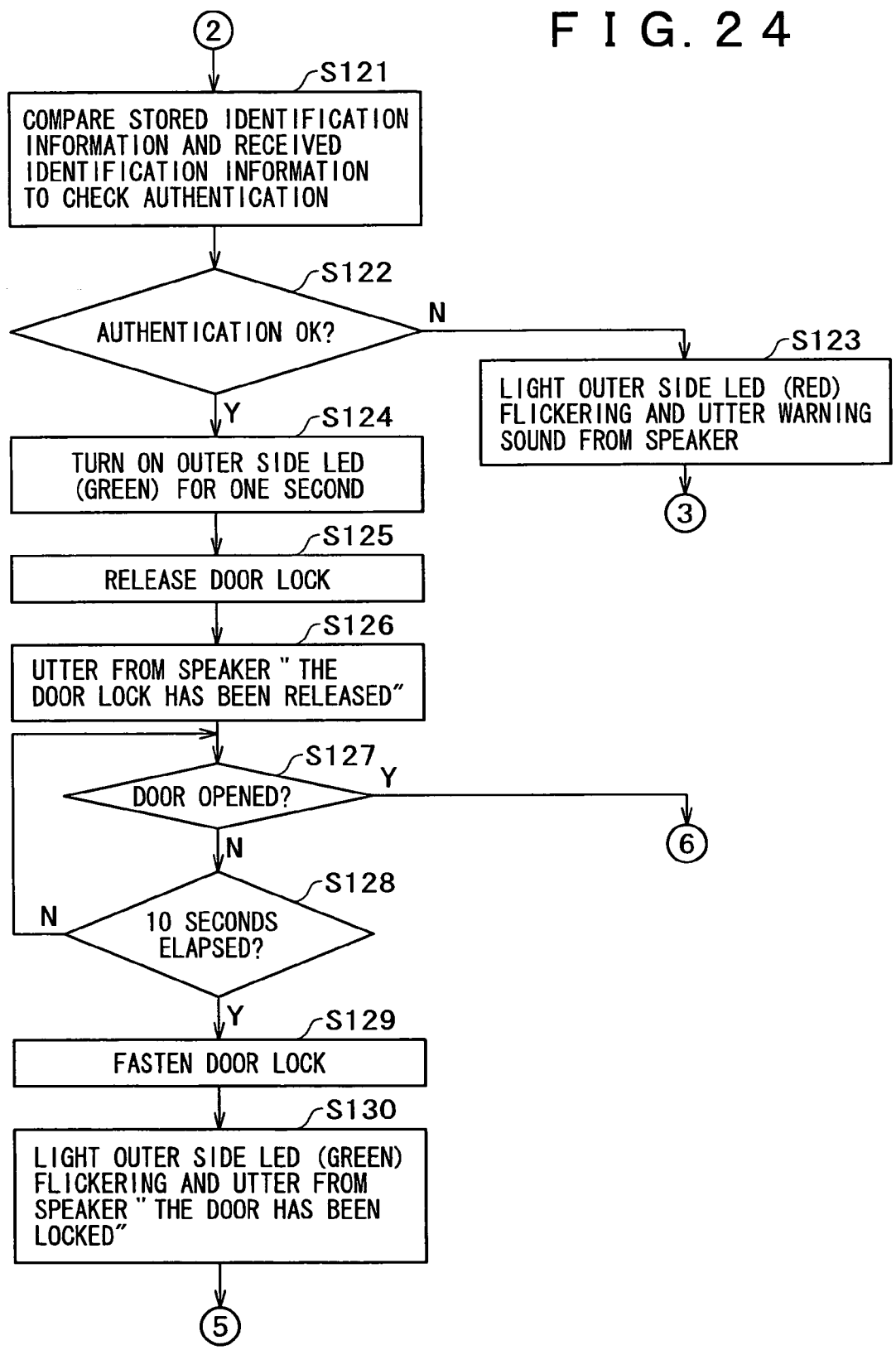
FIG. 24 is part of the flow chart illustrating the door lock control operation in the automatic lock mode, which is an example of the door lock control mode.
Figure 25:
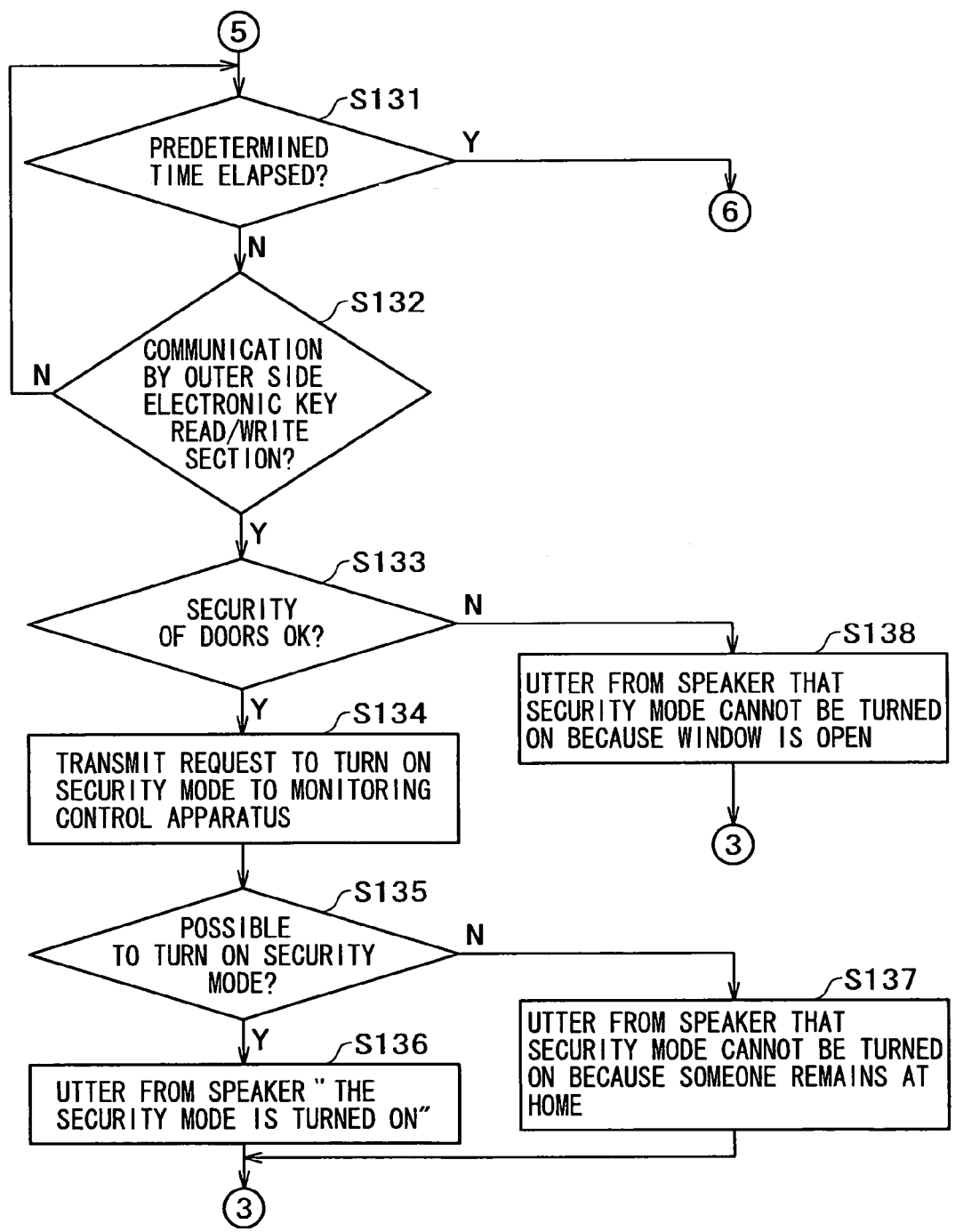
FIG. 25 is part of the flow chart illustrating the door lock control operation in the automatic lock mode, which is an example of the door lock control mode.
Figure 26:
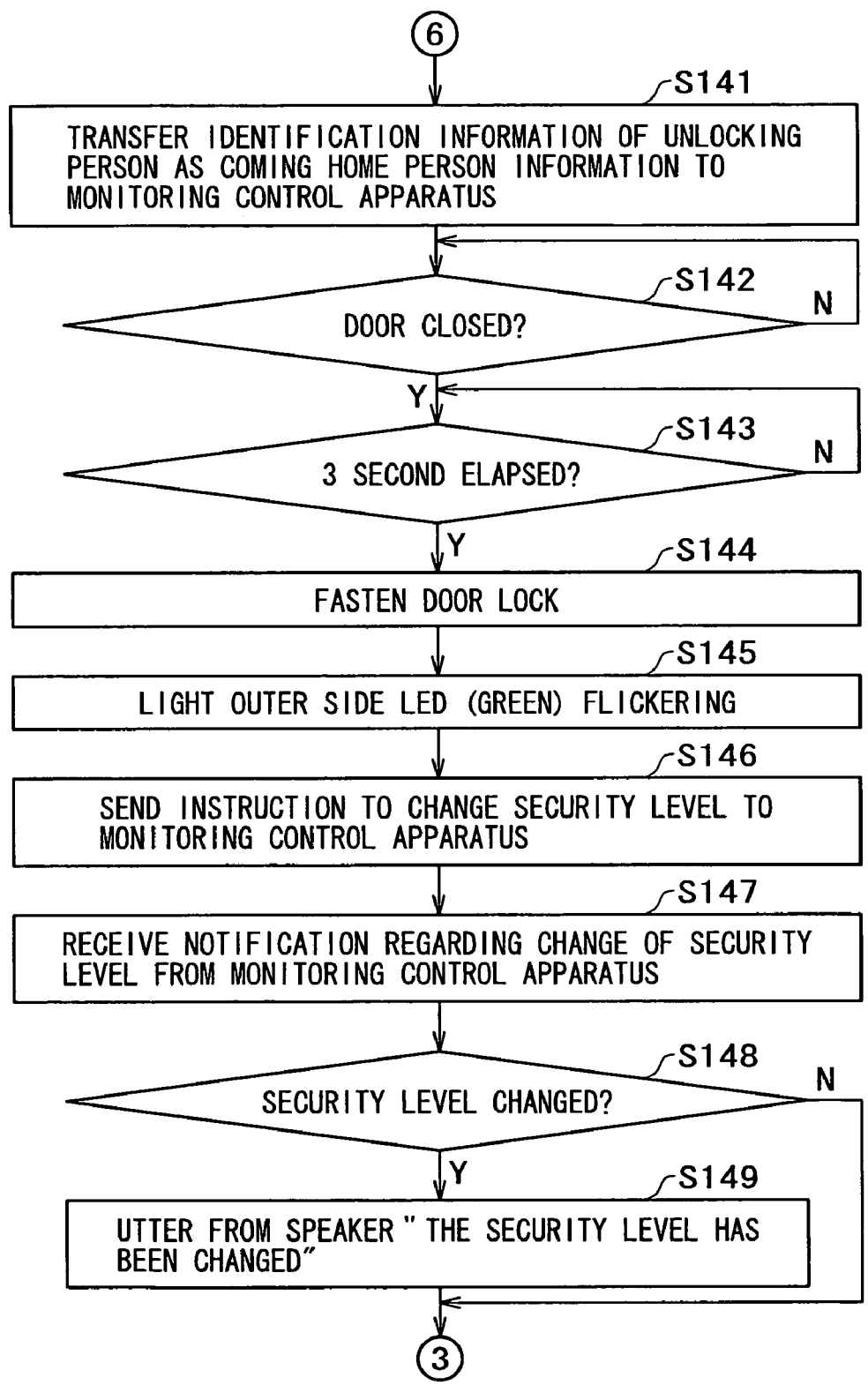
FIG. 26 is part of the flow chart illustrating the door lock control operation in the automatic lock mode, which is an example of the door lock control mode.

[In the Case of Communication by the Outer Side Electronic Key Read/Write Section 21ex; FIGS. 24 to 26]

If it is discriminated at step S71 that the communication with the IC card 40F is performed by the outer side electronic key read/write section 21ex, then the CPU 101 determines that a member of the family comes back home or a request for admission is issued from someone outside the house, and performs the following process.

The CPU 101 first compares the identification information stored in the family information memory 120 and the identification information received from the IC card 40F with each other. The CPU 101 detects whether or not the identification information stored in the family information memory 120 includes identification information that matches with the identification information received from the IC card 40F. Thus, the CPU 101 discriminates whether or not the IC card 40F is one of the IC cards 40F registered in the door lock apparatus 2 to perform authentication of the IC card 40F (step S121).

Then, the CPU 101 discriminates the result of the authentication (step S122). If it is discriminated that the identification information stored in the family information memory 120 does not include identification information that matches with the identification information received from the IC card 40F, the authentication results in failure (authentication NG). Then, the CPU 101 drives the outer side LED driving section 108 to cause the outer side LED 22ex to light flickering in red and causes the outer side speaker 23ex to utter warning sound to notify the user of the IC card 40F that the authentication results in NG (step S123). Then, the processing returns to step S71 while the door lock mechanism 28 is kept in the locking state.

On the other hand, if it is discriminated at step S122 that the identification information stored in the family information memory 120 includes identification information that matches with the identification information received from the IC card 40F, the authentication results in OK. Then, the CPU 101 drives the outer side LED driving section 108 to cause the outer side LED 22ex to light in green for one second to notify the user of the IC card 40F that the authentication is OK (step S124). At this time, the CPU 101 may cause the outer side speaker 23ex to utter a message of "The authentication is OK".

Then, at this time, since the authentication is OK, the CPU 101 controls the door lock mechanism driving section 112 to drive the door lock mechanism 28 to place the entrance door 1 into an unlocked state (step S125) and causes the outer side speaker 23ex to utter a message of "The door lock is released" (step S126). At this time, the outer side LED 22ex may be caused to light flickering, for example, in green to notify the user of the IC card 40F of the released state of the door lock.

Then, the CPU 101 fetches the sensor output of the door open/close sensor 27 through the interface 111 to monitor whether or not the entrance door 1 is opened (step S127). Then, the CPU 101 discriminates whether or not a predetermined period of time, for example, 10 seconds, elapses while the entrance door 1 is not opened (step S128). If it is discriminated that 10 seconds elapse, then the CPU 101 causes the entrance door 1 to automatically return into the locked state (step S129). Then, the CPU 101 causes the outer side LED 22ex to light flickering in green to notify that the entrance door 1 returns into the locked state (step S130).

Thereafter, the CPU 101 discriminates whether or not a predetermined period of time, for example, 10 seconds, elapses (step S131). If it is discriminated that the predetermined period of time does not elapse, then the CPU 101 discriminates whether or not the electronic key device with which it is discriminated at step S71 that the communication is performed communicates with the outer side electronic key read/write section 21ex (step S132). If it is discriminated that such communication is not performed, then the processing returns to step S131.

Then, if it is discriminated at step S131 that the predetermined period of time elapses while communication is not performed between the electronic key device and the outer side electronic key read/write section 21ex, then the CPU 101 determines that the lock control operation of the entrance door started in response to the electronic key device held up to the outer side electronic key read/write section 21ex is finished and returns the processing to step S71 of FIG. 21.

On the other hand, if it is discriminated at step S132 that the electronic key device with which it is discriminated at step S71 that the communication is performed communicates with the outer side electronic key read/write section 21ex, then the CPU 101 confirms the lock-up condition (step S133).

The confirmation of the lock-up condition at step S133 is performed in a similar manner to that in the process described hereinabove with reference to steps S121 to S123. In particular, the door lock control apparatus 100 issues an inquiry with regard to the open/closed states of the windows to the monitoring control apparatus 3 and acquires the inquiry result from the monitoring control apparatus 3. Then, the door lock control apparatus 100 discriminates whether or not the lock-up condition is OK from the inquiry result.

If it is discriminated at step S133 that the lock-up condition is OK, then the CPU 101 transmits a request to turn on the security mode to the monitoring control apparatus 3 through the communication interface 121 (step S134).

In response to the request, the monitoring control apparatus 3 checks the at-home situation of the members of the family at this time to determine which one of the levels illustrated in FIG. 15 should be adopted as the security level. Then, if the result of the determination indicates that the security level is the level D, then since the security mode cannot be turned on, information representing this is returned to the door lock control apparatus 100. However, if the security level is any other than the level D, then since the security mode can be turned on, information representing this is returned to the door lock control apparatus 100.

The CPU 101 of the door lock control apparatus 100 analyzes the response to the security mode turning on request from the monitoring control apparatus 3 to discriminate whether or not the security mode can be turned on (step S135). Then, if the response that the security mode can be turned on is received from the monitoring control apparatus 3, then the CPU 101 causes the outer side speaker 23ex to utter a message of "The security mode is turned on" (step S136).

On the other hand, if it is discriminated at step S135 that the response that the security mode cannot be turned on is received from the monitoring control apparatus 3, then the CPU 101 causes the outer side speaker 23ex to utter a message of "The security mode cannot be turned on because someone remains at home" (step S137). Thereafter, the processing returns to step S71.

On the other hand, if it is discriminated at step S133 that the windows are open and the lock-up condition is not completed, then the CPU 101 causes a warning message of "The security mode cannot be turned on because a window is open" to be uttered (step S138). Thereafter, the processing returns to step S71.

The processes at steps S131 to S138 are a process for preventing time and labor to re-start the procedure beginning with holding of the electronic key device up to the inner side electronic key read/write section 21in. A person may forget to hold up its electronic key device to the outer side electronic key read/write section 21ex to turn on the security mode within a predetermined period of time after the entrance door 1 is unlocked from the inner side once. Even in that case, the person does not need to return into the room again.

In particular, after the entrance door 1 is opened once from the inner side, a person may forget or fail to hold up its electronic key device to the outer side electronic key read/write section 21ex to turn on the security mode within the predetermined period of time. In that case, the person holds up the electronic key device to the outer side electronic key read/write section 21ex to unlock the entrance door 1 once. After 10 seconds elapse, the entrance door 1 is placed back into locked state. Then, the person holds up the electronic key device to the outer side electronic key read/write section 21ex again within 10 seconds. Thus, the security mode can be turned on. This eliminates the necessity for the person to enter the room by unlocking the entrance door 1 in order to set the security mode. This is convenient that the re-performance beginning with holding up of the electronic key device 40 to the inner side electronic key read/write section 21in is not required.

Then, if it is discriminated at step S127 that the entrance door 1 is opened within 10 seconds after the unlocking at step S125, then the CPU 101 recognizes that the person represented by the identification information fetched at step S72 and having been out of home comes home. The CPU 101 transfers personal information including the identification information and the time information at which the communication with the electronic key device is performed as coming home person information to the monitoring control apparatus 3 (step S141 of FIG. 26). It is to be noted that the information to be transferred to the monitoring control apparatus 3 at this time may not include the time information, but the time at which the monitoring control apparatus 3 receives such information may be recognized from the time of the clock circuit 221.

Thereafter, the CPU 101 refers to the sensor output of the door open/close sensor 27 to recognize that the entrance door 1 is closed (step S142). Then, if it is recognized that a predetermined period of time, for example, 3 seconds, elapses after the entrance door 1 is closed (step S143), then the CPU 101 controls the door lock mechanism driving section 112 to drive the door lock mechanism 28 to return the entrance door 1 into the locked state (step S144). Then, the CPU 101 causes the inner side LED 22in to light flickering in green to give a notification that the entrance door 1 is returned into the locked state (step S145).

Thereafter, the CPU 101 sends, based on the fact the at-home situation exhibits a change because someone has come back home, a security level changing instruction to the monitoring control apparatus 3 (step S146).

The monitoring control apparatus 3 receiving the security level changing instruction recognizes the change of the at-home situation by the coming home person information at step S141. Then, the monitoring control apparatus 3 refers to the coordination table between the at-home situations and the security levels shown in FIG. 15 to discriminate whether or not there is the necessity to change the security level. If there is the necessity, then the monitoring control apparatus 3 changes the security level. Then, the monitoring control apparatus 3 issues a notification of whether or not the security level is changed to the door lock control apparatus 100.

The CPU 101 of the door lock control apparatus 100 receives the notification regarding the change of the security level from the monitoring control apparatus 3 (step S147) and discriminates whether or not the security level is changed (step S148).

Then, if it is discriminated at step S148 that the security mode is changed, the CPU 101 controls the inner side speaker 23in to utter a message of "The security level has been changed" (step S149). Then, the processing returns to step S71.

It is to be noted that, according to the description above, when someone comes back home, a security level changing instruction is sent from the door lock control apparatus 100 to the monitoring control apparatus 3 at step S146. Since the monitoring control apparatus 3 receives transfer of the coming home person information at step S141, even if the monitoring control apparatus 3 does not receive the security level changing instruction from the door lock control apparatus 100, it may automatically discriminate whether or not it is necessary to change the security level and automatically change the security level when it is discriminated that a security level change is necessary. In this instance, when the security level is changed, information of the change is transferred to the door lock control apparatus 100.

Figure 27:
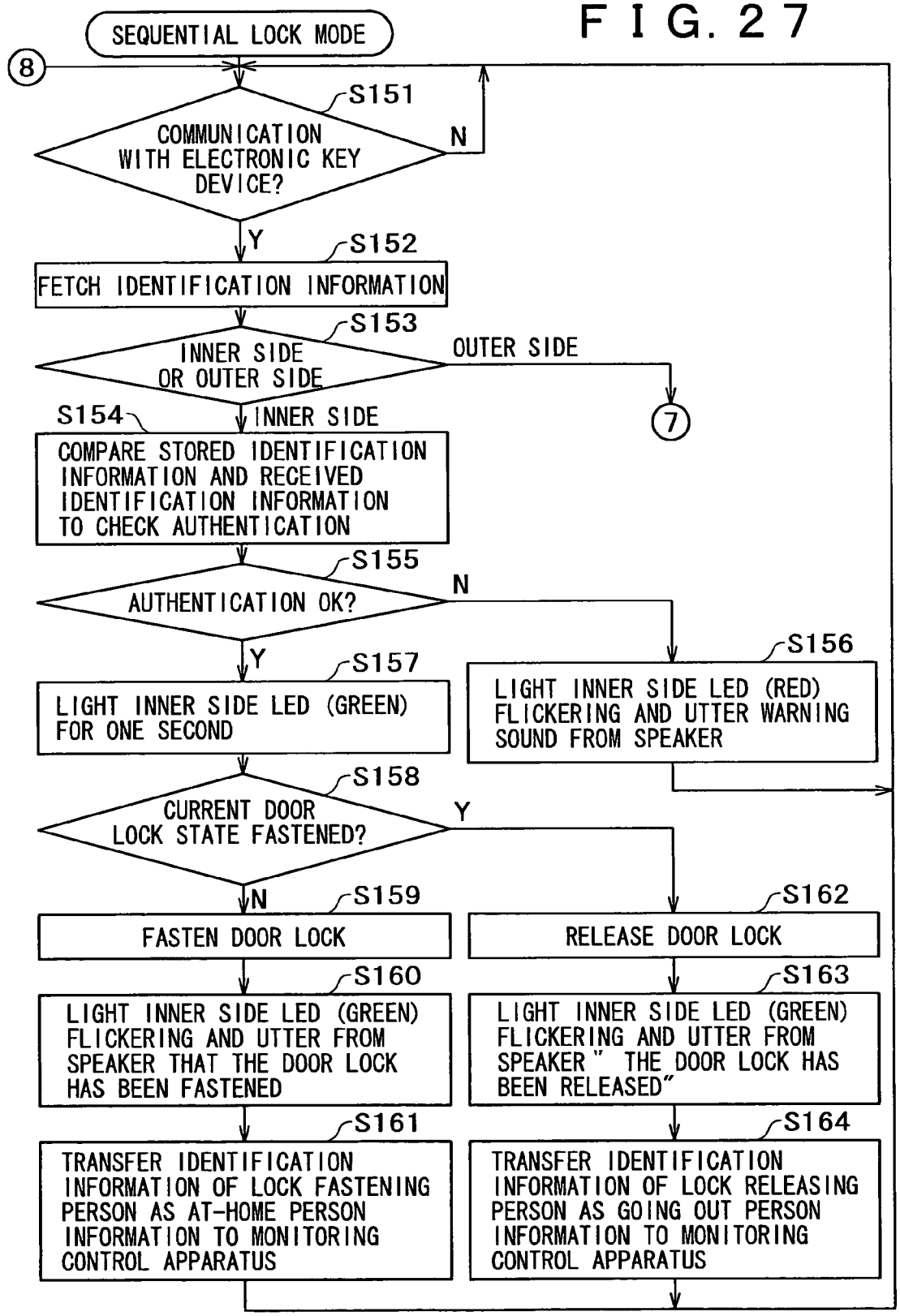
FIG. 27 is part of a flow chart illustrating the door lock control operation in a sequential lock mode, which is another example of the door lock control mode.
Figure 28:
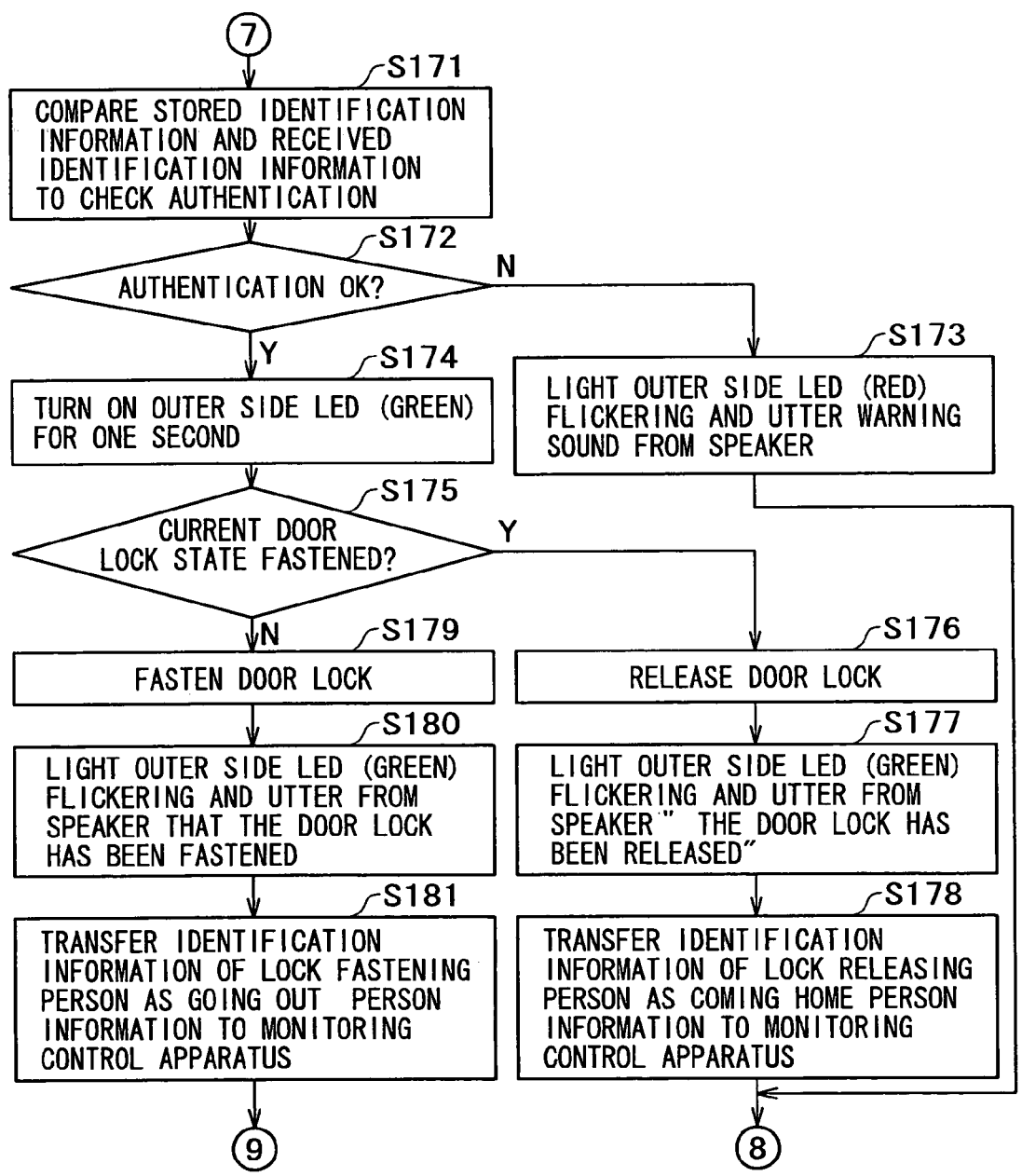
FIG. 28 is part of the flow chart illustrating the door lock control operation in the sequential lock mode, which is another example of the door lock control mode.
Figure 29:
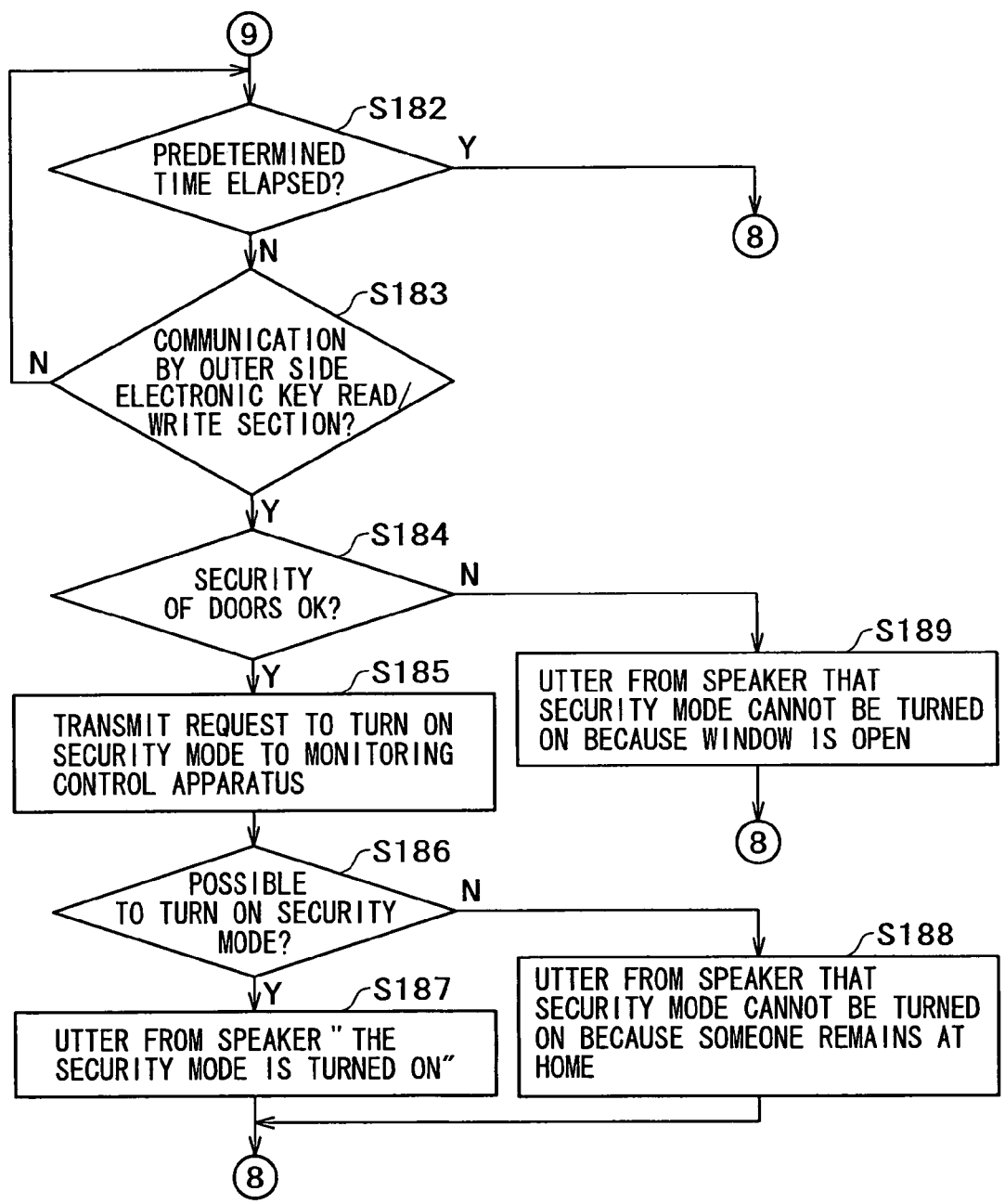
FIG. 29 is part of the flow chart illustrating the door lock control operation in the sequential lock mode, which is another example of the door lock control mode.

[Description of the Sequential Lock Mode; FIGS. 27 to 29]

Now, operation in the sequential lock mode is described with reference to flow charts of FIGS. 27 to 29. In the sequential lock mode, when an IC card 40C is held up to the inner side electronic key read/write section 21in or the outer side electronic key read/write section 21ex and communication is performed between them and then authentication with regard to the identification as electronic key information results in success, the door lock mechanism 28 is controlled by the door lock control apparatus 100 so that the unlocked or locked state of the entrance door 1 then is reversed to the locked or unlocked state.

The CPU 101 monitors the inner side electronic key read/write section 21*in* and the outer side electronic key read/write section 21*ex* through the interfaces 105 and 106 to wait that an IC card 40C is held up to the inner side electronic key read/write section 21*in* or the outer side electronic key read/write section 21*ex* and communication is performed between them (step S151).

Then, if it is discriminated at step S151 that an IC card 40F is held up to and communication with the IC card 40F is performed, then the CPU 101 receives identification information from the IC card 40F and temporarily stores the identification information, for example, into the RAM 104 or the like (step S152). At this time, time information and so forth are written into the IC card 40F similarly as described hereinabove and writing of the time information and so forth into the family information memory 120 and the family information memory 205 of the monitoring control apparatus 3 is performed.

The CPU 101 discriminates whether communication with the IC card 40F is performed by the inner side electronic key read/write section 21*in* or by the outer side electronic key read/write section 21*ex* (step S153).

[In the Case of Communication by the Inner Side Electronic Key Read/Write Section 21*in*; FIG. 27]

If it is discriminated at step S153 that the communication with the IC card 40F is performed by the inner side electronic key read/write section 21*in*, then the CPU 101 determines that a person at home tries to go out or the entrance door 1 is to be locked for the security, and performs the following process.

The CPU 101 first compares the identification information stored in the family information memory 120 and the identification information received from the IC card 40F with each other. The CPU 101 discriminates whether or not the identification information stored in the family information memory 120 includes identification information match with the identification information received from the IC card 40F. The CPU 101 discriminates whether or not the IC card 40F is one of the electronic key devices registered in the door lock apparatus 2 to authenticate the IC card 40F (step S154).

Then, the CPU 101 discriminates the result of the authentication (step S155). If the identification information stored in the family information memory 120 does not include identification information match with the identification information received from the IC card 40F, the authentication results in failure (authentication NG). Then, the CPU 101 controls the inner side LED driving section 107 to drive the inner side LED 22*in* to light flickering in red and causes the inner side speaker 23*in* to utter warning sound to notify the user of the IC card 40F that the authentication is NG (step S156) Then, the processing returns to step S151 while the door lock mechanism 28 is kept in the preceding state.

On the other hand, if it is discriminated at step S155 that the identification information stored in the family information memory 120 includes identification information match with the identification information received from the IC card 40F, the authentication results in OK. Then, the CPU 101 controls the inner side LED driving section 107 to drive the inner side LED 22*in* to light in green for one second to notify the user of the IC card 40F that the authentication is OK (step S157). At this time, the CPU 101 may additionally control the inner side speaker 23*in* to utter a message of "The authentication results in success".

Then, the CPU 101 discriminates whether or not the state of the lock of the entrance door 1 by the door lock mechanism 28 at present is the locked state (step S158). If it is discriminated at step S158 that the state of the lock of the entrance door 1 by the door lock mechanism 28 is the unlocked state, then the CPU 101 controls the door lock mechanism driving section 112 to drive so that the state of the lock of the entrance door 1 may be reversed to the locked state (step S159).

Then, the CPU 101 controls the inner side LED 22*in* to utter a message of "The entrance door has been locked" to notify the user of the IC card 40F that the entrance door 1 has been placed into the locked state.

Then, the CPU 101 recognizes that the person indicated by the identification information fetched at step S152 has locked for the security, and transfers the personal information including the identification information as at-home person information to the monitoring control apparatus 3 (step S161).

On the other hand, if it is discriminated at step S158 that the state of the lock of the door lock mechanism 28 at present is the locked state, then the CPU 101 controls the door lock mechanism driving section 112 to drive the door lock mechanism 28 into an unlocking state (step S162). Further, the CPU 101 causes the inner side LED 22*in* to light flickering, for example, in green and causes the inner side speaker 23*in* to utter a message of "The door lock has been released" (step S163).

At this time, the CPU 101 recognizes that the person indicated by the identification information fetched at step S152 has unlocked and gone out, and transfers the personal information including the identification information as going out person information to the monitoring control apparatus 3 (step S164).

[In the Case of Communication by the Outer Side Electronic Key Read/Write Section 21*ex*; FIGS. 28 to 29]

If it is discriminated at step S153 that the communication with the IC card 40F is performed by the outer side electronic key read/write section 21*ex*, then the CPU 101 determines that one of the members of the family comes home and tries to unlock or one of the members of the family tries to lock and goes out, and performs the following process.

The CPU 101 first compares the identification information stored in the family information memory 120 and the identification information received from the IC card 40F with each other. The CPU 101 discriminates whether or not the identification information stored in the family information memory 120 includes identification information match with the identification information received from the IC card 40F. The CPU 101 discriminates whether or not the IC card 40F is one of the electronic key devices registered in the door lock apparatus 2 to authenticate the IC card 40F (step S171).

Then, the CPU 101 discriminates the result of the authentication (step S172). If the identification information stored in the family information memory 120 does not include identification information match with the identification information received from the IC card 40F, the authentication results in failure (authentication NG). Then, the CPU 101 controls the outer side LED driving section 108 to drive the outer side LED 22*ex* to light flickering in red and causes the outer side speaker 23*ex* to utter warning sound to notify the user of the IC card 40F that the authentication is NG (step S173). Then, the processing returns to step S151 while the door lock mechanism 28 is kept in the locking state.

On the other hand, if it is discriminated at step S172 that the identification information stored in the family information memory 120 includes identification information match with the identification information received from the IC card 40F, the authentication results in OK. Then, the CPU 101 controls the outer side LED driving section 108 to drive the outer side LED 22ex to light in green for one second to notify the user of the IC card 40F that the authentication is OK (step S174). At this time, the CPU 101 may additionally control the outer side speaker 23ex to utter a message of "The authentication results in success".

Then, the CPU 101 discriminates whether or not the state of the lock of the door lock mechanism 28 at present is the locking state (step S175). If it is discriminated at step S158 that the state of the lock of the entrance door 1 by the door lock mechanism 28 is the locked state, then the CPU 101 controls the door lock mechanism driving section 112 to drive the door lock mechanism 28 to place the entrance door 1 into an unlocked state (step S176). Further, the CPU 101 causes the inner side LED 22in to light flickering, for example, in green and causes the inner side speaker 23in to utter a message of "The door lock has been released" (step S177).

Then, the CPU 101 recognizes that the person indicated by the identification information fetched at step S152 has unlocked for coming home, and transfers the personal information including the identification information and coming home time information (time at which the communication with the electronic key device is performed) as coming home person information to the monitoring control apparatus 3 (step S178). Also in this instance, the time at which the information is received by the monitoring control apparatus 3 may be recognized from the time of the clock circuit 221 and used as the coming home time.

On the other hand, if it is discriminated at step S175 that the state of the lock of the entrance door 1 at present is the unlocked state, then the CPU 101 controls the door lock mechanism driving section 112 to drive the door lock mechanism 28 to place the entrance door 1 into a locked state so that the state of the entrance door 1 may be changed to the reverse locked state (step S179).

Then, the CPU 101 causes the inner side LED 22in to light flickering, for example, in green and causes the inner side speaker 23in to utter a message of "The entrance door has been locked" to notify the user of the IC card 40F that the entrance door 1 has been placed into a locked state (step S180).

Then, the CPU 101 recognizes that the person indicated by the identification information fetched at step S152 has locked for going out and transfers the personal information including the identification information as going out person information to the monitoring control apparatus 3 (step S181).

Then, after the locking, the CPU 101 discriminates whether or not a predetermined period of time, for example, 10 seconds, elapses (step S182 of FIG. 29). If it is discriminated that the predetermined period of time does not elapse, then the CPU 101 discriminates whether or not the IC card 40F with which it is discriminated at step S171 that the communication is performed communicates with the outer side electronic key read/write section 21ex again (step S183). If it is discriminated that such communication is not performed, then the processing returns to step S182.

On the other hand, if it is discriminated at step S183 that communication between the electronic key device with which it is discriminated at step S71 that the communication is performed and the outer side electronic key read/write section 21ex is performed again before the predetermined period of time elapses after the entrance door is closed, then the CPU 101 confirms the lock-up condition (step S184).

The confirmation of the lock-up condition at step S184 is performed similarly as in the process described hereinabove in connection with steps S101 to S103. In particular, the door lock control apparatus 100 issues an inquiry with regard to the open/closed states of the windows to the monitoring control apparatus 3 and acquires the inquiry result from the monitoring control apparatus 3. Then, the door lock control apparatus 100 discriminates from the inquiry result whether or not the lock-up condition is OK.

If it is discriminated that the lock-up condition is OK, then the CPU 101 transmits a request to turn on the security mode to the monitoring control apparatus 3 through the communication interface 121 (step S185).

In response to the request, the monitoring control apparatus 3 checks the at-home situation at that time to determine one of the security levels illustrated in FIG. 15. Then, if the result of the determination indicates that the security level is the level D, the security mode cannot be turned on. Then, the monitoring control apparatus 3 issues a notification representing this to the door lock control apparatus 100. However, if the security level is any other than the level D, the security mode can be turned on. Then, the CPU 101 sends back information representing this to the door lock control apparatus 100.

The CPU 101 of the door lock control apparatus 100 analyzes the response to the security mode turning on request from the monitoring control apparatus 3 to discriminate whether or not the security mode can be turned on (step S186). If it is discriminated that the response received from the monitoring control apparatus 3 indicates that the security mode can be turned on, then the CPU 101 causes the outer side speaker 23ex to utter a message of "The security mode is turned on" (step S187).

On the other hand, if it is discriminated at step S186 that the response received from the monitoring control apparatus 3 indicates that the security mode cannot be turned on, then the CPU 101 causes the outer side speaker 23ex to utter a message of "The security mode cannot be turned on because someone remains at home" (step S188). Thereafter, the processing returns to step S151.

On the other hand, if it is discriminated at step S184 that the windows are open and the lock-up condition is not completed, then the CPU 101 causes a warning message of "The security mode cannot be turned on because a window is open" to be uttered (step S189). Thereafter, the processing returns to step S171.

Figure 30:
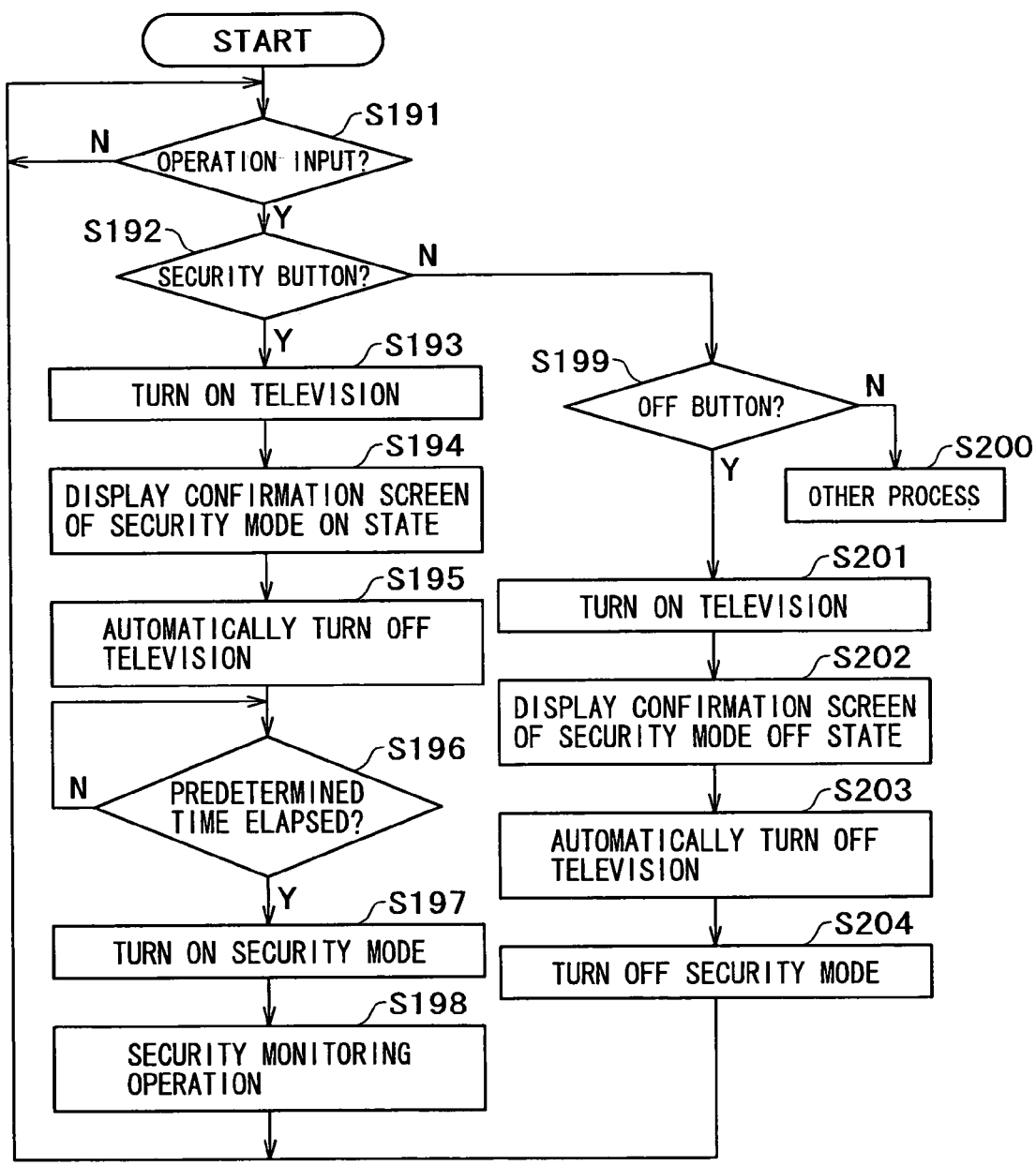
FIG. 30 is a flow chart illustrating a reception processing operation of a signal from a remote commander of the monitoring control apparatus.

[Security Operation of the Monitoring Control Apparatus 3: FIG. 30]

Although the monitoring control apparatus 3 receives an instruction from the door lock control apparatus 100 and turns on the security mode in such a manner as described above, the security mode can be turned on also by depressing the security button 51 of the remote commander 50. Then, the security on state can be changed to the security off state by operating the off button 52 of the remote commander 50.

FIG. 30 is a flow chart illustrating operation of controlling the tuning on-off of the security mode of the monitoring control apparatus 3 by operating the remote commander 50.

First, the CPU 201 monitors a remote control signal from the remote commander 50 to discriminate an inputting operation is performed on the remote commander 50 (step S191). Then, if it is discriminated that an inputting operation is performed, then the CPU 201 discriminates whether or not the security button 51 is operated (step S192).

If it is discriminated as the result of the discrimination at step S192 that the security button 51 is operated, then the CPU 201 sends a remote control signal for turning on the power supply from the remote control sender section 39 to a remote control signal receiver section of the television receiver 7 to switch on the television receiver 7 (step S193).

Then, the CPU 201 sends image information produced based on data read out from the ROM 203 to the television receiver 7 through the television interface 217 so that a security mode on confirmation screen is displayed on the screen of the television receiver 7 (step S194). Thereafter, the CPU 201 signals a remote control signal for turning off the power supply to the television receiver 7 from the remote control sender section 39 to switch off the television receiver 7 (step S195).

Then, the CPU 201 waits that a predetermined period of time, for example, 5 seconds, elapses (step S196), then turns on the security mode (step S197), and executes a security monitoring operation (step S198). The user who operates the security button 51 goes out through the entrance door after setting the security mode to on state. The time is taking into consideration as the predetermined period of time at step S196.

If it is discriminated at step S192 that the button operated on the remote commander 50 is not the security button 51, then the CPU 201 discriminates whether or not the off button 52 is operated (step S199). If it is discriminated at step S199 that the off button 52 is not operated, then the CPU 201 executes a process corresponding to the depression of the button different from the off button 52 (step S200).

If it is discriminated as the result of the discrimination at step S199 that the off button 52 is depressed, then the CPU 201 sends a remote control signal for switching on the power supply to the remote control signal receiver section of the television receiver 7 to switch on the television receiver 7 (step S201).

Then, the CPU 201 sends image information produced based on data read out from the ROM 203 to the television receiver 7 through the television interface 217. A security mode off confirmation screen is displayed on the screen of the television receiver 7 (step S202). Thereafter, the CPU 201 signals a remote control signal for switching off the power supply to the television receiver 7 from the remote control sender section 39 to switch off the television receiver 7 (step S203).

Then, the CPU 201 performs a process of turning off the security mode (step S204). The processing routine of FIG. 30 ends therewith.

[Monitoring Operation when the Security Mode is On]

Figure 31:
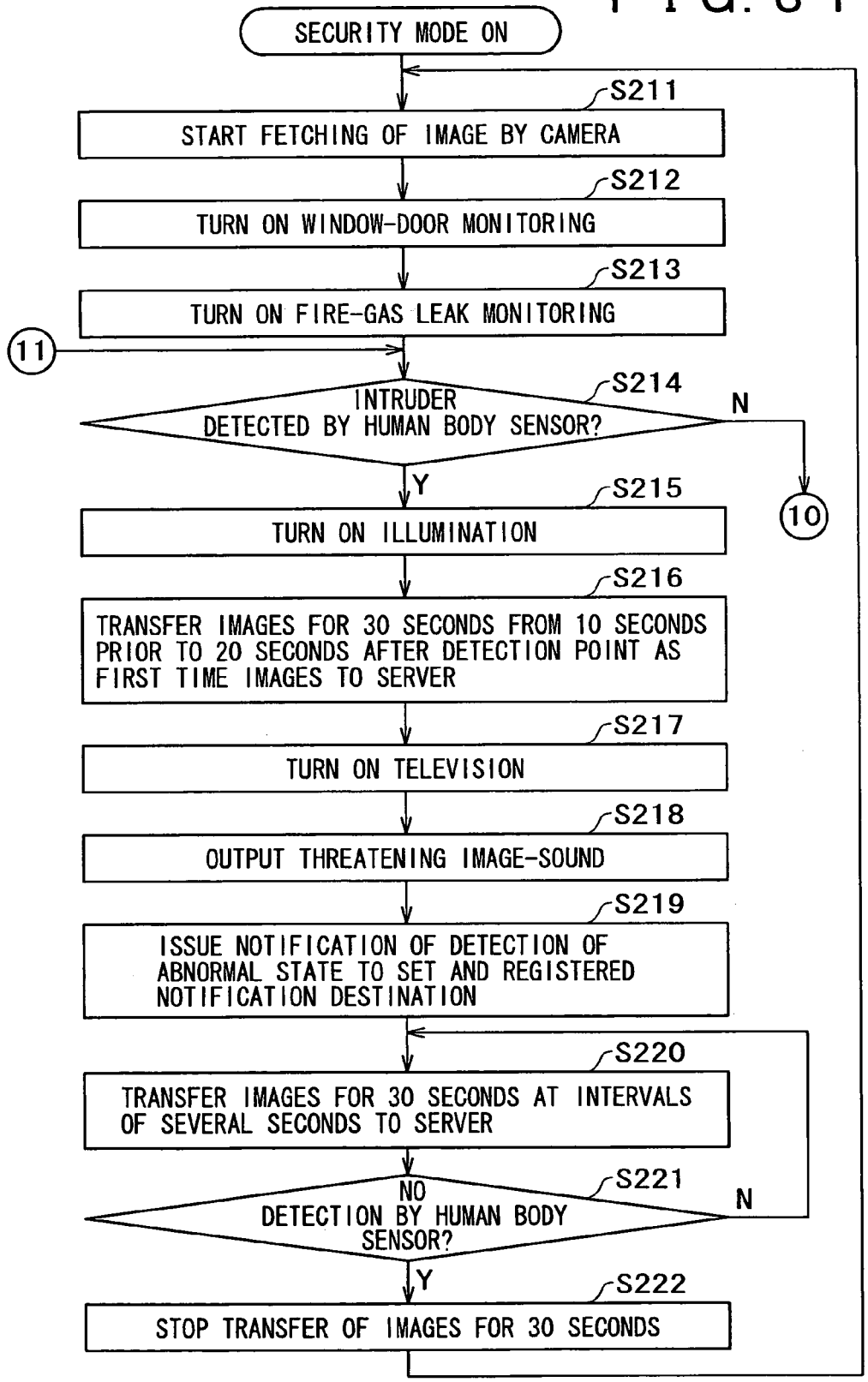
Figure 32:
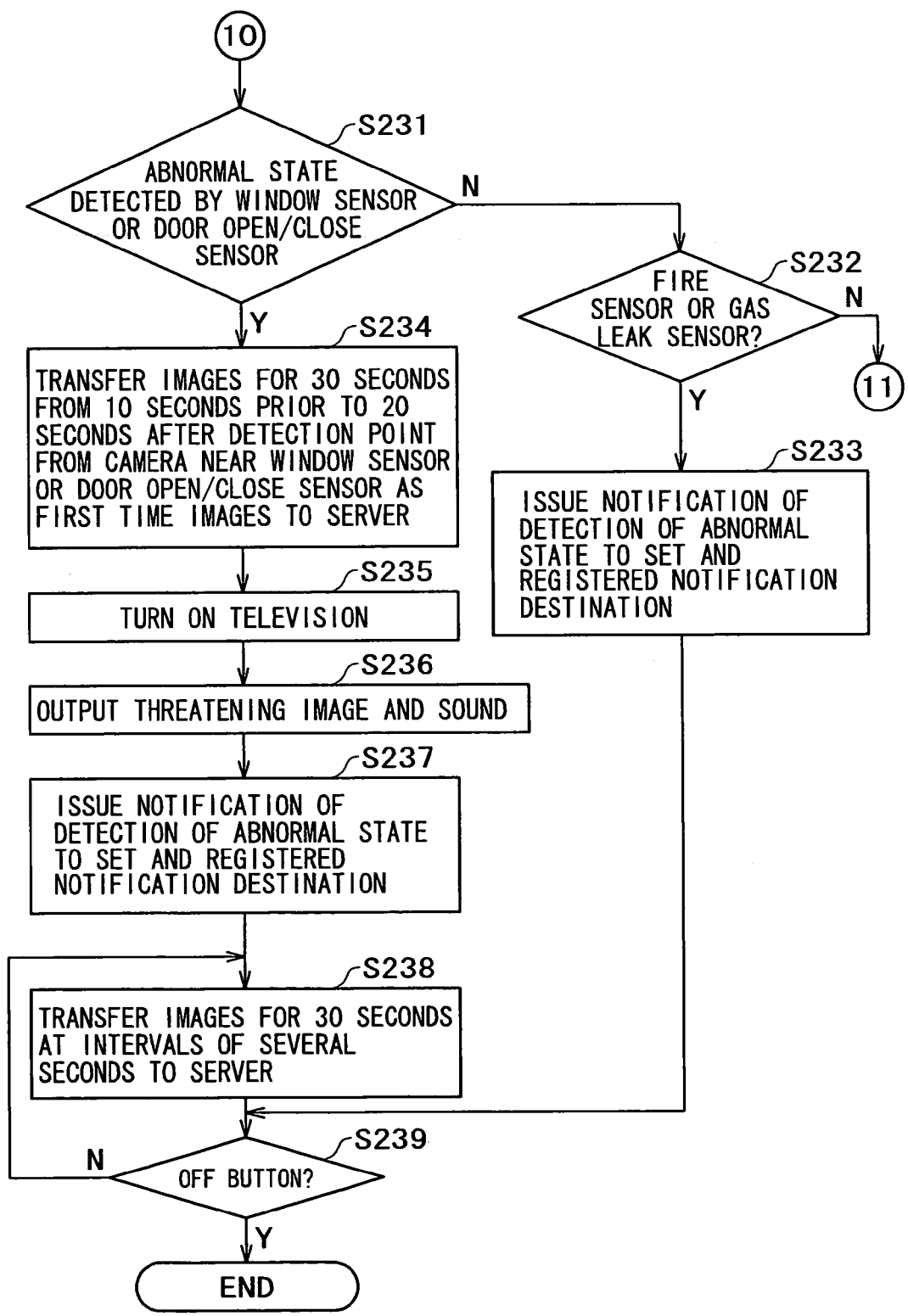

FIGS. 31 and 32 illustrate processing operation when the monitoring control apparatus 3 turns on the security mode. The processing operation is activated when the security button 51 on the remote commander 50 described above is operated, and the security level at this time is the level A. It is to be noted that, when a security level mode tuning on instruction is received from the door lock control apparatus 100, the situation of at-come members of the family is taken into consideration to determine the security level. The security mode is turned on with the thus determined security level.

Referring to FIG. 31, the CPU 201 first starts fetching of a picked up image of the video camera 31 (step S211). At this time, also sound collected by the microphone 34 is fetched together. As described hereinabove, the monitoring information area for a security mode provided in the image-sound memory 208 has a ring buffer type configuration. In the present example, image and sound information for the latest 30 seconds is always stored in the image-sound memory 208. This similarly applies to picked up images from the monitor camera 13.

Then, the CPU 201 controls to start monitoring of the sensor outputs of the window sensors 16*a* and 16*b* from the sensor hub 207 and the sensor output of the door open/close sensor 27 of the entrance door 1 (step S212). Further, the CPU 201 controls to start monitoring of the sensor outputs of the fire sensor 4 and the gas sensor 5 (step S213). The monitor camera 13 turns on and off in response to turning on and off of the fire sensor 4 and the gas sensor 5.

Then, the CPU 201 monitors the sensor output of the human body sensor 33 to check an intruder (step S214). If it is discriminated that there is no intruder, then the CPU 201 discriminates from the sensor outputs of the window sensors 16*a* and 16*b* and the sensor output of the door open/close sensor 27 whether or not an abnormal state is detected (step S231 of FIG. 32).

If it is discriminated at step S231 that no abnormal state is detected, then the CPU 201 discriminates from the sensor outputs of the fire sensor 4 and the gas sensor 5 whether or not an abnormal state is detected (step S232). If it is discriminated at step S232 that no abnormal state is detected, then the processing returns to step S214.

Then, if it is discriminated at step S214 that an intruder is detected by the human body sensor 33, then the CPU 201 controls the illumination mechanism 320 to turn on the illumination 32 (step S215). Then, the CPU 201 reads out the image and sound information for 30 seconds from the image-sound memory 208. The 30 seconds is from 10 seconds prior to 20 seconds after the detecting time point of the intruder. The CPU 201 transfers the image and sound information as first time images to the management server apparatus 10 (step S216). The management server apparatus 10 recognizes the intruder based on the image and sound information transferred thereto and can take suitable steps.

Thereafter, the CPU 201 sends a remote control signal to turn on the power supply from the remote control sender section 39 to the television receiver 7 to switch on the television receiver 7 (step S217). Then, the CPU 201 sends information of a threatening image and threatening sound prepared in advance to the television receiver 7 so that the threatening image and the threatening sound are outputted from the television receiver 7 (step S218). The threatening image and sound can threaten and expel the intruding burglar.

Then, the CPU 201 informs the abnormal state detection to the notification destination registered in advance in the monitoring control apparatus 3 such as, for example, a security company, the police station, or a portable telephone terminal of a registered member of the family (step S219).

Thereafter, the CPU 201 repetitively transfers image and sound information for 30 seconds stored in the ring buffer of the image-sound memory 208 at intervals of several seconds to the management server apparatus 10 (step S220). Then, the CPU 201 discriminates whether or not the human body sensor 33 does not detect the intruder any more (step S221) and continues the processing operation of transferring image and sound information for 30 seconds to the management server apparatus 10 until the human body sensor 33 does not detect the intruder any more.

Then, if it is discriminated that the human body sensor 33 does not detect the intruder any more, then the CPU 201 stops the transfer of image and sound information for 30 seconds to the management server apparatus 10 (step S222). Then, the processing returns to step S231, at which the security monitoring is continued.

On the other hand, if it is discriminated at step S231 that an abnormal state is detected, the CPU 201 transfers images as first time images to the management server apparatus 10 (step S234). The images are 30 seconds from 10 seconds prior to 20 seconds after the detecting time point from the monitor camera 13. The monitor camera 13 is provided in the proximity of the window sensor 6a and 6b or the door open/close sensor 27.

Then, the CPU 201 sends a remote control signal to turn on the power supply from the remote control sender section 39 to the television receiver 7 to switch on the television receiver 7 (step S235). Then, the CPU 201 sends information of the threatening image and the threatening sound prepared in advance to the television receiver 7 to output the threatening image and the threatening sound from the television receiver 7 (step S236). The threatening image and sound can threaten and expel the intruding burglar.

Then, the CPU 201 informs the abnormal state detection to the notification destination registered in advance in the monitoring control apparatus 3 such as, for example, a security company, the police station, or a portable telephone terminal of a registered member of the family (step S237).

Thereafter, the CPU 201 repetitively transfers image and sound information for 30 seconds stored in the ring buffer of the image-sound memory 208 at intervals of several seconds to the management server apparatus 10 (step S238). Then, the CPU 201 waits a turning off instruction originating from the off button 52 of the remote commander 50 (step S239). If a turning off instruction is received, then the CPU 201 turns off the security mode.

On the other hand, if it is discriminated at step S232 that an abnormal state is detected by the fire sensor 4 or the gas sensor 5, then the CPU 201 informs the abnormal state detection, for example, to a security company, the police station, or a portable telephone terminal of a registered member of the family set and registered in the monitoring control apparatus 3 (step S233). Then, the processing advances to step S239.

It is to be noted that the management server apparatus 10 receiving the image and sound information from the monitoring control apparatus 3 places the image and sound information on the Web page. Thus, the owner of the portable telephone terminal receiving the notification from the monitoring control apparatus 3 can access the Web page of the management server apparatus 10 to know what abnormal state has occurred and can take suitable countermeasures.

[Cooperation of the Monitoring Control Apparatus 3 by an Instruction from the Door Lock Control Apparatus 100]

Figure 33:
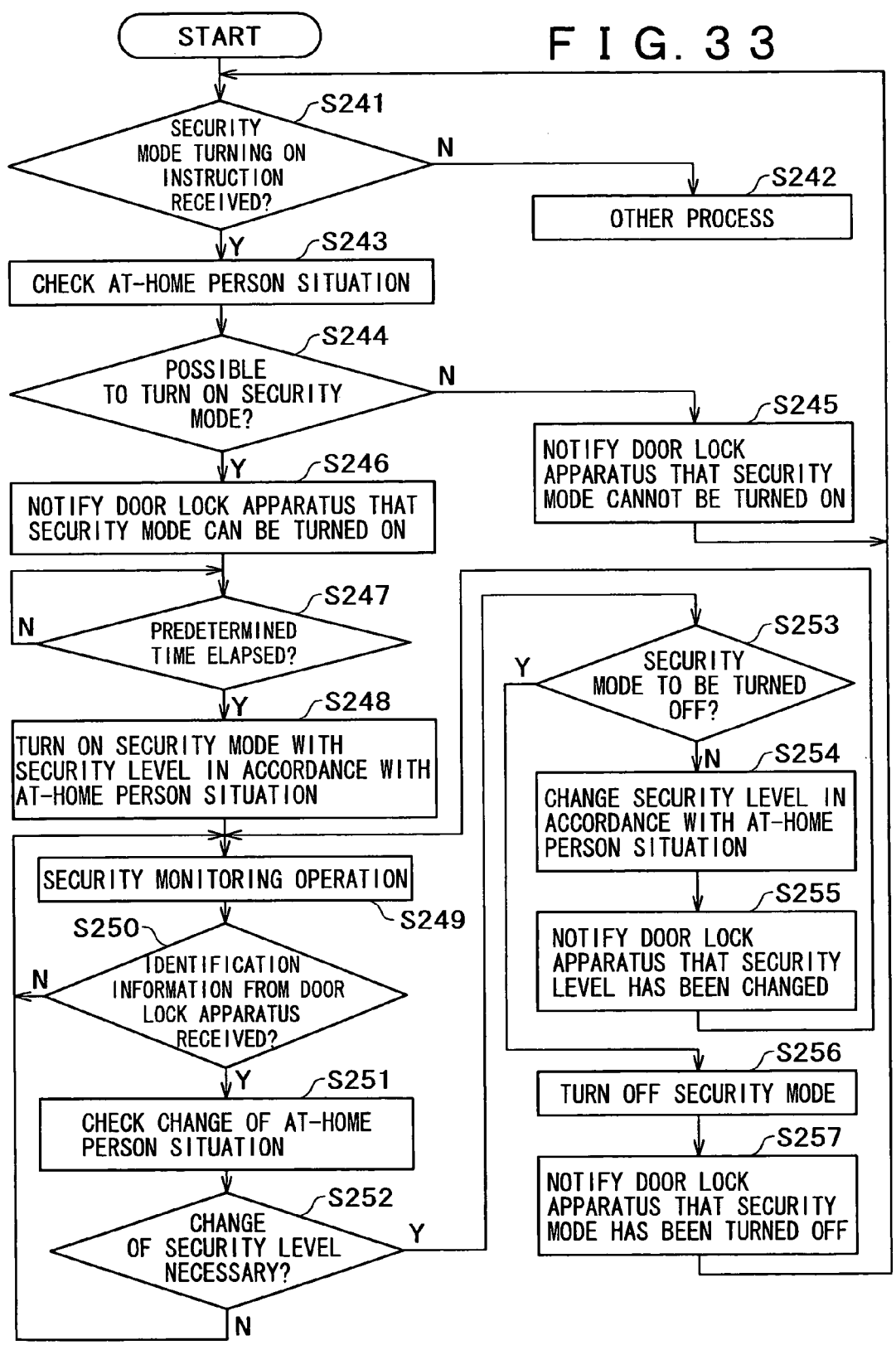
FIG. 33 is a view illustrating an interlocking operation of the monitoring control apparatus with the door lock apparatus.

The CPU 201 of the monitoring control apparatus 3 can performs such a cooperative operation as illustrated in FIG. 33 in response to information or an instruction received from the door lock control apparatus 100. In this example, a change of the security level by the CPU 201 is not performed in response to a changing instruction received from the door lock control apparatus 100 but performed as occasion demands as the result of a check of a change of the at-home situation depending upon reception of personal information from the door lock control apparatus 100.

In particular, the CPU 201 discriminates whether or not a securing mode turning on instruction is received from the door lock control apparatus 100 (step S241). If it is discriminated that such a security mode turning on instruction is not received, then the CPU 201 performs some other process (step S242).

If it is discriminated at step S241 that a security mode turning on instruction is received, then the CPU 201 refers to the stored information of the family information memory 205 to check the at-home situation (step S243). Then, the CPU 201 refers to the table illustrated in FIG. 15 to recognize a security level suitable for the at-home situation and discriminates whether or not it is possible to turn on the security mode (step S244).

If it is discriminated at step S244 that it is not possible to turn on the security mode, then the CPU 201 notifies the door lock control apparatus 100 of the discrimination (step S245).

On the other hand, if it is discriminated at step S244 that it is possible to turn on the security mode, then the CPU 201 notifies the door lock control apparatus 100 that the security mode can be turned on (step S246) and waits that a predetermined period of time elapses (step S247).

If it is confirmed that the predetermined period of time elapses, then the CPU 201 turns on the security mode with a security level suitable for the at-home situation (step S248). Then, the CPU 201 starts a security monitoring operation (step S249).

In the security monitoring operation, the CPU 201 discriminates whether or not personal information including identification information is received from the door lock control apparatus 100 (step S250). If such personal information is not received, then the processing returns to step S249 to continue the security monitoring operation. If it is discriminated that personal information is received from the door lock control apparatus 100, then the CPU 201 checks the at-home situation as the result of reception of the personal information (step S251) and discriminates whether or not it is necessary to change the security level (step S252).

If it is discriminated that it is not necessary to change the security level, then the CPU 201 returns the processing to step S249 to continue the security monitoring operation. On the other hand, if it is discriminated at step S252 that it is necessary to change the security level, then the CPU 201 discriminates whether or not the security mode should be turned off (step S253). If it is not detected that it is necessary to change the security level, then the CPU 201 changes the security level in response to the at-home situation (step S254). Then, the CPU 201 notifies the door lock control apparatus 100 that the security level is changed (step S255).

On the other hand, if it is discriminated at step S253 that the security mode should be turned off, then the CPU 201 turns off the security mode (step S256) and notifies the door lock control apparatus 100 of such turning off of the security mode (step S257). Thereafter, the processing returns to step S241.

In this manner, according to the present embodiment, since a contactless electronic key device is used to perform locking and unlocking, no keyhole is necessary. It is effective to prevent so-called lock-picking crime.

Further, organism information of an owner of an electronic key device is used to perform a check (authentication) regarding whether or not a user of the electronic key device is the owner. Electronic key information is signaled only when the authentication is OK. Therefore, even if the electronic key device is lost, it is impossible for anyone other than the owner to use the electronic key device to effect door lock control. The safety in security is very high.

Further, since the door lock apparatus 2 can be used separately between the automatic lock mode and the sequential lock mode, it has a high degree of usability for the user. The user can select which one of the modes should be used in accordance with the convenience in use.

Further, since the inner side electronic key read/write section 21in is provided such that the lock state of the door can be controlled with the electronic key device also by the inner side electronic key read/write section 21in, a stranger having intruded through a window or the like can be prevented from going out through the entrance door.

Further, since the inner side electronic key read/write section 21in and the outer side electronic key read/write section 21ex are provided, going out and coming in of the member of the family can be managed readily through communication between the electronic key read/write sections 21in and 21ex and an electronic key device.

Therefore, efficient security management can be anticipated by combination of the door lock apparatus 2 and the monitoring control apparatus 3. Further, since a security mode can be set upon door locking, the hectic time can be eliminated. A person doesn't have to go out of the house after a predetermined interval of time after setting is performed inside the house.

Further, if it is forgotten to close a window, this is confirmed upon opening or closing of the door. It is possible to prevent a person from forgetting to close a window.

Furthermore, since the level of the security mode can be changed depending upon the age, sex, and so forth of the members of the family, even when a person at home is weak, an effective security level can be set. Further, there is a merit also that the security level can be changed by grasping a variation of the at-home situation in response to release and fastening of the door lock.

[Registration of Electronic Key Information]

It is not preferable in terms of the security that registration of identification as electronic key information can be performed simply. Therefore, in the present example, the method puts emphasis on security as described below. For example, a distributor, an installation company, or a user of the door lock apparatus 2 performs registration of identification information of electronic key information.

First, registration of genuine key information is described. In the present embodiment, an electronic key device in which identification information as initial genuine key information is stored is an IC card as described hereinabove. The electronic key device is delivered from a distributor or an installation company of the door lock apparatus 2 to a user upon installation of the door lock apparatus 2 into each house.

In the present embodiment, before a door lock apparatus 2 is installed into a house, personal information regarding individual members of the family of the house into which the door lock apparatus 2 is to be installed is collected. Then, an IC card in which identification information to serve as genuine key information is stored is allocated to each of the members of the family. Personal profile information is formed from the identification information, which is as the genuine key information stored in the IC card, and the collected personal information.

Then, a product number formed from a serial number or the like of the door lock apparatus 2 to be installed, an address at which the door lock apparatus 2 is to be installed, a telephone number, user information such as the names of the members of the family who utilize the door lock apparatus, and the personal profile information of the members of the family are stored into the door lock apparatus management database 305 of the management server apparatus 10. In other words, the genuine key information of the individual members of the family is included in the personal profile information of the individual members of the family. The genuine key information is registered in advance in the management server apparatus 10.

In this instance, the door lock apparatus management database stores the personal profile information of the members of the family in a coordinated relationship with address information of the monitoring control apparatus 3 on the communication network. As the address information in the present example, a telephone number or an IP address is used as described hereinabove.

The genuine key information and the personal profile information of the members of the family registered in the management server apparatus 10 are written and registered into the family information memory 205 of the monitoring control apparatus 3. When the installation company or the distributor of the door lock apparatus 2 completes the installation of the door lock apparatus 2, they issues an initial registration request to the management server apparatus 10. Then, the information is transferred from the management server apparatus 10 to the monitoring control apparatus 3. Further, at least the genuine key information from within the information registered in the monitoring control apparatus 3 is transferred to the door lock control apparatus 100 and registered into the family information memory 120 of the door lock control apparatus 100.

Figure 34:
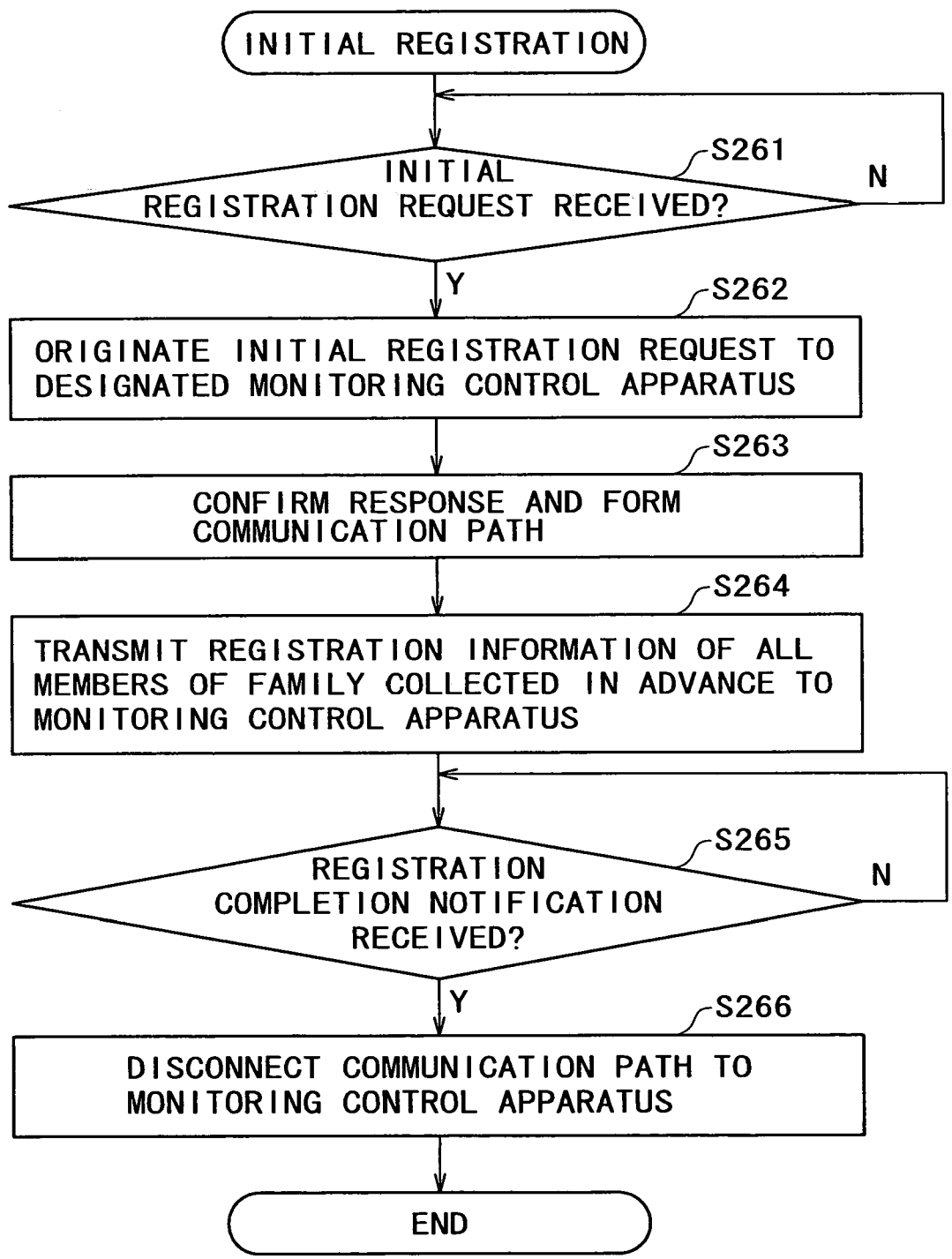
FIG. 34 is a view showing a flow chart illustrating registration of genuine key information in the embodiment of the present invention.

FIG. 34 illustrates operation of the management server apparatus 10 when an initial registration request is received. Principally the CPU 301 performs operations at the steps of FIG. 34.

First, the CPU 301 discriminated whether or not an initial registration request is received (step S261). The initial registration request accompanies apparatus identification information such as a serial number of the door lock apparatus 2. The request is sent either for example, from a personal computer to the management server apparatus 10 through a communication network or inputted by an operator, who receives an initial registration request by telephone communication, using inputting means not shown.

When the initial registration request is received, the CPU 301 searches the door lock apparatus database using the apparatus identification information as a search key. The CPU 301 reads out address information of the door lock apparatus 2 and the monitoring control apparatus 3 on the communication network 9 registered in advance and originates a call including the initial registration request. In other words, the CPU 301 performs origination of an initial registration request to the monitoring control apparatus 3 to which the door lock apparatus 2 whose initial registration is requested is connected (step S262).

At this time, since the monitoring control apparatus 3 performs automatic response, the CPU 301 confirms the response from the monitoring control apparatus 3 to form a communication path to the monitoring control apparatus 3 (step S263).

Then, the CPU 301 transmits the personal profile information to the monitoring control apparatus 3. As described, the personal profile information is stored in the family information memory 205 of the management server apparatus 10 in relation to the door lock apparatus 2. In addition, the personal profile information includes the genuine key information of all of the members of the family of the house in which the door lock apparatus is installed (step S264).

Then, the CPU 301 waits that transmission of all of the information to be transmitted to the monitoring control apparatus 3 is completed, and the registration completion notification arrives from the monitoring control apparatus 3 (step S265). Then, when it is discriminated that the registration completion notification is received, then the CPU 301 disconnects the communication path to the monitoring control apparatus 3 (step S266) and ends the initial registration processing routine.

Figure 35:
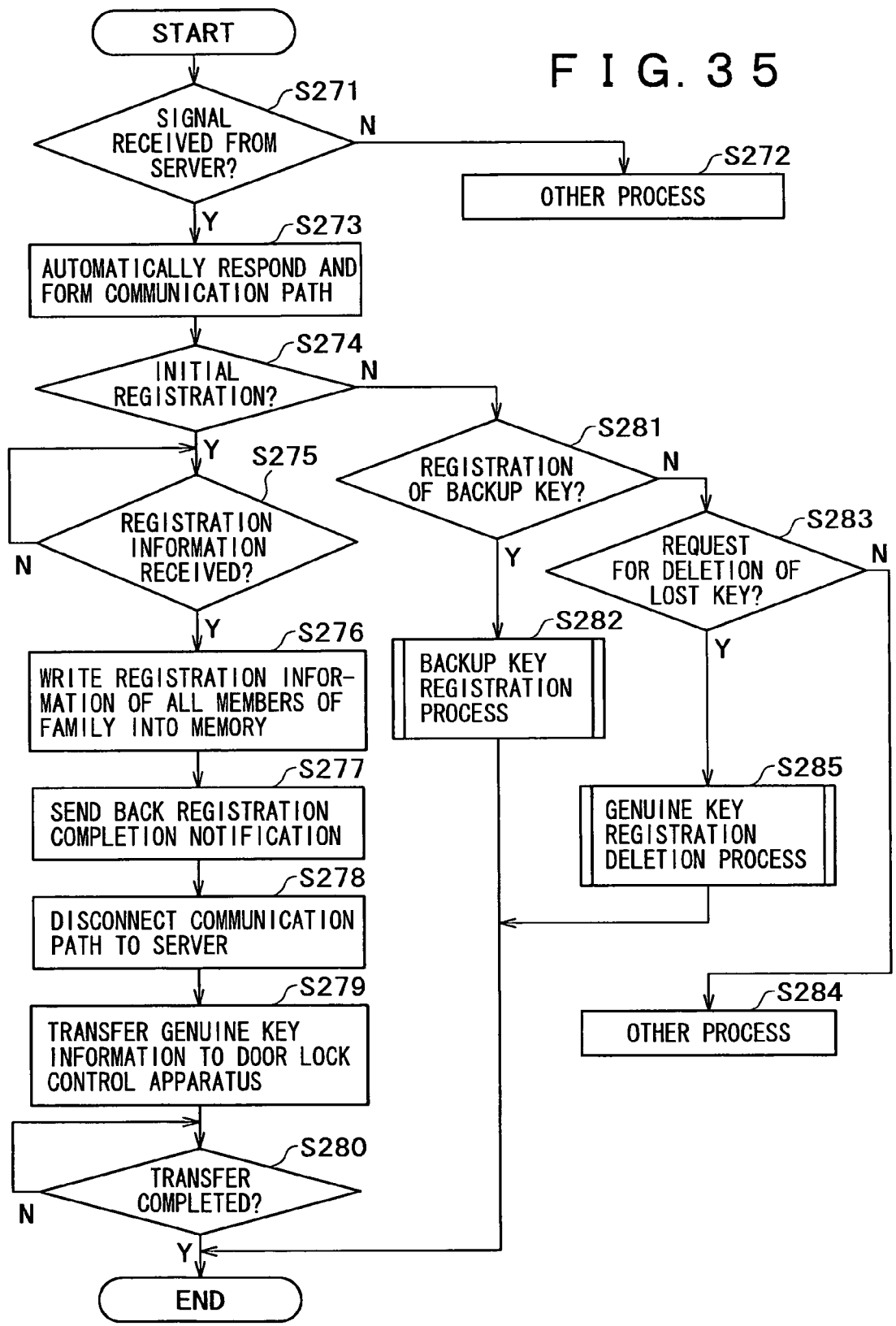
FIG. 35 is a view showing a system configuration illustrating the registration of the genuine key information in the embodiment of the present invention.

Operation of the monitoring control apparatus 3, which receives the initial registration request information, is described with reference to a flow chart of FIG. 35.

The CPU 201 of the monitoring control apparatus 3 discriminates whether or not an incoming signal from the management server apparatus 10 is received (step S271). If the received incoming signal is not from the management server apparatus 10, then the CPU 201 performs some other process (step S272).

If it is discriminated that an incoming signal from the management server apparatus 10 is received, the CPU 201 automatically responds to the incoming signal to form a communication path to the management server apparatus 10 (step S273). Then, the CPU 201 discriminates whether or not the received incoming signal is an initial registration request (step S271). If it is discriminated that the incoming signal is an initial registration request, the CPU 201 waits registration information from the management server apparatus 10. If such registration information is received (step S275), then the CPU 201 writes the received registration information into the family information memory 205 (step S276).

Then, when the writing of the registration information with regard to all of the members of the family is completed, then the CPU 201 sends back a registration completion notification to the management server apparatus 10 (step S277). Then, the CPU 201 disconnects the communication path to the management server apparatus 10 (step S278).

Thereafter, the CPU 201 transfers the identification information to the door lock control apparatus 100 (step S279). The identification information is as least the genuine key information regarding the individual members of the family from within the personal profile information written and registered in the family information memory 205. The door lock control apparatus 100 receives the information and registers the received genuine key information into the family information memory 120. Naturally, required information from within the personal information regarding the members of the family may be transferred to the door lock control apparatus 100 in addition to the identification information as the genuine key information. It is to be noted that the registration operation by the door lock control apparatus 100 is similar to the key registration operation by the monitoring control apparatus described hereinabove, and therefore, description of such registration operation is omitted here.

Then, if the CPU 201 confirms ending of the transfer of the genuine key information and the necessary information to the door lock control apparatus 100 (step S280), then the present processing routine is ended.

It is to be noted that, if it is discriminated at step S274 that the received incoming signal is not an initial registration request, the CPU 201 discriminates whether or not the received incoming signal is a backup key registration request (step S281). If it is discriminated that the incoming signal is a backup key registration request, then the CPU 201 executes a process for such backup registration (step S282). Detailed description of the process of the backup registration is omitted herein.

On the other hand, if it is discriminated at step S281 that the received incoming signal is not a backup registration request, the CPU 201 discriminates whether or not the received incoming signal is a deletion request of a lost key (step S283). Then, if it is discriminated that the received incoming signal is not a lost key deletion request, then the CPU 201 executes some other process (step S284). However, if it is discriminated that the received incoming signal is a lost key deletion request, then the CPU 201 executes a process of the deletion request (step S285). Detailed description of the deletion process is omitted herein. The process of FIG. 35 is ended therewith.

[Notification Informing Setting]

In the present embodiment, a user can set a scheduled coming home person, a scheduled going out person, scheduled coming home time, scheduled going out time, a notification informing person, or the like to the monitoring control apparatus 3 in advance. The monitoring control apparatus 3 stores the thus set information into the notifying information setting memory 222. Then, the monitoring control apparatus 3 monitors the set scheduled coming home time or scheduled going out time. The monitoring control apparatus 3 informs a notification of information regarding coming in or going out of the scheduled coming home person or scheduled going out person, that is, information regarding coming home, going out, to the set scheduled coming home person, set scheduled going out person, or set notification informing person.

Figure 36:
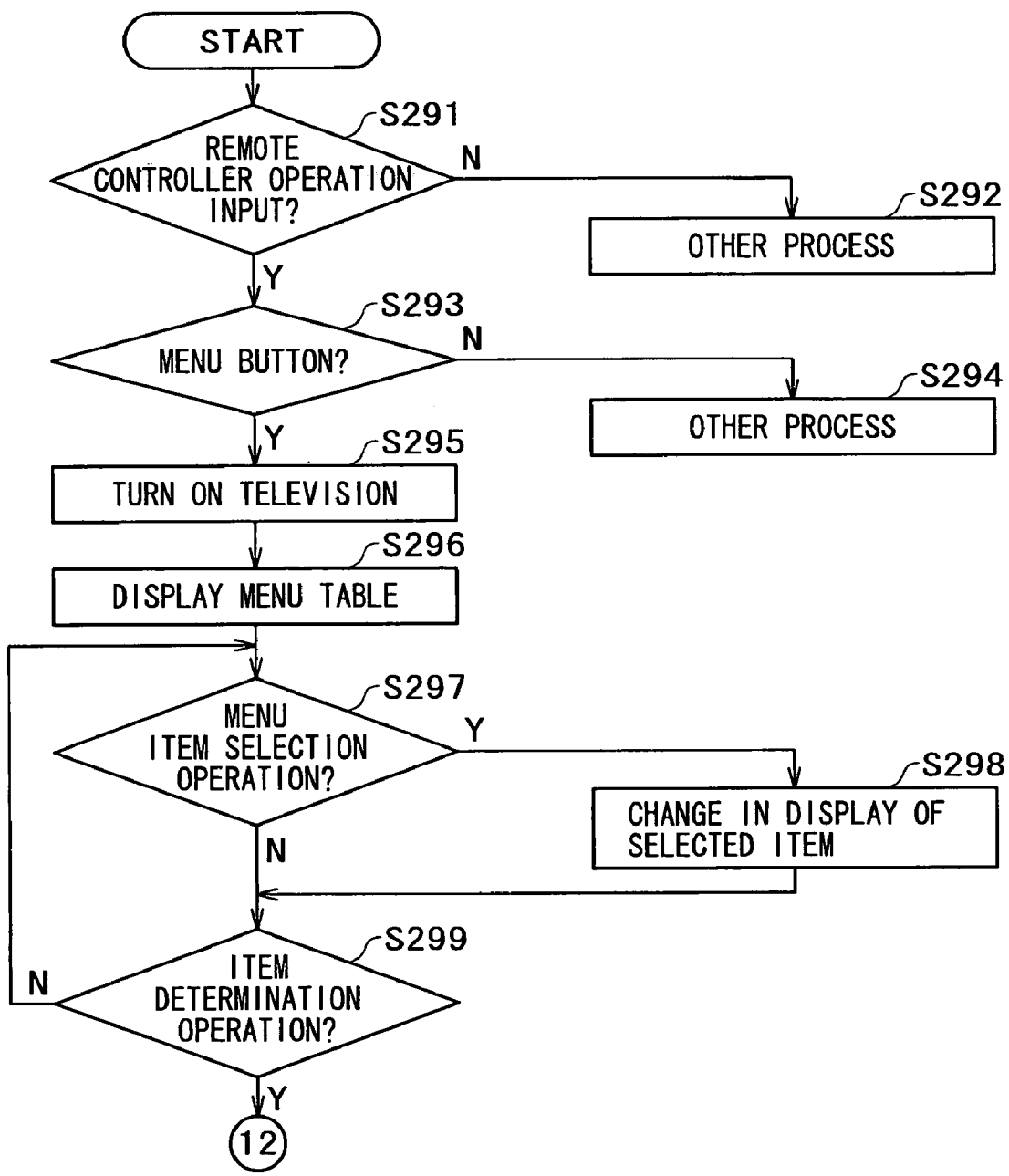
FIG. 36 is a view showing part of a flow chart illustrating a setting process of a coming home schedule or a going out schedule in the embodiment of the present invention.

First, a setting process of a scheduled coming home person, a scheduled going out person, scheduled coming home time, scheduled going out time, a notification informing person, or the like is described with reference to flow charts of FIGS. 36 and 37.

First, the CPU 201 of the monitoring control apparatus 3 monitors a receiver signal of the remote control receiver section 38 to discriminate whether or not a button of the remote commander 50 is operated (step S291). If it is discriminated at step S291 that no button is operated, then the CPU 201 performs some other process (step S292).

If it is discriminated at step S291 that some button is operated on the remote commander 50, then the CPU 201 discriminates whether or not the operated button on the remote commander 50 is the menu button 55 (step S293). If the operated button is not the menu button 5.5, then the CPU 201 executes a process corresponding to the operated button (step S294).

On the other hand, if it is discriminated at step S293 that the operated button is the menu button 55, then the CPU 201 turns on the power supply to the television receiver 7 if the power supply to the television receiver 7 is not on (step S295). The CPU 201 displays the menu table on the screen of the television receiver 7 in a similar manner as in the case of recording and reproduction of a message described hereinabove (step S296).

On the table display of menus, the operator would use the cursor key of the remote commander 50 to select one of the set menus to be performed. The CPU 201 monitors a receiver signal of the remote control receiver section 38 to discriminate whether or not a selection operation of a menu item is performed (step S297). If it is discriminated that a selection operation of a menu item is performed, then the CPU 201 changes the selected item, which is displayed, for example, in a reverse display, in response to the selection operation (step S298). Then, the CPU 201 discriminates whether or not a determination operation of the set item is performed (step S299).

On the other hand, if it is discriminated at step S297 that a selection operation of a menu item is not performed, then the CPU 201 advances the processing immediately to step S299, at which it discriminates whether or not a determination operation of the set item is performed. Then, if it is discriminated at step S299 that a determination operation of the set item is not performed, then the processing returns to step S297.

Figure 37:
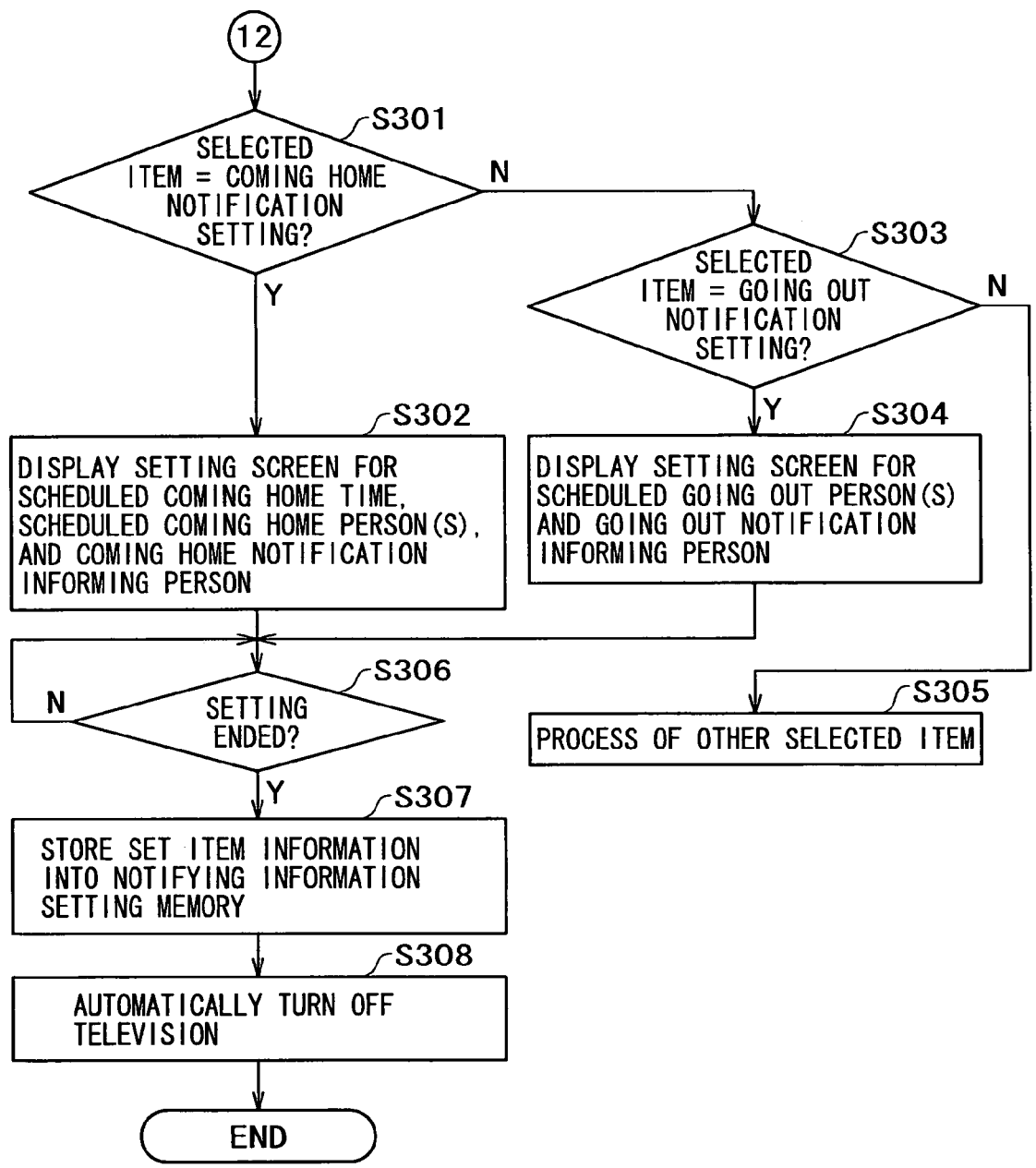
FIG. 37 is a view showing part of the flow chart illustrating the setting process of the coming home schedule or the going out schedule in the embodiment of the present invention.

On the other hand, if it is discriminated at step S299 that a determination operation of the set item is performed, then the CPU 201 discriminates whether or not the selected set item is setting of notification regarding scheduled coming home (step S301 of FIG. 37). If the selected set item is not such setting of notification, then the CPU 201 discriminates whether or not the selected set item is setting of notification regarding scheduled going out (step S303). Then, if it is discriminated that the selected set item is not setting of notification regarding scheduled going out, then the CPU 201 executes a processing routine for the set item (step S305).

If it is discriminated at step S301 that the selected set item is setting of notification regarding scheduled going out, then the CPU 201 causes a setting screen for scheduled coming home time, a scheduled coming home person, a coming home notification informing person, and so forth to be displayed on the screen of the television receiver 7 (step S302). In the case of the present example, the coming home notification informing person requested to the user to set on the setting screen is set to a person other than the scheduled coming home person. However, if setting of notification regarding scheduled coming home is performed, the scheduled coming home person itself is included in the actual coming home notification informing person. The monitoring control apparatus 3 sends a notification for urging the scheduled coming home person, who does not come home at the scheduled coming home time, to come home as hereinafter described.

At step S306 next to step S302, the CPU 201 discriminates whether or not setting inputting to all of the setting items is ended with regard to the notification regarding scheduled coming home (step S306). If it is discriminated that all setting inputting is ended, then the CPU 201 writes the set item information into the notifying information setting memory 222 (step S307) and then turns off the power supply to the television receiver 7 (step S308), thereby ending the present setting processing routine.

On the other hand, if it is discriminated at step S303 that the selected setting item is setting of notification regarding scheduled going out, then the CPU 201 causes a setting screen for scheduled going out time, a scheduled going out person, a going out notification informing person, and so forth to be displayed on the screen of the television receiver 7 (step S304). In the case of the present example, the going out notification informing person requested to the user to set on the setting screen is set to a person other than the scheduled going out person. However, if setting of notification regarding scheduled going out is performed, the scheduled going out person itself is included in the actual going out notification informing person. The monitoring control apparatus 3 sends a notification for urging the scheduled going out person, who does not go out at the scheduled going out time, to go out as hereinafter described.

Then at step S306 next to step S304, the CPU 201 discriminates whether or not setting inputting to all of the setting items is ended with regard to the notification regarding scheduled going out (step S306). If it is discriminated that all setting inputting is ended, then the CPU 201 writes the set item information into the notifying information setting memory 222 (step S307) and then turns off the power supply to the television receiver 7 (step S308), thereby ending the present setting processing routine.

[Notification Informing Process]

Now, operation of notifying information of the monitoring control apparatus 3 when notification setting regarding scheduled coming home or scheduled going out is performed in such a manner as described above is described with reference to FIGS. 38 to 40.

First, the monitoring control apparatus 3 is in a waiting state for notifying information regarding coming home or going out (step S310). In the waiting state, the security mode may be in any of an on state and an off state.

In the waiting state, the CPU 201 discriminates whether or not information from the door lock control apparatus 100 is received (step S311). Then, if it is discriminated that information from the door lock control apparatus 100 is received, then the CPU 201 discriminates whether the received information is coming home person information or going out person information (step S312).

If it is discriminated at step S312 that the received information is going out person information, the CPU 201 compares the identification information of the scheduled going out person stored in the notifying information setting memory 222 and the identification information of the going out person included in the going out person information received from the door lock control apparatus 100 with each other. Then, the CPU 201 discriminates based on the result of the comparison whether or not the going out person is a set scheduled going out person (step S313). If the going out person is not a set scheduled going out person, then the processing returns to step S310, in which the CPU 201 enters a waiting state.

On the other hand, if it is discriminated at step S313 that the going out person is a set scheduled going out person, the CPU 201 reads out the information of the going out notification informing person stored in the notifying information setting memory 222. Then, in the present example, the CPU 201 searches personal information of the going out notification informing person stored in the family information memory 205 to read out the mail address of the going out notification informing person. The CPU 201 informs the notification that the set scheduled going out person goes out by the electronic mail, for example, to the portable telephone terminal of the going out notification informing person (step S314). The notifying information includes also the time at which the scheduled going out person goes out.

Then, after the notifying information is performed, the CPU 201 erases the setting information regarding the notification relating to the scheduled going out stored in the notifying information setting memory 222 (step S315), thereby ending the processing routine.

Through the foregoing process, for example, a parent who is out of home can know whether or not the child set as a scheduled going out person has gone out at the scheduled time.

If it is discriminated at step S312 that the information received from the door lock control apparatus 100 is coming home person information, the CPU 201 compares the identification information of the scheduled coming home person stored in the notifying information setting memory 222 and the identification information of the coming home person included in the coming home person information received from the door lock control apparatus 100 with each other. Then, the CPU 201 discriminates based on the result of the comparison whether or not the coming home person is a set scheduled coming home person (step S316). If the coming home person is not a set scheduled coming home person, the processing returns to step S310, in which the CPU 201 enters a waiting state.

On the other hand, if it is discriminated at step S316 that the coming home person is a set scheduled coming home person, then the CPU 201 reads out the information of the coming home notification informing person stored in the notifying information setting memory 222. Then, in the present example, the CPU 201 searches personal information of the going out notification informing person stored in the family information memory 205 to read out the mail address of the going out notification informing person. Then, the CPU 201 informs the notification that the set scheduled coming person comes home by the electronic mail, for example, to the portable telephone terminal of the going out notification informing person (step S317). The notifying information includes also the time at which the scheduled coming home person comes home.

Then, after the notifying information is performed, the CPU 201 erases the setting information regarding the notification relating to the scheduled coming home stored in the notifying information setting memory 222 (step S315), thereby ending the processing routine.

Through the foregoing process, for example, for example, a parent who goes out can know whether or not the child set as a scheduled coming home person has come home at the scheduled time.

If it is discriminated at step S311 that information from the door lock control apparatus 100 is not received, the CPU 201 compares the scheduled coming home time stored in the notifying information setting memory 222 and the present time indicated by the clock circuit 221 with each other to discriminate whether or not the scheduled coming home time is passed (step S318).

If it is discriminated at step S318 that the scheduled coming home time is not passed, the CPU 201 compares the scheduled going out time stored in the notifying information setting memory 222 and the present time indicated by the clock circuit 221 with each other to discriminate whether or not the scheduled going out time is passed (step S319). If it is discriminated at step S319 that the present time does not passes also the scheduled going out time, the processing returns to step S310, at which the CPU 201 enters a waiting state.

If it is discriminated at step S318 that the present time passes the scheduled coming home time, the CPU 201 performs notifying information for urging the scheduled coming home person to come home (step S321 of FIG. 39). In particular, the CPU 201 reads out the mail address of the scheduled coming home person stored in the family information memory 205. The CPU 201 issues a notification for the scheduled coming home person to come back immediately to urge the scheduled coming home person to come home by the electronic mail, for example, to the portable telephone terminal of the scheduled coming home person.

Then, the CPU 201 reads out the information of the coming home notification informing person stored in the notifying information setting memory 222 and searches the personal information of the coming home notification informing person itself stored in the family information memory 205 to read out the mail address of the coming home notification informing person. Then, the CPU 201 issues a notifying information that the set scheduled coming home person does not come home as yet by the electronic mail, for example, to the portable telephone terminal of the coming home notification informing person (step S322).

Thereafter, the CPU 201 waits coming home person information from the door lock control apparatus 100 (step S323) and discriminates whether or not a predetermined period of time, for example, 10 minutes, elapses without receiving coming home person information (step S324). If it is discriminated that the predetermined time does not elapse, the processing returns to step S323, at which the CPU 201 waits arrival of coming home person information. On the other hand, if it is discriminated that the predetermined period of time elapses, the processing returns to step D321, at which the CPU 201 sends the electronic mail again for urging the scheduled coming home person to come back.

On the other hand, if it is discriminated at step S323 that coming home person information is received from the door lock control apparatus 100, the CPU 201 discriminates whether or not the coming home person identified from the identification information included in the coming home person information from the door lock control apparatus 100 is the set scheduled coming home person (step S325). If it is discriminated at step S325 that the coming home person is not the set scheduled coming home person, the CPU 201 advances the processing to step S324. Then, the CPU 201 waits lapse of the predetermined period of time, and repeats the operation at steps beginning with step S324.

If it is discriminated at step S325 that the discriminated coming home person is the scheduled coming home person set in advance, the CPU 201 searches the personal information of the coming home notification informing person stored in the family information memory 205 to read out the mail address of the coming home notification informing person. Then, the CPU 201 issues the notifying information that the set scheduled coming home person comes home by the electronic mail, for example, to the portable telephone terminal of the coming home notification informing person (step S317). This notification information includes also the time at which the scheduled coming home person comes home.

Then, after the notifying information is performed, the CPU 201 erases the setting information regarding the scheduled coming home person stored in the notifying information setting memory 222 (step S315), thereby ending the processing routine.

Figure 40:
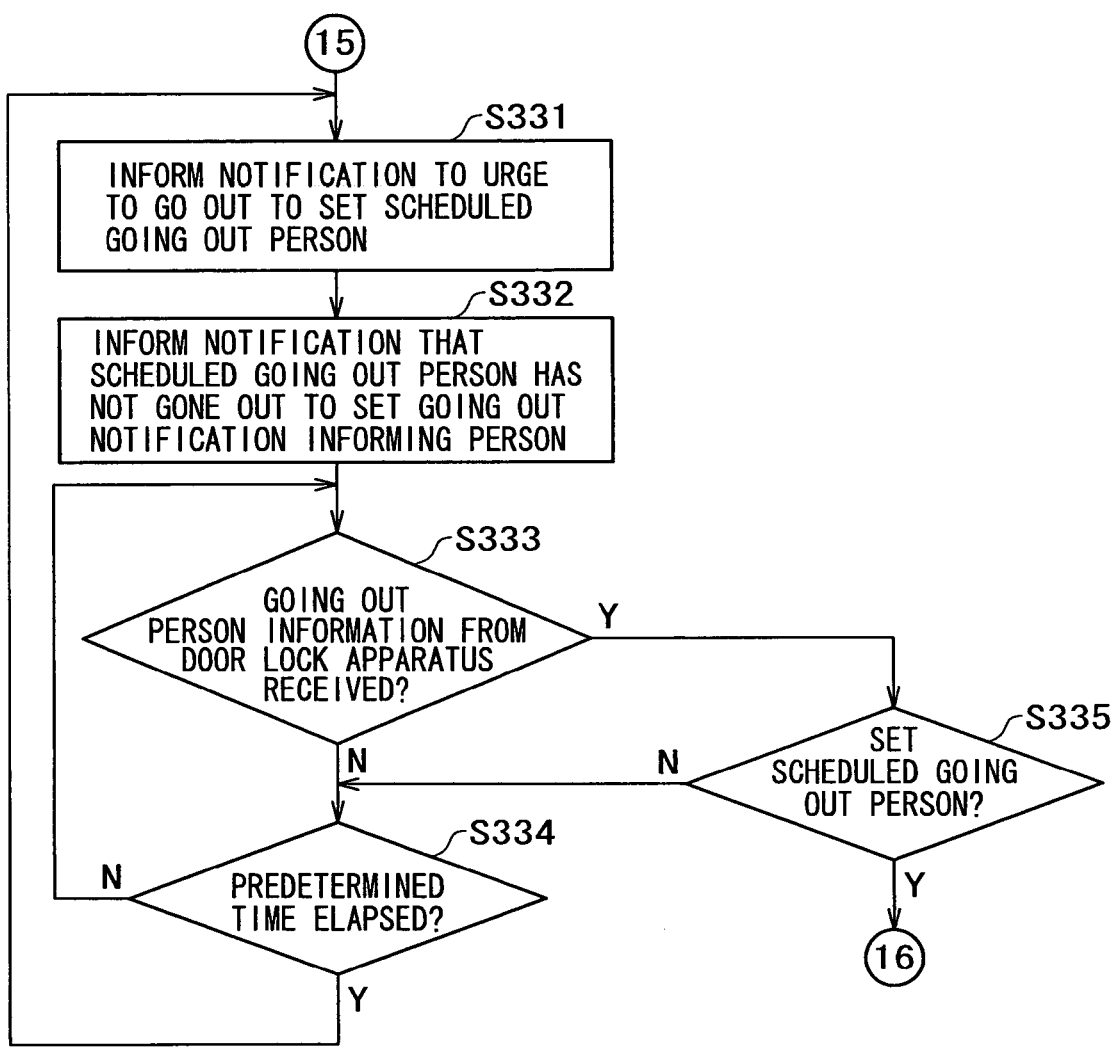
FIG. 40 is a view showing part of the flow chart illustrating the notifying information process regarding a scheduled coming home person or a scheduled going out person in the embodiment of the present invention.

On the other hand, if it is discriminated at step S319 that the present time passes the scheduled going out time, the CPU 201 issues a notifying information for urging the scheduled going out person to go out (step S331 of FIG. 40). In particular, the CPU 201 reads out the mail address of the scheduled going out person stored in the family information memory 205 and issues the notification that the scheduled going out person should go out immediately by the electronic mail, for example, to the portable telephone terminal of the scheduled going out person to urge the scheduled going out person to go out. Consequently, even if the scheduled going out person is very busy with some other thing, the scheduled going out person can go out at the predetermined scheduled going out time.

Thereafter, the CPU 201 reads out the information of the going out notification informing person stored in the notifying information setting memory 222 and refers to the personal information of the going out notification informing person stored in the family information memory 205 to read out the mail address. Then, the CPU 201 issues the notifying information that the set scheduled going out person does not go out as yet by the electronic mail, for example, to the portable telephone terminal of the going out notification informing person (step S332).

The going out notification informing person receiving the notifying information can originate the telephone call or the like to the home thereof to urge the scheduled going out person to go out. The scheduled going out person may not receive the notifying information at step S331 from the reason that the power supply to the portable telephone terminal is not on or the like. Even in that case, the scheduled going out person can go out at the scheduled going out time if the going out notification informing person urges to go out by telephone communication from the outside.

Thereafter, the CPU 201 waits going out person information from the door lock control apparatus 100 (step S333) and discriminates whether or not a predetermined period of time, for example, 10 minutes, elapses without receiving going out person information (step S334). If it is discriminated that the predetermined time does not elapse, then the processing returns to step S333, at which the CPU 201 waits arrival of going out person information. On the other hand, if it is discriminated at step S334 that the predetermined time period elapses, the processing returns to step S331. The CPU 201 sends the electronic mail again for urging the scheduled going out person to go out.

On the other hand, if it is discriminated at step S333 that going out person information is received from the door lock control apparatus 100, the CPU 201 discriminates whether or not the going out person identified with the identification signal included in the going out person information is the set scheduled going out person (step S335). If it is discriminated that the going out person is not the set scheduled going out person, then the CPU 201 advances the processing to step S334. The CPU 201 waits that the predetermined period of time elapses, and executes the operation described above at steps beginning with step S334.

If it is discriminated at step S335 that the going out person is the set scheduled going out person, the CPU 201 searches the personal information of the going out notification informing person stored in the family information memory 205 to read out the mail address. Then, the CPU 201 issues the notifying information that the set scheduled going out person goes out by the electronic mail, for example, to the portable telephone terminal of the going out notification informing person (step S314). This notifying information includes also the time at which the scheduled going out person goes out.

Then, after the notifying information is performed, the CPU 201 erases the setting information regarding the scheduled going out person stored in the notifying information setting memory 222 (step S315), thereby ending the processing routine.

As described above, according to the present embodiment, for example, if a parent sets the child as a scheduled coming home person, sets scheduled coming home time, and further sets the parent itself as a coming home notification informing person, then the parent can confirm whether or not the child is at home at the scheduled coming home time and can urge the child to come home immediately.

Further, if a person who plans to go out sets scheduled going out time, then even if the person forgets the scheduled going out time, when the scheduled going out time comes, the person is urged to go out. Therefore, the person can go out with certainty at the scheduled time.

[Other Embodiments]

In the embodiment described above, when predetermined reserved set time comes, the notifying information of a coming home situation of a scheduled coming home person or a going out situation of a scheduled going out person is issued to the scheduled coming home person or the scheduled going out person and a coming home notifying information person or a going out notifying information person set in advance. However, the door lock control apparatus 100 and an electronic key device may communicate with each other to inform the notification of information regarding a person who goes our or comes home to a notification informing person set in advance.

Further, the communication apparatus in the embodiment described above includes the door lock apparatus 2 and the monitoring control apparatus 3 of the security system. However, where a door lock control system directed only for locking and unlocking of a door is considered, the monitoring control apparatus 3 is unnecessary and the communication apparatus can be composed only of the door lock apparatus 2. In this instance, the door lock apparatus 2 has a function of originating a mail or a telephone call to a portable telephone terminal through a telephone line.

Further, while the method for notifying information is an electronic mail, it is possible to use speech synthesis or the like and originate a telephone call to a portable telephone terminal or a fixed telephone terminal of a telephone number determined in advance. Thus, the notification of urging a person to come home or go out or the notification of a coming home situation or a going out situation may be issued as speech information.

Further, in the embodiment described above, the electronic key information is an IC chip manufacture order number and is coordinated with personal information such that the electronic key information is used also as personal identification information. It is possible to determine and register personal identification information into an electronic key device, a door lock control apparatus, a monitoring control apparatus, or the like together with the electronic key information. Therefore, the personal identification information is informed together with the electronic key information upon communication between the electronic key device and a read/write section. In this instance, in addition to the electronic key information, identification information is set for each individual person and is stored in a memory of the electronic key device and is included and stored in personal profile information of a memory of the door lock control apparatus or the monitoring control apparatus.

Where personal identification information and electronic key information are formed separately from each other in this manner, it is possible to use as a piece of electronic key information for a door lock apparatus. All of members of a family who live in the house have electronic key information common to the all members. Each of the members of the family has an electronic key device in which the common key information is stored.

Further, in the embodiment described above, information used for informing a notification informing person, for example, an electronic mail address, a telephone number, or an IP address where a notification is issued to a personal computer, is acquired from information stored in advance in and read out from the monitoring control apparatus or the door lock control apparatus. It may otherwise be acquired from an electronic key device upon communication with the electronic key device.

The embodiment described above includes the management server apparatus 10, since it is a configuration of a communication system including also a security monitoring system. Alternatively, it is possible to configure a communication system without a security monitoring system.

It is to be noted that electronic key information may not be transferred to and registered into a storage section for electronic key information of the door lock apparatus from a management server apparatus, but may be registered and stored into the door lock apparatus in advance before the door lock apparatus is installed into a dwelling house. Particularly, where a door lock control system is used singly without using such a security monitoring system as in the embodiment described above, the configuration just described is used.

Further, while it is described that identification information managed unitarily is stored in advance in a memory of an IC chip, such identification information managed unitarily may be written later.

It is to be noted that, in the embodiment described above, the security mode is turned on when an electronic key device is held up to the outer side electronic key read/write section 21ex within a predetermined period of time after the door is locked. Since coming in and going out through the entrance door 1 are managed by the door lock control apparatus 100 or the monitoring control apparatus 3, when no person is at home, the security mode may be turned on automatically with the security level A.

In this instance, when the door lock control apparatus 100 detects that there remains no person at home, a security mode turning on request may be issued to the monitoring control apparatus 3, or when the monitoring control apparatus 3 detects that there remains no person at home, the monitoring control apparatus 3 itself may turn on the security mode.

It is to be noted that, in the present example, a person at home unlocks the entrance door 1 and opens the entrance door 1. Even if the security mode has been on till then, the security mode is turned off. However, when a person goes out while the security mode is on, the person may be recognized from identification information acquired by communication with an electronic key device. The monitoring control apparatus 3 may automatically change the security model in response to a change of the at-home situation quite similarly to the case wherein a person comes home.

It is to be noted that, in the description of the embodiment above, the door lock apparatus performs authentication of identification as key information. The door lock apparatus 2 may send the key information to the monitoring control apparatus 3 or to the management server apparatus 10 through the monitoring control apparatus 3 such that the monitoring control apparatus 3 or the management server apparatus 10 performs an authentication operation. The result of the authentication is returned to the door lock apparatus 2 (in the case of the management server apparatus 10, returned through the monitoring control apparatus 3). In this instance, an instruction to transfer or delete the key information need not be sent from the monitoring control apparatus 3 to the door lock control apparatus 100.

Also the identification information of an unlocking person or a locking person may be sent not to the monitoring control apparatus 3 but to the management server apparatus 10 such that the security management is performed by the management server apparatus 10.

Further, in the foregoing description, a going out person or a coming home person is discriminated by the door lock control apparatus 100. Since also the monitoring control apparatus 3 has setting information of the door lock control mode at the door lock control apparatus 100, the monitoring control apparatus 3 discriminates between going out and coming home. The IC card 40F is held up to the inner side electronic key read/write section 21in or the outer side electronic key read/write section 21ex and communication is performed between the IC card 40F and the inner or outer side electronic key read/write section 21in or 21ex. When the authentication of identification results in success, the door lock control apparatus 100 can send the identification information, the information that the communication is performed whether by the inner side electronic key read/write section 21in or by the outer side electronic key read/write section 21ex, and unlocking or locking information to the monitoring control apparatus 3.

It is to be noted that the electronic key device is not limited to an IC card as described hereinabove, but in the case of the example described above, it is possible to use an IC chip similar to an IC card, a portable telephone terminal, a PDA (personal digital assistant), or the like including communication means and organism information acquisition means.

Further, the electronic key device is not limited to an electronic key device performing communication of electronic key information in such a contactless fashion as in the embodiment described hereinabove, but may be an electronic key device performing communication of electronic key information in a contacting fashion.

INDUSTRIAL APPLICABILITY

As described above, with the communication apparatus according to the present invention, since individual persons who perform locking or unlocking of a door are managed, it is possible to urge a scheduled coming home person or a scheduled going out person to come home or go out, and it is possible to inform a notification of a coming home situation or a going out situation to a notification informing person who is out of home.

The invention claimed is:
1. A communication apparatus, comprising:
first communication means for communicating with an electronic key device in which at least first electronic key information is stored;
second communication means for transmitting information through a communication network;
a storage section for storing second electronic key information;
door lock control means for comparing the first electronic key information received from the electronic key device through the first communication means with the second electronic key information stored in the storage section, thereby controlling a lock apparatus for a door based on the result of the comparison;
user recognition means for recognizing a user of the electronic key device based on information received from the electronic key device through the first communication means;
transmission control means for controlling, based on the recognition result of the user recognition means, the transmission of information regarding passing in/out of the user of the electronic key device to a predetermined notification destination through the second communication means; and
setting storing means for accepting and storing a setting of the user of the electronic key device, the setting storing means determining a notification destination that the information regarding the passing in/out is to be transmitted;

wherein the setting storing means accepts and stores time information related to the user of the electronic key device; and wherein the transmission control means transmits information regarding that passing in/out of the user of the electronic key device does not occur to the notification destination through the second communication means, if the set user of the electronic key device is not recognized by the user recognition means for an elapsed time period corresponding to the time information stored in the setting storing means.

2. The communication apparatus according to claim 1, wherein the notification destination is the set user of the electronic key device, and the information regarding that passing in/out of the user of the electronic key device does not occur is information for urging the user of the electronic key device to perform the passing in/out.

3. The communication apparatus according to claim 1, wherein the notification destination is a person different from the set user of the electronic key device.

4. The communication apparatus according to claim 3, wherein if the set user of the electronic key device is recognized by the user recognition means during the elapsed time period corresponding to the time information, the information regarding coming in/going out of the user of the electronic key device is transmitted to the notification destination through the second communication means.

5. The communication apparatus according to claim 1, wherein the electronic key information is formed from identification information with which the user of the electronic key device can be identified, and the user recognition means recognizes the user of the electronic key device who comes in/goes out through the door based on the electronic key information received from the electronic key device.

6. The communication apparatus according to claim 1, wherein the electronic key information is identification information allocated and unitarily managed so that the same electronic key information may not co-exist, the communication apparatus further comprises a personal information storage section for storing personal information with which an owner of the electronic key device can be specified corresponding to the electronic key information and means for comparing the electronic key information received from the electronic key device and the electronic key information stored in the storage section with each other and managing coming in/going out of the owner of the electronic key device through the door based on the result of the comparison, and the user recognition means recognizes the user of the electronic key device who comes in/goes out through the door based on the electronic key information received from the electronic key device.

* * * * *